US009268345B2

(12) United States Patent
Mirza et al.

(10) Patent No.: US 9,268,345 B2
(45) Date of Patent: Feb. 23, 2016

(54) SYSTEM AND METHOD OF USE FOR A USER INTERFACE DASHBOARD OF A HEATING, VENTILATION AND AIR CONDITIONING NETWORK

(75) Inventors: Muhammad Ali Mirza, Farmers Branch, TX (US); Jacob Jennings, Irving, TX (US); Amanda Filbeck, Guthrie, OK (US)

(73) Assignee: Lennox Industries Inc., Richardson, TX (US)

(*) Notice: Subject to any disclaimer, the term of this patent is extended or adjusted under 35 U.S.C. 154(b) by 1437 days.

(21) Appl. No.: 12/603,482

(22) Filed: Oct. 21, 2009

(65) Prior Publication Data

US 2010/0107110 A1    Apr. 29, 2010

Related U.S. Application Data

(63) Continuation-in-part of application No. 12/258,659, filed on Oct. 27, 2008, now abandoned.

(60) Provisional application No. 61/167,135, filed on Apr. 6, 2009.

(51) Int. Cl.
*G06F 3/041* (2006.01)
*G05B 15/00* (2006.01)
*G05D 3/12* (2006.01)
(Continued)

(52) U.S. Cl.
CPC ........ *G05D 23/1927* (2013.01); *B60H 1/00985* (2013.01); *G06F 3/04886* (2013.01)

(58) Field of Classification Search
USPC .......... 700/276–278, 295; 345/173; 715/779, 715/863, 864
See application file for complete search history.

(56) References Cited

U.S. PATENT DOCUMENTS 4,262,736 A    4/1981  Gilkeson et al.
4,296,464 A    10/1981 Woods et al.
(Continued)

FOREIGN PATENT DOCUMENTS

EP    0980165 A2    2/2000
EP    1956311 A2    8/2008
(Continued)

OTHER PUBLICATIONS

Checket-Hanks, B.; "Zoning, Controls for Convenience's Sake"; Air Conditioning, Heating & Refrigeration News; Jun. 28, 2004; 3 pages; 222,9; ABI/Inform Global.
(Continued)

*Primary Examiner* — Robert Fennema
*Assistant Examiner* — Thomas Stevens
(74) *Attorney, Agent, or Firm* — Lennox Industries Inc.; Betty E. Ungerman; Osman Siddiq

(57) ABSTRACT

The disclosure provides systems and methods of use of an HVAC graphical interface dashboard. In various embodiments, the dashboard includes a weather tab, wherein invoking the weather tab advances to a weather screen. The dashboard also includes an indoor humidity tab, wherein invoking the indoor humidity tab advances to a humidity screen which displays at least a current indoor humidity, wherein the humidity screen interprets a percentage of humidity for a user. A programs tab and a home tab are also provided. At least one of: a) a system mode; and b) a fan mode can be selected by pressing a correlated icon in the program tab.

18 Claims, 51 Drawing Sheets

(51) Int. Cl.
  *G06F 3/048*   (2013.01)
  *G06F 3/14*    (2006.01)
  *G05D 23/19*   (2006.01)
  *B60H 1/00*    (2006.01)
  *G06F 3/0488*  (2013.01)

(56) References Cited

U.S. PATENT DOCUMENTS

| | | |
|---|---|---|
| 4,319,557 A | 3/1982 | Sietmann et al. |
| 4,381,549 A | 4/1983 | Stamp, Jr. et al. |
| 4,426,937 A | 1/1984 | Sietmann et al. |
| 4,464,543 A | 8/1984 | Kline et al. |
| 4,482,785 A | 11/1984 | Finnegan et al. |
| 4,501,125 A | 2/1985 | Han |
| 4,542,734 A | 9/1985 | Trent et al. |
| 4,606,042 A | 8/1986 | Kahn et al. |
| 4,616,325 A | 10/1986 | Heckenbach et al. |
| 4,694,394 A | 9/1987 | Costantini |
| 4,698,628 A | 10/1987 | Herkert et al. |
| 4,703,325 A | 10/1987 | Chamberlin et al. |
| 4,706,247 A | 11/1987 | Yoshioka |
| 4,723,239 A | 2/1988 | Schwartz |
| 4,829,447 A * | 5/1989 | Parker et al. ............... 700/277 |
| 4,841,450 A | 6/1989 | Fredriksson |
| 4,843,084 A * | 6/1989 | Parker et al. ............... 700/277 |
| 4,873,649 A | 10/1989 | Grald et al. |
| 4,884,214 A | 11/1989 | Parker et al. |
| 4,887,262 A | 12/1989 | van Veldhuizen |
| 4,888,728 A | 12/1989 | Shirakawa et al. |
| 4,889,280 A | 12/1989 | Grald et al. |
| 4,931,948 A | 6/1990 | Parker et al. |
| 4,941,143 A | 7/1990 | Twitty et al. |
| 4,942,613 A | 7/1990 | Lynch |
| 4,947,484 A | 8/1990 | Twitty et al. |
| 4,947,928 A | 8/1990 | Parker et al. |
| 4,953,083 A | 8/1990 | Takata et al. |
| 4,955,018 A | 9/1990 | Twitty et al. |
| 4,967,567 A | 11/1990 | Proctor et al. |
| 4,978,896 A | 12/1990 | Shah |
| 4,991,770 A | 2/1991 | Bird et al. |
| 4,996,513 A | 2/1991 | Mak et al. |
| 5,006,827 A | 4/1991 | Brueton et al. |
| 5,018,138 A | 5/1991 | Twitty et al. |
| 5,039,980 A | 8/1991 | Aggers et al. |
| 5,042,997 A | 8/1991 | Rhodes |
| 5,058,388 A | 10/1991 | Shaw et al. |
| 5,061,916 A | 10/1991 | French et al. |
| 5,065,813 A | 11/1991 | Berkeley et al. |
| 5,086,385 A | 2/1992 | Launey et al. |
| 5,103,896 A | 4/1992 | Saga |
| 5,105,366 A | 4/1992 | Beckey |
| 5,115,967 A | 5/1992 | Wedekind |
| 5,128,855 A | 7/1992 | Hilber et al. |
| 5,165,465 A | 11/1992 | Kenet |
| 5,170,935 A | 12/1992 | Federspiel et al. |
| 5,178,124 A | 1/1993 | Lu et al. |
| 5,180,102 A | 1/1993 | Gilbert et al. |
| 5,181,653 A | 1/1993 | Foster et al. |
| 5,182,715 A * | 1/1993 | Vorgitch et al. ............... 700/182 |
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,259,553 A | 11/1993 | Shyu |
| 5,274,571 A | 12/1993 | Hesse et al. |
| 5,276,630 A | 1/1994 | Baldwin et al. |
| 5,277,036 A | 1/1994 | Dieckmann et al. |
| 5,278,957 A | 1/1994 | Chan |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,341,988 A | 8/1994 | Rein et al. |
| 5,355,323 A | 10/1994 | Bae |
| 5,361,982 A | 11/1994 | Liebl et al. |
| 5,374,200 A | 12/1994 | Giroux |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,434,965 A | 7/1995 | Matheny et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,475,364 A | 12/1995 | Kenet |
| 5,481,481 A | 1/1996 | Frey et al. |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,511,188 A | 4/1996 | Pascucci et al. |
| 5,513,324 A | 4/1996 | Dolin, Jr. et al. |
| 5,515,267 A | 5/1996 | Alsenz |
| 5,520,328 A | 5/1996 | Bujak, Jr. |
| 5,522,044 A | 5/1996 | Pascucci et al. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A | 8/1996 | Brown, Jr. et al. |
| 5,544,809 A | 8/1996 | Keating et al. |
| 5,550,980 A | 8/1996 | Pascucci et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,559,947 A * | 9/1996 | Wugofski ............... 715/837 |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,369 A | 3/1997 | Sato et al. |
| 5,617,282 A | 4/1997 | Rall et al. |
| 5,621,662 A | 4/1997 | Humphries et al. |
| 5,628,201 A | 5/1997 | Bahel et al. |
| 5,630,325 A | 5/1997 | Bahel et al. |
| 5,631,825 A | 5/1997 | van Weele et al. |
| 5,634,590 A | 6/1997 | Gorski et al. |
| 5,675,756 A | 10/1997 | Benton et al. |
| 5,675,830 A | 10/1997 | Satula |
| 5,684,463 A | 11/1997 | Diercks et al. |
| 5,684,717 A | 11/1997 | Beilfuss et al. |
| 5,699,243 A | 12/1997 | Eckel et al. |
| 5,706,190 A | 1/1998 | Russ et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,737,529 A | 4/1998 | Dolin, Jr. et al. |
| 5,748,923 A | 5/1998 | Eitrich |
| 5,749,355 A | 5/1998 | Roan et al. |

(56) References Cited

U.S. PATENT DOCUMENTS

| | | |
|---|---|---|
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |
| 5,772,732 A | 6/1998 | James et al. |
| 5,774,322 A | 6/1998 | Walter et al. |
| 5,774,492 A | 6/1998 | Orlowsik, Jr. et al. |
| 5,774,493 A | 6/1998 | Ross |
| 5,777,837 A | 7/1998 | Eckel et al. |
| 5,782,296 A | 7/1998 | Mehta |
| 5,784,647 A | 7/1998 | Sugimoto |
| 5,786,993 A | 7/1998 | Frutiger et al. |
| 5,787,027 A | 7/1998 | Dolan et al. |
| 5,791,332 A | 8/1998 | Thompson et al. |
| 5,793,646 A | 8/1998 | Hibberd et al. |
| 5,801,942 A | 9/1998 | Nixon et al. |
| 5,802,485 A | 9/1998 | Koelle et al. |
| 5,803,357 A | 9/1998 | Lakin |
| 5,809,063 A | 9/1998 | Ashe et al. |
| 5,809,556 A | 9/1998 | Fujisawa et al. |
| 5,816,492 A | 10/1998 | Charles et al. |
| 5,818,347 A | 10/1998 | Dolan et al. |
| 5,819,845 A | 10/1998 | Ryu et al. |
| 5,822,512 A | 10/1998 | Goodrum et al. |
| 5,826,038 A | 10/1998 | Nakazumi |
| 5,829,674 A | 11/1998 | Vanostrand et al. |
| 5,841,654 A | 11/1998 | Verissimo et al. |
| 5,848,887 A | 12/1998 | Zabielski et al. |
| 5,854,744 A | 12/1998 | Zeng et al. |
| 5,855,006 A * | 12/1998 | Huemoeller et al. ............ 705/5 |
| 5,856,972 A | 1/1999 | Riley et al. |
| 5,860,411 A | 1/1999 | Thompson et al. |
| 5,860,473 A | 1/1999 | Seiden |
| 5,862,052 A | 1/1999 | Nixon et al. |
| 5,862,411 A | 1/1999 | Kay et al. |
| 5,864,581 A | 1/1999 | Alger-Meunier et al. |
| 5,873,519 A | 2/1999 | Beilfuss |
| 5,878,236 A | 3/1999 | Kleineberg et al. |
| 5,883,627 A | 3/1999 | Pleyer |
| 5,884,072 A | 3/1999 | Rasmussen |
| 5,892,690 A | 4/1999 | Boatman et al. |
| 5,896,304 A | 4/1999 | Tiemann et al. |
| 5,900,674 A | 5/1999 | Wojnarowski et al. |
| 5,903,454 A | 5/1999 | Hoffberg et al. |
| 5,912,877 A | 6/1999 | Shirai et al. |
| 5,914,453 A | 6/1999 | James et al. |
| 5,915,101 A | 6/1999 | Kleineberg et al. |
| 5,915,473 A | 6/1999 | Ganesh et al. |
| 5,924,486 A | 7/1999 | Ehlers et al. |
| 5,927,398 A | 7/1999 | Maciulewicz |
| 5,930,249 A | 7/1999 | Stademann et al. |
| 5,933,655 A | 8/1999 | Vrabec et al. |
| 5,934,554 A | 8/1999 | Charles et al. |
| 5,937,942 A | 8/1999 | Bias et al. |
| 5,946,209 A | 8/1999 | Eckel et al. |
| 5,971,597 A | 10/1999 | Baldwin et al. |
| 5,973,594 A | 10/1999 | Baldwin et al. |
| 5,983,353 A | 11/1999 | McHann, Jr. |
| 5,983,646 A | 11/1999 | Grothe et al. |
| 5,988,157 A | 11/1999 | Brown et al. |
| 5,993,195 A | 11/1999 | Thompson |
| 6,006,142 A | 12/1999 | Seem et al. |
| 6,011,821 A | 1/2000 | Sauer et al. |
| 6,021,252 A | 2/2000 | Faris et al. |
| 6,028,864 A | 2/2000 | Marttinen et al. |
| 6,032,178 A | 2/2000 | Bacigalupo et al. |
| 6,035,024 A | 3/2000 | Stumer |
| 6,046,410 A | 4/2000 | Wojnarowski et al. |
| 6,049,817 A | 4/2000 | Schoen et al. |
| 6,052,525 A | 4/2000 | Carlson et al. |
| 6,053,416 A | 4/2000 | Specht et al. |
| 6,061,600 A | 5/2000 | Ying |
| 6,061,603 A | 5/2000 | Papadopoulos et al. |
| 6,078,660 A | 6/2000 | Burgess |
| 6,081,750 A * | 6/2000 | Hoffberg et al. ............ 700/17 |
| 6,082,894 A | 7/2000 | Batko et al. |
| 6,092,280 A | 7/2000 | Wojnarowski |
| 6,095,674 A | 8/2000 | Verissimo et al. |
| 6,098,116 A | 8/2000 | Nixon et al. |
| 6,101,824 A | 8/2000 | Meyer et al. |
| 6,110,260 A | 8/2000 | Kubokawa |
| 6,115,713 A | 9/2000 | Pascucci et al. |
| 6,138,227 A | 10/2000 | Thewes et al. |
| 6,141,595 A | 10/2000 | Gloudeman et al. |
| 6,145,501 A | 11/2000 | Manohar et al. |
| 6,145,751 A | 11/2000 | Ahmed |
| 6,147,601 A | 11/2000 | Sandelman et al. |
| 6,151,298 A | 11/2000 | Bernhardsson et al. |
| 6,151,529 A | 11/2000 | Batko |
| 6,151,625 A | 11/2000 | Swales et al. |
| 6,151,650 A | 11/2000 | Birzer |
| 6,155,341 A | 12/2000 | Thompson et al. |
| 6,160,477 A | 12/2000 | Sandelman et al. |
| 6,160,484 A | 12/2000 | Spahl et al. |
| 6,160,795 A | 12/2000 | Hosemann |
| 6,167,338 A | 12/2000 | De Wille et al. |
| 6,169,937 B1 | 1/2001 | Peterson |
| 6,169,964 B1 | 1/2001 | Aisa et al. |
| 6,177,945 B1 | 1/2001 | Pleyer |
| 6,179,213 B1 | 1/2001 | Gibino et al. |
| 6,182,130 B1 | 1/2001 | Dolin, Jr. et al. |
| 6,188,642 B1 | 2/2001 | Schoniger et al. |
| 6,190,442 B1 | 2/2001 | Redner |
| 6,192,282 B1 * | 2/2001 | Smith et al. ............ 700/19 |
| 6,208,905 B1 | 3/2001 | Giddings et al. |
| 6,208,924 B1 | 3/2001 | Bauer |
| 6,211,782 B1 | 4/2001 | Sandelman et al. |
| 6,216,066 B1 | 4/2001 | Goebel et al. |
| 6,227,191 B1 | 5/2001 | Garloch |
| 6,232,604 B1 | 5/2001 | McDaniel et al. |
| 6,237,113 B1 | 5/2001 | Daiber |
| 6,241,156 B1 | 6/2001 | Kline et al. |
| 6,252,890 B1 | 6/2001 | Alger-Meunier et al. |
| 6,254,009 B1 | 7/2001 | Proffitt et al. |
| 6,266,205 B1 | 7/2001 | Schreck et al. |
| 6,269,127 B1 | 7/2001 | Richards |
| 6,271,845 B1 | 8/2001 | Richardson |
| 6,282,454 B1 | 8/2001 | Papadopoulos et al. |
| 6,285,912 B1 | 9/2001 | Ellison et al. |
| 6,292,518 B1 | 9/2001 | Grabb et al. |
| 6,298,376 B1 | 10/2001 | Rosner et al. |
| 6,298,454 B1 | 10/2001 | Schleiss et al. |
| 6,298,551 B1 | 10/2001 | Wojnarowski et al. |
| 6,304,557 B1 | 10/2001 | Nakazumi |
| 6,307,331 B1 | 10/2001 | Bonasia et al. |
| 6,324,008 B1 | 11/2001 | Baldwin et al. |
| 6,324,854 B1 | 12/2001 | Jayanth |
| 6,336,065 B1 | 1/2002 | Gibson et al. |
| 6,343,236 B1 | 1/2002 | Gibson et al. |
| 6,349,306 B1 | 2/2002 | Malik et al. |
| 6,349,883 B1 | 2/2002 | Simmons et al. |
| 6,353,775 B1 | 3/2002 | Nichols |
| 6,377,283 B1 * | 4/2002 | Thomas ............ 715/762 |
| 6,385,510 B1 | 5/2002 | Hoog et al. |
| 6,390,806 B1 | 5/2002 | Dempsey et al. |
| 6,393,023 B1 | 5/2002 | Shimizu et al. |
| 6,400,996 B1 | 6/2002 | Hoffberg et al. |
| 6,405,104 B1 | 6/2002 | Dougherty |
| 6,408,228 B1 | 6/2002 | Seem et al. |
| 6,411,701 B1 | 6/2002 | Stademann |
| 6,412,435 B1 | 7/2002 | Timmons, Jr. |
| 6,415,395 B1 | 7/2002 | Varma et al. |
| 6,418,507 B1 | 7/2002 | Fackler |
| 6,423,118 B1 | 7/2002 | Becerra et al. |
| 6,424,872 B1 | 7/2002 | Glanzer et al. |
| 6,424,874 B1 | 7/2002 | Cofer |
| 6,427,454 B1 | 8/2002 | West |
| 6,429,845 B1 | 8/2002 | Unseld et al. |
| 6,430,953 B2 | 8/2002 | Roh |
| 6,434,715 B1 | 8/2002 | Andersen |
| 6,435,418 B1 | 8/2002 | Toth et al. |
| 6,437,691 B1 | 8/2002 | Sandelman et al. |

(56) References Cited

U.S. PATENT DOCUMENTS

| | | |
|---|---|---|
| 6,437,805 B1 | 8/2002 | Sojoodi et al. |
| 6,441,723 B1 | 8/2002 | Mansfield, Jr. et al. |
| 6,442,952 B2 | 9/2002 | Roh et al. |
| 6,448,896 B1 | 9/2002 | Bankus et al. |
| 6,449,315 B2 | 9/2002 | Richards |
| 6,450,409 B1 | 9/2002 | Rowlette et al. |
| 6,453,374 B1 | 9/2002 | Kovalan et al. |
| 6,454,177 B1 | 9/2002 | Sasao et al. |
| 6,462,654 B1 | 10/2002 | Sandelman et al. |
| 6,478,084 B1 | 11/2002 | Kumar et al. |
| 6,493,661 B1 | 12/2002 | White, III et al. |
| 6,497,570 B1 | 12/2002 | Sears et al. |
| 6,498,844 B1 | 12/2002 | Stademann |
| 6,501,995 B1 | 12/2002 | Kinney et al. |
| 6,504,338 B1 | 1/2003 | Eichorn |
| 6,505,087 B1 | 1/2003 | Lucs et al. |
| 6,508,407 B1 | 1/2003 | Lefkowitz et al. |
| 6,526,122 B2 | 2/2003 | Matsushita et al. |
| 6,535,123 B2 | 3/2003 | Sandelman et al. |
| 6,535,138 B1 | 3/2003 | Dolan et al. |
| 6,539,489 B1 | 3/2003 | Reinert |
| 6,540,148 B1 | 4/2003 | Salsbury et al. |
| 6,542,462 B1 | 4/2003 | Sohraby et al. |
| 6,543,007 B1 | 4/2003 | Bliley et al. |
| 6,545,660 B1 | 4/2003 | Shen et al. |
| 6,546,008 B1 | 4/2003 | Wehrend |
| 6,552,647 B1 | 4/2003 | Thiessen et al. |
| 6,554,198 B1 | 4/2003 | Hull et al. |
| 6,560,976 B2 | 5/2003 | Jayanth |
| 6,567,476 B2 | 5/2003 | Kohl et al. |
| 6,572,363 B1 | 6/2003 | Virgil, Jr. et al. |
| 6,574,215 B2 | 6/2003 | Hummel |
| 6,574,234 B1 | 6/2003 | Myer et al. |
| 6,574,581 B1 | 6/2003 | Bohrer et al. |
| 6,575,233 B1 | 6/2003 | Krumnow |
| 6,580,950 B1 | 6/2003 | Johnson et al. |
| 6,587,039 B1 | 7/2003 | Woestemeyer et al. |
| 6,587,739 B1 | 7/2003 | Abrams et al. |
| 6,587,884 B1 | 7/2003 | Papadopoulos et al. |
| 6,594,272 B1 | 7/2003 | Ketcham et al. |
| 6,595,430 B1 | 7/2003 | Shah |
| 6,600,923 B1 | 7/2003 | Dzuban |
| 6,608,560 B2 | 8/2003 | Abrams |
| 6,609,127 B1 | 8/2003 | Lee et al. |
| 6,615,088 B1 | 9/2003 | Myer et al. |
| 6,615,594 B2 | 9/2003 | Jayanth et al. |
| 6,618,039 B1 * | 9/2003 | Grant et al. ............ 345/168 |
| 6,618,394 B1 | 9/2003 | Hilleary |
| 6,619,555 B2 | 9/2003 | Rosen |
| 6,621,507 B1 | 9/2003 | Shah |
| 6,622,926 B1 | 9/2003 | Sartain et al. |
| 6,628,993 B1 | 9/2003 | Bauer |
| 6,633,781 B1 | 10/2003 | Lee et al. |
| 6,636,771 B1 | 10/2003 | Varma et al. |
| 6,640,145 B2 | 10/2003 | Hoffberg et al. |
| 6,640,890 B1 | 11/2003 | Dage et al. |
| 6,643,689 B2 | 11/2003 | Rode et al. |
| 6,644,557 B1 | 11/2003 | Jacobs |
| 6,647,317 B2 | 11/2003 | Takai et al. |
| 6,650,949 B1 | 11/2003 | Fera et al. |
| 6,651,034 B1 | 11/2003 | Hedlund et al. |
| 6,658,373 B2 | 12/2003 | Rossi et al. |
| RE38,406 E | 1/2004 | Faris et al. |
| 6,681,215 B2 | 1/2004 | Jammu |
| 6,688,387 B1 | 2/2004 | Wellington et al. |
| 6,704,688 B2 | 3/2004 | Aslam et al. |
| 6,708,239 B1 | 3/2004 | Ellerbrock et al. |
| 6,715,120 B1 | 3/2004 | Hladik et al. |
| 6,715,302 B2 | 4/2004 | Ferragut, II |
| 6,715,690 B2 | 4/2004 | Hull et al. |
| 6,717,513 B1 | 4/2004 | Sandelman et al. |
| 6,717,919 B1 | 4/2004 | Ketcham et al. |
| 6,718,384 B2 | 4/2004 | Linzy |
| 6,722,143 B2 | 4/2004 | Moon et al. |
| 6,725,180 B2 | 4/2004 | Mayer et al. |
| 6,725,398 B1 | 4/2004 | Varma et al. |
| 6,728,369 B2 | 4/2004 | Burgess |
| 6,732,191 B1 | 5/2004 | Baker et al. |
| 6,735,196 B1 | 5/2004 | Manzardo |
| 6,735,282 B2 | 5/2004 | Matsushita et al. |
| 6,735,965 B2 | 5/2004 | Moon et al. |
| 6,738,676 B2 | 5/2004 | Hirayama |
| 6,741,915 B2 * | 5/2004 | Poth ............................ 700/276 |
| 6,744,771 B1 | 6/2004 | Barber et al. |
| 6,745,106 B2 | 6/2004 | Howard et al. |
| 6,747,888 B2 | 6/2004 | Klein |
| 6,758,050 B2 | 7/2004 | Jayanth et al. |
| 6,758,051 B2 | 7/2004 | Jayanth et al. |
| 6,763,040 B1 | 7/2004 | Hite et al. |
| 6,763,272 B2 | 7/2004 | Knepper |
| 6,765,993 B2 | 7/2004 | Cueman |
| 6,768,732 B1 | 7/2004 | Neuhaus |
| 6,774,786 B1 | 8/2004 | Havekost et al. |
| 6,779,176 B1 | 8/2004 | Chambers, II et al. |
| 6,783,079 B2 | 8/2004 | Carey et al. |
| 6,789,739 B2 | 9/2004 | Rosen |
| 6,791,530 B2 | 9/2004 | Vernier et al. |
| 6,795,935 B1 | 9/2004 | Unkle et al. |
| 6,798,341 B1 | 9/2004 | Eckel et al. |
| 6,801,524 B2 | 10/2004 | Eteminan |
| 6,804,564 B2 | 10/2004 | Crispin et al. |
| 6,810,333 B2 | 10/2004 | Adedeji et al. |
| 6,814,299 B1 | 11/2004 | Carey |
| 6,814,660 B1 | 11/2004 | Cavett |
| 6,816,071 B2 | 11/2004 | Conti |
| 6,817,757 B1 | 11/2004 | Wallace |
| 6,819,802 B2 | 11/2004 | Higgs et al. |
| 6,822,202 B2 | 11/2004 | Atlas |
| 6,823,680 B2 | 11/2004 | Jayanth |
| 6,824,069 B2 | 11/2004 | Rosen |
| 6,826,454 B2 | 11/2004 | Sulfstede |
| 6,826,590 B1 | 11/2004 | Glanzer et al. |
| 6,832,118 B1 | 12/2004 | Heberlein et al. |
| 6,833,844 B1 | 12/2004 | Shiota et al. |
| 6,840,052 B2 | 1/2005 | Smith et al. |
| 6,842,117 B2 | 1/2005 | Keown |
| 6,842,808 B2 | 1/2005 | Weigl et al. |
| 6,845,918 B2 | 1/2005 | Rotondo |
| 6,850,992 B2 | 2/2005 | Heinrich et al. |
| 6,851,948 B2 | 2/2005 | Dempsey et al. |
| 6,853,291 B1 | 2/2005 | Aisa |
| 6,854,444 B2 | 2/2005 | Plagge et al. |
| 6,865,449 B2 | 3/2005 | Dudley |
| 6,865,596 B1 | 3/2005 | Barber et al. |
| 6,865,898 B2 | 3/2005 | Yamanashi et al. |
| 6,866,375 B2 | 3/2005 | Leighton et al. |
| 6,868,292 B2 | 3/2005 | Ficco et al. |
| 6,868,900 B2 | 3/2005 | Dage et al. |
| 6,874,693 B2 | 4/2005 | Readio et al. |
| 6,876,891 B1 | 4/2005 | Schuler et al. |
| 6,879,881 B1 | 4/2005 | Attridge, Jr. |
| 6,888,441 B2 | 5/2005 | Carey |
| 6,892,121 B2 | 5/2005 | Schmidt |
| 6,894,703 B2 | 5/2005 | Vernier et al. |
| 6,900,808 B2 | 5/2005 | Lassiter et al. |
| 6,901,316 B1 | 5/2005 | Jensen et al. |
| 6,901,439 B1 | 5/2005 | Bonasia et al. |
| 6,907,329 B2 | 6/2005 | Junger et al. |
| 6,909,948 B2 | 6/2005 | Mollmann et al. |
| 6,914,893 B2 | 7/2005 | Petite |
| 6,918,064 B2 | 7/2005 | Mueller et al. |
| 6,920,318 B2 | 7/2005 | Brooking et al. |
| 6,925,360 B2 | 8/2005 | Yoon et al. |
| 6,931,645 B2 | 8/2005 | Murching et al. |
| 6,938,106 B2 | 8/2005 | Ellerbrock et al. |
| 6,941,193 B2 | 9/2005 | Frecska et al. |
| 6,944,785 B2 | 9/2005 | Gadir et al. |
| 6,954,680 B2 | 10/2005 | Kreidler et al. |
| 6,955,060 B2 | 10/2005 | Homan et al. |
| 6,955,302 B2 | 10/2005 | Erdman, Jr. |
| 6,956,424 B2 | 10/2005 | Hohnel |
| 6,957,696 B1 | 10/2005 | Krumnow |
| 6,963,288 B2 | 11/2005 | Sokol et al. |
| 6,963,922 B2 | 11/2005 | Papadopoulos et al. |

(56) References Cited

U.S. PATENT DOCUMENTS

| | | |
|---|---|---|
| 6,965,802 B2 | 11/2005 | Sexton |
| 6,967,565 B2 | 11/2005 | Lingemann |
| 6,968,295 B1 | 11/2005 | Carr |
| 6,973,366 B2 | 12/2005 | Komai |
| 6,975,219 B2 | 12/2005 | Eryurek et al. |
| 6,975,913 B2 | 12/2005 | Kreidler et al. |
| 6,975,958 B2 | 12/2005 | Bohrer et al. |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,002,462 B2 | 2/2006 | Welch |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |
| 7,020,798 B2 | 3/2006 | Meng et al. |
| 7,022,008 B1 | 4/2006 | Crocker |
| 7,024,282 B2 | 4/2006 | Coogan et al. |
| 7,024,283 B2 | 4/2006 | Bicknell |
| 7,025,281 B2 | 4/2006 | DeLuca |
| 7,027,808 B2 | 4/2006 | Wesby |
| 7,029,391 B2 | 4/2006 | Nagaya et al. |
| 7,031,880 B1 | 4/2006 | Seem et al. |
| 7,032,018 B2 | 4/2006 | Lee et al. |
| 7,035,719 B2 | 4/2006 | Howard et al. |
| 7,035,898 B1 | 4/2006 | Baker |
| 7,036,743 B2 | 5/2006 | Shah |
| 7,043,339 B2 | 5/2006 | Maeda et al. |
| 7,044,397 B2 | 5/2006 | Bartlett et al. |
| 7,047,092 B2 * | 5/2006 | Wimsatt .................. 700/83 |
| 7,051,282 B2 | 5/2006 | Marcjan |
| 7,055,759 B2 | 6/2006 | Wacker et al. |
| 7,058,459 B2 | 6/2006 | Weiberle et al. |
| 7,058,477 B1 | 6/2006 | Rosen |
| 7,058,693 B1 | 6/2006 | Baker, Jr. |
| 7,058,737 B2 | 6/2006 | Ellerbrock et al. |
| 7,062,927 B2 | 6/2006 | Kwon et al. |
| 7,068,612 B2 | 6/2006 | Berkcan et al. |
| 7,076,962 B2 | 7/2006 | He et al. |
| 7,082,339 B2 | 7/2006 | Murray et al. |
| 7,082,352 B2 | 7/2006 | Lim |
| 7,083,109 B2 | 8/2006 | Pouchak |
| 7,085,626 B2 | 8/2006 | Harrod et al. |
| 7,085,814 B1 | 8/2006 | Gandhi et al. |
| 7,089,087 B2 | 8/2006 | Dudley |
| 7,089,088 B2 | 8/2006 | Terry et al. |
| 7,089,530 B1 | 8/2006 | Dardinski et al. |
| 7,092,768 B1 | 8/2006 | Labuda |
| 7,092,772 B2 | 8/2006 | Murray et al. |
| 7,092,794 B1 | 8/2006 | Hill et al. |
| 7,096,078 B2 | 8/2006 | Burr et al. |
| 7,096,285 B2 | 8/2006 | Ellerbrock et al. |
| 7,096,465 B1 | 8/2006 | Dardinski et al. |
| 7,099,965 B2 | 8/2006 | Ellerbrock et al. |
| 7,100,382 B2 | 9/2006 | Butler et al. |
| 7,103,000 B1 | 9/2006 | Rode et al. |
| 7,103,016 B1 | 9/2006 | Duffy et al. |
| 7,103,420 B2 | 9/2006 | Brown et al. |
| 7,110,835 B2 | 9/2006 | Blevins et al. |
| 7,114,088 B2 | 9/2006 | Horbelt |
| 7,114,554 B2 | 10/2006 | Bergman et al. |
| 7,117,050 B2 | 10/2006 | Sasaki et al. |
| 7,117,051 B2 | 10/2006 | Landry et al. |
| 7,117,395 B2 | 10/2006 | Opaterny |
| 7,120,036 B2 | 10/2006 | Kyono |
| 7,123,428 B2 | 10/2006 | Yeo et al. |
| 7,123,774 B2 | 10/2006 | Dhavala et al. |
| 7,127,305 B1 | 10/2006 | Palmon |
| 7,127,327 B1 | 10/2006 | O'Donnell et al. |
| 7,130,409 B2 | 10/2006 | Beyda |
| 7,130,719 B2 | 10/2006 | Ehlers et al. |
| 7,133,407 B2 | 11/2006 | Jinzaki et al. |
| 7,133,748 B2 | 11/2006 | Robinson |
| 7,133,749 B2 | 11/2006 | Goldberg et al. |
| 7,135,982 B2 | 11/2006 | Lee |
| 7,139,550 B2 | 11/2006 | Cuellar et al. |
| 7,142,948 B2 | 11/2006 | Metz |
| 7,146,230 B2 | 12/2006 | Glanzer et al. |
| 7,146,231 B2 | 12/2006 | Schleiss et al. |
| 7,146,253 B2 | 12/2006 | Hoog et al. |
| 7,150,408 B2 | 12/2006 | DeLuca |
| 7,155,318 B2 | 12/2006 | Sharma et al. |
| 7,155,499 B2 | 12/2006 | Soemo et al. |
| 7,156,316 B2 | 1/2007 | Kates |
| 7,162,512 B1 | 1/2007 | Amit et al. |
| 7,162,883 B2 | 1/2007 | Jayanth et al. |
| 7,163,156 B2 | 1/2007 | Kates |
| 7,163,158 B2 | 1/2007 | Rossi et al. |
| 7,167,762 B2 | 1/2007 | Glanzer et al. |
| 7,168,627 B2 | 1/2007 | Kates |
| 7,171,579 B2 | 1/2007 | Weigl et al. |
| 7,172,132 B2 | 2/2007 | Proffitt et al. |
| 7,174,239 B2 | 2/2007 | Butler et al. |
| 7,174,728 B2 | 2/2007 | Jayanth |
| 7,175,086 B2 | 2/2007 | Gascoyne et al. |
| 7,175,098 B2 | 2/2007 | DeLuca |
| 7,177,926 B2 | 2/2007 | Kramer |
| 7,181,317 B2 | 2/2007 | Amundson et al. |
| 7,185,262 B2 | 2/2007 | Barthel et al. |
| 7,186,290 B2 | 3/2007 | Sheehan et al. |
| 7,187,354 B2 | 3/2007 | Min et al. |
| 7,187,986 B2 | 3/2007 | Johnson et al. |
| 7,188,002 B2 | 3/2007 | Chapman, Jr. et al. |
| 7,188,207 B2 | 3/2007 | Mitter |
| 7,188,482 B2 | 3/2007 | Sadegh et al. |
| 7,188,779 B2 | 3/2007 | Alles |
| 7,191,028 B2 | 3/2007 | Nomura et al. |
| 7,194,663 B2 | 3/2007 | Fletcher et al. |
| 7,195,211 B2 | 3/2007 | Kande et al. |
| 7,197,717 B2 | 3/2007 | Anderson et al. |
| 7,200,450 B2 | 4/2007 | Boyer et al. |
| 7,203,165 B1 | 4/2007 | Kowalewski |
| 7,203,575 B2 | 4/2007 | Maturana et al. |
| 7,203,776 B2 | 4/2007 | Junger et al. |
| 7,206,646 B2 | 4/2007 | Nixon et al. |
| 7,206,647 B2 | 4/2007 | Kumar |
| 7,209,485 B2 | 4/2007 | Guse |
| 7,209,748 B2 | 4/2007 | Wong et al. |
| 7,212,825 B2 | 5/2007 | Wong et al |
| 7,213,044 B2 | 5/2007 | Tjong et a |
| 7,216,016 B2 | 5/2007 | Van Ostrand et al. |
| 7,216,017 B2 | 5/2007 | Kwon et al. |
| 7,216,497 B2 | 5/2007 | Hull et al. |
| 7,218,589 B2 | 5/2007 | Wisnudel et al. |
| 7,218,996 B1 | 5/2007 | Beitelmal et al. |
| 7,219,141 B2 | 5/2007 | Bonasia et al. |
| 7,222,111 B1 | 5/2007 | Budike, Jr. |
| 7,222,152 B1 | 5/2007 | Thompson et al. |
| 7,222,493 B2 | 5/2007 | Jayanth et al. |
| 7,222,494 B2 | 5/2007 | Peterson et al. |
| 7,224,366 B2 | 5/2007 | Kessler et al. |
| 7,225,054 B2 | 5/2007 | Amundson et al. |
| 7,225,356 B2 | 5/2007 | Monitzer |
| 7,228,187 B2 | 6/2007 | Ticky et al. |
| 7,232,058 B2 | 6/2007 | Lee |
| 7,233,229 B2 | 6/2007 | Stroupe et al. |
| 7,239,623 B2 | 7/2007 | Burghardt et al. |
| 7,242,988 B1 | 7/2007 | Hoffberg et al. |
| 7,243,004 B2 | 7/2007 | Shah et al. |
| 7,244,294 B2 | 7/2007 | Kates |
| 7,246,753 B2 | 7/2007 | Hull et al. |
| 7,248,576 B2 | 7/2007 | Hoffmann |

(56) References Cited

U.S. PATENT DOCUMENTS

| | | | |
|---|---|---|---|
| 7,251,534 B2 | 7/2007 | Walls et al. | |
| 7,257,813 B1 | 8/2007 | Mayer et al. | |
| 7,259,666 B1 | 8/2007 | Hermsmeyer et al. | |
| 7,260,084 B2 | 8/2007 | Saller | |
| 7,260,451 B2 | 8/2007 | Takai et al. | |
| 7,260,609 B2 | 8/2007 | Fuehrer et al. | |
| 7,260,948 B2 | 8/2007 | Jayanth et al. | |
| 7,261,241 B2 | 8/2007 | Eoga | |
| 7,261,243 B2 | 8/2007 | Butler et al. | |
| 7,261,762 B2 | 8/2007 | Kang et al. | |
| 7,266,775 B2 | 9/2007 | Patitucci | |
| 7,266,960 B2 | 9/2007 | Shah | |
| 7,269,962 B2 | 9/2007 | Bachmann | |
| 7,272,154 B2 | 9/2007 | Loebig | |
| 7,272,452 B2 | 9/2007 | Coogan et al. | |
| 7,272,457 B2 | 9/2007 | Glanzer et al. | |
| 7,274,972 B2 | 9/2007 | Amundson et al. | |
| 7,274,973 B2 | 9/2007 | Nichols et al. | |
| 7,277,280 B2 | 10/2007 | Peng | |
| 7,277,970 B2 | 10/2007 | Ellerbrock et al. | |
| 7,278,103 B1 | 10/2007 | Clark et al. | |
| 7,287,062 B2 | 10/2007 | Im et al. | |
| 7,287,708 B2 | 10/2007 | Lucas et al. | |
| 7,287,709 B2 | 10/2007 | Proffitt et al. | |
| 7,289,458 B2 | 10/2007 | Gila et al. | |
| 7,292,900 B2 | 11/2007 | Kreidler et al. | |
| 7,293,422 B2 | 11/2007 | Parachini et al. | |
| 7,295,099 B2 | 11/2007 | Lee et al. | |
| 7,296,426 B2 | 11/2007 | Butler et al. | |
| 7,299,279 B2 | 11/2007 | Sadaghiany | |
| 7,299,996 B2 | 11/2007 | Garrett et al. | |
| 7,301,699 B2 | 11/2007 | Kanamori et al. | |
| 7,302,642 B2 * | 11/2007 | Smith et al. | 715/702 |
| 7,305,495 B2 | 12/2007 | Carter | |
| 7,306,165 B2 | 12/2007 | Shah | |
| 7,310,559 B2 | 12/2007 | Walko, Jr. | |
| 7,313,465 B1 | 12/2007 | O'Donnell | |
| 7,313,716 B2 | 12/2007 | Weigl et al. | |
| 7,313,923 B2 | 1/2008 | Jayanth et al. | |
| 7,315,768 B2 | 1/2008 | Dang et al. | |
| 7,317,970 B2 | 1/2008 | Pienta et al. | |
| 7,320,110 B2 | 1/2008 | Shah | |
| 7,324,874 B2 | 1/2008 | Jung | |
| 7,327,376 B2 | 2/2008 | Shen et al. | |
| 7,327,815 B1 | 2/2008 | Jurisch | |
| 7,330,512 B2 | 2/2008 | Frank et al. | |
| 7,331,191 B2 | 2/2008 | He et al. | |
| 7,334,161 B2 | 2/2008 | Williams et al. | |
| 7,336,650 B2 | 2/2008 | Franz et al. | |
| 7,337,369 B2 | 2/2008 | Barthel et al. | |
| 7,337,619 B2 | 3/2008 | Hsieh et al. | |
| 7,343,226 B2 | 3/2008 | Ehlers et al. | |
| 7,346,404 B2 | 3/2008 | Eryurek et al. | |
| 7,346,433 B2 | 3/2008 | Budike, Jr. | |
| 7,346,835 B1 | 3/2008 | Lobinger et al. | |
| 7,349,761 B1 | 3/2008 | Cruse | |
| 7,354,005 B2 | 4/2008 | Carey et al. | |
| 7,356,050 B2 | 4/2008 | Reindl et al. | |
| 7,359,335 B2 | 4/2008 | Knop et al. | |
| 7,359,345 B2 | 4/2008 | Chang et al. | |
| 7,360,002 B2 | 4/2008 | Brueckner et al. | |
| 7,360,370 B2 | 4/2008 | Shah et al. | |
| 7,360,717 B2 | 4/2008 | Shah | |
| 7,364,093 B2 | 4/2008 | Garozzo | |
| 7,365,812 B2 | 4/2008 | Lee | |
| 7,366,498 B2 | 4/2008 | Ko et al. | |
| 7,366,944 B2 | 4/2008 | Oshins et al. | |
| 7,370,074 B2 | 5/2008 | Alexander et al. | |
| 7,377,450 B2 | 5/2008 | Van Ostrand et al. | |
| 7,379,791 B2 * | 5/2008 | Tamarkin et al. | 700/286 |
| 7,379,997 B2 | 5/2008 | Ehlers et al. | |
| 7,383,158 B2 | 6/2008 | Krocker et al. | |
| 7,389,150 B2 | 6/2008 | Inoue et al. | |
| 7,389,204 B2 | 6/2008 | Eryurek et al. | |
| RE40,437 E | 7/2008 | Rosen et al. | |
| 7,392,661 B2 | 7/2008 | Alles | |
| 7,395,122 B2 | 7/2008 | Kreidler et al. | |
| 7,395,137 B2 | 7/2008 | Robinson | |
| 7,403,128 B2 | 7/2008 | Scuka et al. | |
| 7,412,839 B2 | 8/2008 | Jayanth | |
| 7,412,842 B2 | 8/2008 | Pham | |
| 7,418,428 B2 * | 8/2008 | Ehlers et al. | 705/63 |
| 7,424,345 B2 | 9/2008 | Norbeck | |
| D578,026 S | 10/2008 | Roher et al. | |
| 7,433,740 B2 | 10/2008 | Hesse et al. | |
| 7,434,744 B2 | 10/2008 | Garozzo et al. | |
| 7,436,292 B2 | 10/2008 | Rourke et al. | |
| 7,436,293 B2 | 10/2008 | Rourke et al. | |
| 7,436,296 B2 | 10/2008 | Rourke et al. | |
| 7,436,400 B2 | 10/2008 | Cheng | |
| 7,437,198 B2 | 10/2008 | Iwaki | |
| 7,439,862 B2 | 10/2008 | Quan | |
| 7,441,094 B2 | 10/2008 | Stephens | |
| 7,448,435 B2 | 11/2008 | Garozzo | |
| 7,451,937 B2 | 11/2008 | Flood et al. | |
| 7,454,269 B1 | 11/2008 | Dushane et al. | |
| 7,455,240 B2 | 11/2008 | Chapman, Jr. et al. | |
| 7,457,853 B1 | 11/2008 | Chari et al. | |
| 7,460,933 B2 | 12/2008 | Chapman, Jr. et al. | |
| 7,469,550 B2 | 12/2008 | Chapman, Jr. et al. | |
| 7,476,988 B2 | 1/2009 | Mulhouse et al. | |
| 7,516,106 B2 | 4/2009 | Ehlers et al. | |
| 7,526,364 B2 | 4/2009 | Rule et al. | |
| 7,567,844 B2 | 7/2009 | Thomas et al. | |
| 7,571,195 B2 | 8/2009 | Billingsley et al. | |
| 7,571,355 B2 | 8/2009 | Shabalin | |
| 7,584,897 B2 | 9/2009 | Schultz et al. | |
| 7,587,459 B2 | 9/2009 | Wewalaarachchi et al. | |
| 7,587,587 B2 | 9/2009 | Buer et al. | |
| 7,593,124 B1 | 9/2009 | Sheng et al. | |
| 7,593,787 B2 | 9/2009 | Feingold et al. | |
| 7,604,046 B2 | 10/2009 | Bergman et al. | |
| 7,624,931 B2 | 12/2009 | Chapman, Jr. et al. | |
| 7,641,126 B2 | 1/2010 | Schultz et al. | |
| 7,650,323 B2 | 1/2010 | Hese et al. | |
| 7,664,573 B2 | 2/2010 | Ahmed | |
| 7,693,583 B2 | 4/2010 | Wolff et al. | |
| 7,693,591 B2 | 4/2010 | Hoglund et al. | |
| 7,706,923 B2 | 4/2010 | Amundson et al. | |
| 7,734,572 B2 | 6/2010 | Wiemeyer et al. | |
| 7,747,757 B2 | 6/2010 | Gargiulo et al. | |
| 7,752,289 B2 | 7/2010 | Kikkawa et al. | |
| 7,761,563 B2 | 7/2010 | Shike et al. | |
| 7,774,102 B2 | 8/2010 | Butler et al. | |
| 7,797,349 B2 | 9/2010 | Kosaka | |
| 7,809,472 B1 | 10/2010 | Silva et al. | |
| 7,821,218 B2 | 10/2010 | Butler et al. | |
| 7,827,963 B2 | 11/2010 | Li et al. | |
| 7,847,790 B2 * | 12/2010 | Bewley et al. | 345/173 |
| 7,861,941 B2 | 1/2011 | Schultz et al. | |
| 7,870,080 B2 | 1/2011 | Budike, Jr. | |
| 7,904,209 B2 | 3/2011 | Podgorny et al. | |
| 7,934,504 B2 | 5/2011 | Lowe et al. | |
| 7,949,615 B2 | 5/2011 | Ehlers et al. | |
| 7,963,454 B2 | 6/2011 | Sullivan et al. | |
| 7,979,164 B2 | 7/2011 | Garozzo et al. | |
| 8,005,576 B2 | 8/2011 | Rodgers | |
| 8,024,054 B2 | 9/2011 | Mairs et al. | |
| 8,032,254 B2 | 10/2011 | Amundson et al. | |
| 8,042,049 B2 | 10/2011 | Killian et al. | |
| D648,641 S | 11/2011 | Wallaert et al. | |
| D648,642 S | 11/2011 | Wallaert et al. | |
| 8,050,801 B2 | 11/2011 | Richards et al. | |
| 8,082,068 B2 | 12/2011 | Rodgers | |
| 8,083,154 B2 | 12/2011 | Schultz et al. | |
| 8,087,593 B2 | 1/2012 | Leen | |
| 8,091,796 B2 | 1/2012 | Amundson et al. | |
| 8,099,178 B2 | 1/2012 | Mairs et al. | |
| 8,103,390 B2 | 1/2012 | Rodgers | |
| 8,112,181 B2 | 2/2012 | Remsburg | |
| 8,116,917 B2 | 2/2012 | Rodgers | |
| 8,122,110 B1 | 2/2012 | Wilbur et al. | |
| 8,127,060 B2 | 2/2012 | Doll et al. | |
| 8,138,690 B2 | 3/2012 | Chemel et al. | |

(56) References Cited

U.S. PATENT DOCUMENTS

| | | |
|---|---|---|
| 8,155,664 B2 | 4/2012 | McFarland |
| 8,167,216 B2 | 5/2012 | Schultz et al. |
| 8,183,995 B2 | 5/2012 | Wang et al. |
| 8,219,249 B2 | 7/2012 | Harrod et al. |
| 8,224,491 B2 | 7/2012 | Koster et al. |
| 8,232,745 B2 | 7/2012 | Chemel et al. |
| 8,239,066 B2 | 8/2012 | Jennings et al. |
| 8,249,579 B2 | 8/2012 | Nass et al. |
| 8,255,090 B2 | 8/2012 | Frader-Thompson et al. |
| 2001/0025349 A1 | 9/2001 | Sharood et al. |
| 2001/0034586 A1 | 10/2001 | Ewert et al. |
| 2001/0048376 A1 | 12/2001 | Maeda et al. |
| 2001/0055311 A1 | 12/2001 | Trachewsky et al. |
| 2002/0002425 A1* | 1/2002 | Dossey et al. ............ 700/284 |
| 2002/0013897 A1 | 1/2002 | McTernan et al. |
| 2002/0016639 A1 | 2/2002 | Smith et al. |
| 2002/0022894 A1 | 2/2002 | Eryurek et al. |
| 2002/0026476 A1 | 2/2002 | Miyazaki et al. |
| 2002/0033252 A1 | 3/2002 | Sasao et al. |
| 2002/0048194 A1 | 4/2002 | Klein |
| 2002/0072814 A1 | 6/2002 | Schuler et al. |
| 2002/0091784 A1 | 7/2002 | Baker et al. |
| 2002/0104323 A1 | 8/2002 | Raxh et al. |
| 2002/0116550 A1 | 8/2002 | Hansen |
| 2002/0123896 A1 | 9/2002 | Diez et al. |
| 2002/0124211 A1 | 9/2002 | Gray et al. |
| 2002/0143523 A1 | 10/2002 | Balaji et al. |
| 2002/0152298 A1 | 10/2002 | Kikta et al. |
| 2002/0157054 A1 | 10/2002 | Shin et al. |
| 2002/0163427 A1 | 11/2002 | Eryurek et al. |
| 2002/0178288 A1 | 11/2002 | McLeod |
| 2002/0190242 A1 | 12/2002 | lillie et al. |
| 2002/0191026 A1* | 12/2002 | Rodden et al. ............ 345/779 |
| 2002/0191603 A1 | 12/2002 | Shin et al. |
| 2003/0046557 A1* | 3/2003 | Miller et al. ............ 713/186 |
| 2003/0058863 A1 | 3/2003 | Oost |
| 2003/0061340 A1 | 3/2003 | Sun et al. |
| 2003/0078677 A1 | 4/2003 | Hull et al. |
| 2003/0088338 A1 | 5/2003 | Phillips et al. |
| 2003/0097482 A1 | 5/2003 | DeHart et al. |
| 2003/0108064 A1 | 6/2003 | Bilke et al. |
| 2003/0115177 A1 | 6/2003 | Takanabe et al. |
| 2003/0116637 A1 | 6/2003 | Ellingham |
| 2003/0154355 A1 | 8/2003 | Fernandez |
| 2003/0193481 A1* | 10/2003 | Sokolsky ............ 345/173 |
| 2003/0206100 A1 | 11/2003 | Richman et al. |
| 2003/0229784 A1 | 12/2003 | Cuellar et al. |
| 2004/0001478 A1 | 1/2004 | Wong |
| 2004/0003051 A1 | 1/2004 | Krzyzanowski et al. |
| 2004/0003415 A1 | 1/2004 | Ng |
| 2004/0039478 A1 | 2/2004 | Kiesel et al. |
| 2004/0059815 A1 | 3/2004 | Buckingham et al. |
| 2004/0066788 A1 | 4/2004 | Lin et al. |
| 2004/0088069 A1 | 5/2004 | Singh |
| 2004/0095237 A1 | 5/2004 | Chen et al. |
| 2004/0104942 A1 | 6/2004 | Weigel |
| 2004/0107717 A1 | 6/2004 | Yoon et al. |
| 2004/0111186 A1 | 6/2004 | Rossi et al. |
| 2004/0111254 A1 | 6/2004 | Gogel et al. |
| 2004/0117330 A1 | 6/2004 | Ehlers |
| 2004/0133314 A1 | 7/2004 | Ehlers et al. |
| 2004/0133704 A1 | 7/2004 | Krzyzanowski et al. |
| 2004/0139038 A1 | 7/2004 | Ehlers et al. |
| 2004/0143360 A1 | 7/2004 | Kiesel et al. |
| 2004/0146008 A1 | 7/2004 | Conradt et al. |
| 2004/0156360 A1 | 8/2004 | Sexton et al. |
| 2004/0159112 A1 | 8/2004 | Jayanth et al. |
| 2004/0189590 A1 | 9/2004 | Mehaffey et al. |
| 2004/0204775 A1 | 10/2004 | Keyes et al. |
| 2004/0205781 A1 | 10/2004 | Hill et al. |
| 2004/0206096 A1 | 10/2004 | Jayanth |
| 2004/0210348 A1 | 10/2004 | Imhof et al. |
| 2004/0218591 A1 | 11/2004 | Ogawa et al. |
| 2004/0222307 A1 | 11/2004 | DeLuca |
| 2004/0236471 A1 | 11/2004 | Poth |
| 2004/0245352 A1 | 12/2004 | Smith |
| 2004/0260427 A1 | 12/2004 | Wimsatt |
| 2004/0266491 A1 | 12/2004 | Howard et al. |
| 2004/0267395 A1 | 12/2004 | Discenzo et al. |
| 2004/0267790 A1 | 12/2004 | Pak et al. |
| 2005/0005249 A1 | 1/2005 | Hill et al. |
| 2005/0007249 A1 | 1/2005 | Eryurek et al. |
| 2005/0010759 A1 | 1/2005 | Wakiyama |
| 2005/0033707 A1 | 2/2005 | Ehlers et al. |
| 2005/0034023 A1 | 2/2005 | Maturana et al. |
| 2005/0040247 A1 | 2/2005 | Pouchak |
| 2005/0040250 A1 | 2/2005 | Wruck |
| 2005/0041033 A1 | 2/2005 | Hilts et al. |
| 2005/0041633 A1 | 2/2005 | Roeser et al. |
| 2005/0046584 A1 | 3/2005 | Breed |
| 2005/0051168 A1 | 3/2005 | DeVries et al. |
| 2005/0054381 A1 | 3/2005 | Lee et al. |
| 2005/0055427 A1 | 3/2005 | Frutiger et al. |
| 2005/0068978 A1 | 3/2005 | Sexton et al. |
| 2005/0073789 A1 | 4/2005 | Tanis |
| 2005/0076150 A1 | 4/2005 | Lee et al. |
| 2005/0080879 A1 | 4/2005 | Kim et al. |
| 2005/0081156 A1 | 4/2005 | Clark et al. |
| 2005/0081157 A1 | 4/2005 | Clark et al. |
| 2005/0090915 A1* | 4/2005 | Geiwitz ............ 700/90 |
| 2005/0096872 A1 | 5/2005 | Blevins et al. |
| 2005/0097478 A1* | 5/2005 | Killian et al. ............ 715/851 |
| 2005/0103874 A1 | 5/2005 | Erdman, Jr. |
| 2005/0109048 A1 | 5/2005 | Lee |
| 2005/0115254 A1 | 6/2005 | Knight et al. |
| 2005/0116023 A1 | 6/2005 | Amundson et al. |
| 2005/0118996 A1 | 6/2005 | Lee et al. |
| 2005/0119765 A1 | 6/2005 | Bergman et al. |
| 2005/0119766 A1 | 6/2005 | Amundson et al. |
| 2005/0119771 A1 | 6/2005 | Amundson et al. |
| 2005/0119793 A1 | 6/2005 | Amundson et al. |
| 2005/0119794 A1 | 6/2005 | Amundson et al. |
| 2005/0120012 A1 | 6/2005 | Poth et al. |
| 2005/0125495 A1 | 6/2005 | Tjong et al. |
| 2005/0143138 A1 | 6/2005 | Lee et al. |
| 2005/0145705 A1 | 7/2005 | Shah et al. |
| 2005/0150967 A1 | 7/2005 | Chapman, Jr. et al. |
| 2005/0159924 A1 | 7/2005 | Shah et al. |
| 2005/0161517 A1 | 7/2005 | Helt et al. |
| 2005/0166610 A1 | 8/2005 | Jayanth |
| 2005/0176410 A1 | 8/2005 | Brooking et al. |
| 2005/0182498 A1 | 8/2005 | Landou et al. |
| 2005/0192727 A1 | 9/2005 | Shostak et al. |
| 2005/0193155 A1 | 9/2005 | Fujita |
| 2005/0198040 A1 | 9/2005 | Cohen |
| 2005/0223339 A1 | 10/2005 | Lee |
| 2005/0229610 A1 | 10/2005 | Park et al. |
| 2005/0235661 A1 | 10/2005 | Pham |
| 2005/0235662 A1 | 10/2005 | Pham |
| 2005/0235663 A1 | 10/2005 | Pham |
| 2005/0235666 A1 | 10/2005 | Springer et al. |
| 2005/0240312 A1 | 10/2005 | Terry et al. |
| 2005/0256935 A1 | 11/2005 | Overstreet et al. |
| 2005/0258257 A1 | 11/2005 | Thurman, Jr. et al. |
| 2005/0270151 A1 | 12/2005 | Winick |
| 2005/0278071 A1 | 12/2005 | Durham, III |
| 2005/0280364 A1 | 12/2005 | Omura et al. |
| 2005/0281368 A1 | 12/2005 | Droba et al. |
| 2005/0288823 A1 | 12/2005 | Hesse et al. |
| 2006/0006244 A1 | 1/2006 | Morrow et al. |
| 2006/0009861 A1 | 1/2006 | Bonasia et al. |
| 2006/0009863 A1 | 1/2006 | Lingemann |
| 2006/0021358 A1 | 2/2006 | Nallapa |
| 2006/0021359 A1 | 2/2006 | Hur et al. |
| 2006/0030954 A1 | 2/2006 | Bergman et al. |
| 2006/0036350 A1 | 2/2006 | Bohrer et al. |
| 2006/0036952 A1 | 2/2006 | Yang |
| 2006/0041898 A1 | 2/2006 | Potyrailo et al. |
| 2006/0045107 A1 | 3/2006 | Kucenas et al. |
| 2006/0048064 A1 | 3/2006 | Vronay |
| 2006/0058924 A1 | 3/2006 | Shah |
| 2006/0090142 A1 | 4/2006 | Glasgow et al. |
| 2006/0090483 A1 | 5/2006 | Kim et al. |
| 2006/0091227 A1 | 5/2006 | Attridge, Jr. |

(56) References Cited

U.S. PATENT DOCUMENTS

| | | |
|---|---|---|
| 2006/0092977 A1 | 5/2006 | Bai et al. |
| 2006/0106791 A1 | 5/2006 | Morrow et al. |
| 2006/0108432 A1 | 5/2006 | Mattheis |
| 2006/0111816 A1 | 5/2006 | Spalink et al. |
| 2006/0130497 A1 | 6/2006 | Kang et al. |
| 2006/0144055 A1 | 7/2006 | Ahn |
| 2006/0144232 A1 | 7/2006 | Kang et al. |
| 2006/0149414 A1 | 7/2006 | Archacki, Jr. et al. |
| 2006/0150027 A1 | 7/2006 | Paden |
| 2006/0153247 A1 | 7/2006 | Stumer |
| 2006/0155398 A1 | 7/2006 | Hoffberg et al. |
| 2006/0158051 A1 | 7/2006 | Bartlett et al. |
| 2006/0159007 A1 | 7/2006 | Frutiger et al. |
| 2006/0168522 A1 | 7/2006 | Bala |
| 2006/0186214 A1 | 8/2006 | Simon et al. |
| 2006/0190138 A1 | 8/2006 | Stone et al. |
| 2006/0192021 A1 | 8/2006 | Schultz et al. |
| 2006/0196953 A1 | 9/2006 | Simon et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0202978 A1 | 9/2006 | Lee et al. |
| 2006/0206220 A1 | 9/2006 | Amundson |
| 2006/0209208 A1 | 9/2006 | Kim et al. |
| 2006/0212194 A1 | 9/2006 | Breed |
| 2006/0219799 A1 | 10/2006 | Schultz et al. |
| 2006/0229090 A1 | 10/2006 | LaDue |
| 2006/0235548 A1 | 10/2006 | Gaudette |
| 2006/0236351 A1 | 10/2006 | Ellerbrock et al. |
| 2006/0239296 A1 | 10/2006 | Jinzaki et al. |
| 2006/0248233 A1 | 11/2006 | Park et al. |
| 2006/0250578 A1 | 11/2006 | Pohl et al. |
| 2006/0250979 A1 | 11/2006 | Gauweiler et al. |
| 2006/0267756 A1 | 11/2006 | Kates |
| 2006/0276917 A1 | 12/2006 | Li et al. |
| 2007/0005191 A1 | 1/2007 | Sloup et al. |
| 2007/0008116 A1 | 1/2007 | Bergman et al. |
| 2007/0012052 A1 | 1/2007 | Butler et al. |
| 2007/0013534 A1 | 1/2007 | DiMaggio |
| 2007/0014233 A1 | 1/2007 | Oguro et al. |
| 2007/0016311 A1 | 1/2007 | Bergman et al. |
| 2007/0016476 A1 | 1/2007 | Hoffberg et al. |
| 2007/0019683 A1 | 1/2007 | Kryzyanowski |
| 2007/0025368 A1 | 2/2007 | Ha et al. |
| 2007/0032909 A1 | 2/2007 | Tolbert et al. |
| 2007/0033310 A1 | 2/2007 | Kweon |
| 2007/0035255 A1 | 2/2007 | Shuster et al. |
| 2007/0040040 A1 | 2/2007 | Mueller |
| 2007/0043478 A1 | 2/2007 | Ehlers et al. |
| 2007/0045429 A1 | 3/2007 | Chapman et al. |
| 2007/0045431 A1 | 3/2007 | Chapman et al. |
| 2007/0045442 A1 | 3/2007 | Chapman et al. |
| 2007/0051818 A1 | 3/2007 | Atlas |
| 2007/0053513 A1 | 3/2007 | Hoffberg |
| 2007/0055407 A1 | 3/2007 | Goldberg et al. |
| 2007/0055757 A1 | 3/2007 | Mairs et al. |
| 2007/0067062 A1 | 3/2007 | Mairs et al. |
| 2007/0067496 A1 | 3/2007 | Deiretsbacher et al. |
| 2007/0073973 A1 | 3/2007 | Hazay |
| 2007/0080235 A1 | 4/2007 | Fulton |
| 2007/0083721 A1 | 4/2007 | Grinspan |
| 2007/0084937 A1 | 4/2007 | Ahmed |
| 2007/0088883 A1 | 4/2007 | Wakabayashi |
| 2007/0089090 A1 | 4/2007 | Riedl et al. |
| 2007/0090199 A1 | 4/2007 | Hull et al. |
| 2007/0093226 A1 | 4/2007 | Foltyn et al. |
| 2007/0097993 A1 | 5/2007 | Bojahra et al. |
| 2007/0102149 A1 | 5/2007 | Kates |
| 2007/0109114 A1 | 5/2007 | Farley et al. |
| 2007/0109975 A1 | 5/2007 | Reckamp et al. |
| 2007/0113247 A1 | 5/2007 | Kwak |
| 2007/0114291 A1 | 5/2007 | Pouchak |
| 2007/0119957 A1 | 5/2007 | Kates |
| 2007/0119958 A1 | 5/2007 | Kates |
| 2007/0129820 A1 | 6/2007 | Glanzer et al. |
| 2007/0129825 A1 | 6/2007 | Kargenian |
| 2007/0129826 A1 | 6/2007 | Kreidler et al. |
| 2007/0129917 A1 | 6/2007 | Blevins et al. |
| 2007/0130834 A1 | 6/2007 | Kande et al. |
| 2007/0130969 A1 | 6/2007 | Peterson et al. |
| 2007/0135692 A1 | 6/2007 | Hwang et al. |
| 2007/0135946 A1 | 6/2007 | Sugiyama et al. |
| 2007/0136669 A1 | 6/2007 | Kwon et al. |
| 2007/0136687 A1 | 6/2007 | Pak |
| 2007/0138307 A1 | 6/2007 | Khoo |
| 2007/0138308 A1 | 6/2007 | Schultz et al. |
| 2007/0143704 A1 | 6/2007 | Laird-McConnell |
| 2007/0143707 A1 | 6/2007 | Yun et al. |
| 2007/0157016 A1 | 7/2007 | Dayan et al. |
| 2007/0158442 A1 | 7/2007 | Chapman et al. |
| 2007/0168887 A1 | 7/2007 | Lee |
| 2007/0177505 A1 | 8/2007 | Charrua et al. |
| 2007/0191024 A1 | 8/2007 | Kim et al. |
| 2007/0192731 A1 | 8/2007 | Townsend et al. |
| 2007/0204637 A1 | 9/2007 | Fujii et al. |
| 2007/0205297 A1 | 9/2007 | Finkam et al. |
| 2007/0208461 A1 | 9/2007 | Chase |
| 2007/0208549 A1 | 9/2007 | Blevins et al. |
| 2007/0213853 A1 | 9/2007 | Glanzer et al. |
| 2007/0220301 A1 | 9/2007 | Brundridge et al. |
| 2007/0220907 A1 | 9/2007 | Ehlers |
| 2007/0223500 A1 | 9/2007 | Lee et al. |
| 2007/0225868 A1 | 9/2007 | Terlson et al. |
| 2007/0225869 A1 | 9/2007 | Amundson et al. |
| 2007/0236156 A1 | 10/2007 | Lys et al. |
| 2007/0237032 A1 | 10/2007 | Rhee et al. |
| 2007/0238413 A1 | 10/2007 | Coutts |
| 2007/0239658 A1 | 10/2007 | Cunningham et al. |
| 2007/0240226 A1 | 10/2007 | Song et al. |
| 2007/0241203 A1 | 10/2007 | Wagner et al. |
| 2007/0242058 A1 | 10/2007 | Yamada |
| 2007/0245306 A1 | 10/2007 | Dameshek et al. |
| 2007/0257120 A1 | 11/2007 | Chapman et al. |
| 2007/0260782 A1 | 11/2007 | Shaikli |
| 2007/0260978 A1 | 11/2007 | Oh et al. |
| 2007/0266329 A1 | 11/2007 | Gaudette |
| 2007/0271521 A1 | 11/2007 | Harriger et al. |
| 2007/0274093 A1 | 11/2007 | Haim et al. |
| 2007/0277013 A1 | 11/2007 | Rexha et al. |
| 2007/0278320 A1* | 12/2007 | Lunacek et al. ............. 236/94 |
| 2007/0284452 A1 | 12/2007 | Butler et al. |
| 2007/0288208 A1 | 12/2007 | Grigsby et al. |
| 2007/0299857 A1 | 12/2007 | Gwozdz et al. |
| 2007/0300064 A1 | 12/2007 | Isaacs et al. |
| 2008/0004727 A1 | 1/2008 | Glanzer et al. |
| 2008/0005428 A1 | 1/2008 | Maul et al. |
| 2008/0006709 A1 | 1/2008 | Ashworth et al. |
| 2008/0029610 A1 | 2/2008 | Nichols |
| 2008/0031147 A1 | 2/2008 | Fieremans et al. |
| 2008/0040351 A1 | 2/2008 | Jin et al. |
| 2008/0048045 A1 | 2/2008 | Butler et al. |
| 2008/0048046 A1 | 2/2008 | Wagner et al. |
| 2008/0054082 A1 | 3/2008 | Evans et al. |
| 2008/0055190 A1 | 3/2008 | Lee |
| 2008/0056722 A1 | 3/2008 | Hendrix et al. |
| 2008/0057872 A1 | 3/2008 | McFarland et al. |
| 2008/0058996 A1 | 3/2008 | Sachdev et al. |
| 2008/0059682 A1 | 3/2008 | Cooley et al. |
| 2008/0062892 A1 | 3/2008 | Dodgen et al. |
| 2008/0063006 A1 | 3/2008 | Nichols |
| 2008/0065926 A1 | 3/2008 | Poth et al. |
| 2008/0072704 A1 | 3/2008 | Clark et al. |
| 2008/0073440 A1 | 3/2008 | Butler et al. |
| 2008/0077884 A1 | 3/2008 | Patitucci |
| 2008/0077886 A1 | 3/2008 | Eichner |
| 2008/0083009 A1 | 4/2008 | Kaler et al. |
| 2008/0083834 A1 | 4/2008 | Krebs et al. |
| 2008/0097651 A1 | 4/2008 | Shah et al. |
| 2008/0104189 A1 | 5/2008 | Baker et al. |
| 2008/0114500 A1 | 5/2008 | Hull et al. |
| 2008/0120335 A1 | 5/2008 | Dolgoff |
| 2008/0121729 A1 | 5/2008 | Gray |
| 2008/0128523 A1 | 6/2008 | Hoglund et al. |

(56) References Cited

U.S. PATENT DOCUMENTS

| | | |
|---|---|---|
| 2008/0129475 A1 | 6/2008 | Breed et al. |
| 2008/0133033 A1 | 6/2008 | Wolff et al. |
| 2008/0133060 A1 | 6/2008 | Hoglund et al. |
| 2008/0133061 A1 | 6/2008 | Hoglund et al. |
| 2008/0134087 A1 | 6/2008 | Hoglund et al. |
| 2008/0134098 A1 | 6/2008 | Hoglund et al. |
| 2008/0148098 A1 | 6/2008 | Chen |
| 2008/0157936 A1 | 7/2008 | Ebrom |
| 2008/0161977 A1 | 7/2008 | Takach et al. |
| 2008/0161978 A1 | 7/2008 | Shah |
| 2008/0168255 A1 | 7/2008 | Abouo-Emara et al. |
| 2008/0168356 A1 | 7/2008 | Eryurek et al. |
| 2008/0183335 A1 | 7/2008 | Poth et al. |
| 2008/0184059 A1 | 7/2008 | Chen |
| 2008/0185976 A1 | 8/2008 | Dickey et al. |
| 2008/0186160 A1 | 8/2008 | Kim et al. |
| 2008/0195254 A1 | 8/2008 | Jung et al. |
| 2008/0195687 A1 | 8/2008 | Jung et al. |
| 2008/0198036 A1 | 8/2008 | Songkakul et al. |
| 2008/0215987 A1 | 9/2008 | Alexander et al. |
| 2008/0217418 A1 | 9/2008 | Helt et al. |
| 2008/0217419 A1 | 9/2008 | Ehlers et al. |
| 2008/0223944 A1 | 9/2008 | Helt et al. |
| 2008/0256475 A1 | 10/2008 | Amundson et al. |
| 2008/0264085 A1 | 10/2008 | Perry et al. |
| 2008/0272934 A1 | 11/2008 | Wang et al. |
| 2008/0281472 A1 | 11/2008 | Podgorny et al. |
| 2008/0294274 A1 | 11/2008 | Laberge et al. |
| 2008/0294932 A1 | 11/2008 | Oshins et al. |
| 2009/0001180 A1 | 1/2009 | Siddaramanna et al. |
| 2009/0001182 A1 | 1/2009 | Siddaramanna et al. |
| 2009/0049847 A1 | 2/2009 | Butler et al. |
| 2009/0055002 A1 | 2/2009 | Anderson et al. |
| 2009/0057424 A1 | 3/2009 | Sullivan et al. |
| 2009/0057425 A1 | 3/2009 | Sullivan et al. |
| 2009/0094506 A1 | 4/2009 | Lakkis |
| 2009/0105846 A1 | 4/2009 | Hesse et al. |
| 2009/0113037 A1 | 4/2009 | Pouchak |
| 2009/0119092 A1 | 5/2009 | Balasubramanyan et al. |
| 2009/0132091 A1 | 5/2009 | Chambers et al. |
| 2009/0140057 A1 | 6/2009 | Leon |
| 2009/0140058 A1 | 6/2009 | Koster et al. |
| 2009/0140061 A1 | 6/2009 | Schultz et al. |
| 2009/0143879 A1 | 6/2009 | Amundson et al. |
| 2009/0143880 A1* | 6/2009 | Amundson et al. ............ 700/83 |
| 2009/0143916 A1* | 6/2009 | Boll et al. .................... 700/276 |
| 2009/0198810 A1 | 8/2009 | Bayer et al. |
| 2009/0257431 A1 | 10/2009 | Ramanathan et al. |
| 2009/0261174 A1 | 10/2009 | Butler et al. |
| 2009/0271336 A1 | 10/2009 | Franks |
| 2009/0287736 A1 | 11/2009 | Shike et al. |
| 2010/0011437 A1 | 1/2010 | Courtney et al. |
| 2010/0023865 A1* | 1/2010 | Fulker et al. ................. 715/734 |
| 2010/0050075 A1 | 2/2010 | Thorson et al. |
| 2010/0050108 A1* | 2/2010 | Mirza ........................... 715/780 |
| 2010/0070086 A1* | 3/2010 | Harrod et al. ................ 700/276 |
| 2010/0070089 A1* | 3/2010 | Harrod et al. ................ 700/277 |
| 2010/0070093 A1* | 3/2010 | Harrod et al. ................ 700/278 |
| 2010/0070907 A1 | 3/2010 | Harrod et al. |
| 2010/0073159 A1 | 3/2010 | Schmickley et al. |
| 2010/0076605 A1 | 3/2010 | Harrod et al. |
| 2010/0100253 A1 | 4/2010 | Fausak et al. |
| 2010/0101854 A1 | 4/2010 | Wallaert et al. |
| 2010/0102136 A1 | 4/2010 | Hadzidedic et al. |
| 2010/0102948 A1 | 4/2010 | Grohman et al. |
| 2010/0102973 A1 | 4/2010 | Grohman et al. |
| 2010/0106305 A1* | 4/2010 | Pavlak et al. ................. 700/276 |
| 2010/0106307 A1 | 4/2010 | Grohman et al. |
| 2010/0106308 A1 | 4/2010 | Filbeck et al. |
| 2010/0106309 A1 | 4/2010 | Grohman et al. |
| 2010/0106310 A1 | 4/2010 | Grohman |
| 2010/0106311 A1 | 4/2010 | Wallaert |
| 2010/0106312 A1 | 4/2010 | Grohman et al. |
| 2010/0106313 A1 | 4/2010 | Grohman et al. |
| 2010/0106314 A1 | 4/2010 | Grohman |
| 2010/0106315 A1 | 4/2010 | Grohman |
| 2010/0106316 A1 | 4/2010 | Curry et al. |
| 2010/0106317 A1 | 4/2010 | Grohman |
| 2010/0106318 A1 | 4/2010 | Grohman et al. |
| 2010/0106319 A1 | 4/2010 | Grohman et al. |
| 2010/0106320 A1 | 4/2010 | Grohman et al. |
| 2010/0106321 A1 | 4/2010 | Hadzidedic |
| 2010/0106322 A1 | 4/2010 | Grohman |
| 2010/0106323 A1 | 4/2010 | Wallaert et al. |
| 2010/0106324 A1 | 4/2010 | Grohman |
| 2010/0106325 A1 | 4/2010 | Grohman |
| 2010/0106326 A1 | 4/2010 | Grohman |
| 2010/0106327 A1 | 4/2010 | Grohman et al. |
| 2010/0106329 A1 | 4/2010 | Grohman |
| 2010/0106330 A1 | 4/2010 | Grohman |
| 2010/0106333 A1 | 4/2010 | Grohman et al. |
| 2010/0106334 A1 | 4/2010 | Grohman et al. |
| 2010/0106787 A1 | 4/2010 | Grohman |
| 2010/0106809 A1 | 4/2010 | Grohman |
| 2010/0106810 A1 | 4/2010 | Grohman |
| 2010/0106814 A1 | 4/2010 | Hadzidedic et al. |
| 2010/0106815 A1 | 4/2010 | Grohman et al. |
| 2010/0106925 A1 | 4/2010 | Grohman et al. |
| 2010/0106957 A1 | 4/2010 | Grohman et al. |
| 2010/0107007 A1 | 4/2010 | Grohman et al. |
| 2010/0107070 A1 | 4/2010 | Devineni et al. |
| 2010/0107071 A1 | 4/2010 | Paviak et al. |
| 2010/0107072 A1 | 4/2010 | Mirza et al. |
| 2010/0107073 A1 | 4/2010 | Wallaert et al. |
| 2010/0107074 A1 | 4/2010 | Paviak et al. |
| 2010/0107076 A1 | 4/2010 | Grohman et al. |
| 2010/0107083 A1 | 4/2010 | Grohman |
| 2010/0107103 A1 | 4/2010 | Wallaert et al. |
| 2010/0107109 A1 | 4/2010 | Filbeck et al. |
| 2010/0107111 A1 | 4/2010 | Mirza et al. |
| 2010/0107112 A1 | 4/2010 | Jennings et al. |
| 2010/0107232 A1 | 4/2010 | Grohman et al. |
| 2010/0115364 A1 | 5/2010 | Grohman |
| 2010/0142526 A1 | 6/2010 | Wong |
| 2010/0145629 A1 | 6/2010 | Botich et al. |
| 2010/0168924 A1 | 7/2010 | Tessier et al. |
| 2010/0169419 A1 | 7/2010 | DeVilbiss et al. |
| 2010/0179696 A1 | 7/2010 | Grohman et al. |
| 2010/0211546 A1 | 8/2010 | Grohman et al. |
| 2010/0241245 A1 | 9/2010 | Wiemeyer et al. |
| 2010/0262296 A1 | 10/2010 | Davis et al. |
| 2010/0264846 A1 | 10/2010 | Chemel et al. |
| 2010/0270933 A1 | 10/2010 | Chemel et al. |
| 2010/0295475 A1 | 11/2010 | Chemel et al. |
| 2010/0295482 A1 | 11/2010 | Chemel et al. |
| 2010/0301768 A1 | 12/2010 | Chemel et al. |
| 2010/0301769 A1 | 12/2010 | Chemel et al. |
| 2010/0301774 A1 | 12/2010 | Chemel et al. |
| 2010/0314458 A1 | 12/2010 | Votaw et al. |
| 2011/0001436 A1 | 1/2011 | Chemel et al. |
| 2011/0001438 A1 | 1/2011 | Chemel et al. |
| 2011/0004823 A1 | 1/2011 | Wallaert |
| 2011/0004824 A1 | 1/2011 | Thorson et al. |
| 2011/0007016 A1 | 1/2011 | Mirza et al. |
| 2011/0007017 A1 | 1/2011 | Wallaert |
| 2011/0010621 A1 | 1/2011 | Wallaert et al. |
| 2011/0010652 A1 | 1/2011 | Wallaert |
| 2011/0010653 A1 | 1/2011 | Wallaert et al. |
| 2011/0010660 A1 | 1/2011 | Thorson et al. |
| 2011/0040785 A1 | 2/2011 | Steenberg et al. |
| 2011/0174287 A1 | 7/2011 | Cherington et al. |
| 2012/0012662 A1 | 1/2012 | Seen et al. |
| 2012/0046792 A1 | 2/2012 | Secor |
| 2012/0065805 A1 | 3/2012 | Montalvo |
| 2012/0116593 A1 | 5/2012 | Amundson et al. |
| 2012/0181010 A1 | 7/2012 | Schultz et al. |

FOREIGN PATENT DOCUMENTS

| | | |
|---|---|---|
| WO | WO02056540 A2 | 7/2002 |

(56) References Cited

FOREIGN PATENT DOCUMENTS

WO     WO2008100641 A1    8/2008

OTHER PUBLICATIONS

Gunter Leeb; "A User Interface for Home-Net: Institute for Automation"; 1994 IEEE; pp. 897-902; Treitistrasze 3, A-1040, Vienna, Austria.

Hugh O. Nash, Jr.; "Fire Alarm Systems for Health Care Facilities"; IEEE Transactions on Industry Applications; Sep.-Oct. 1983 IEEE; pp. 848-852; Vol. IA-19.

Ed Bruggeman and Ivar Sanders; "A Multifunction Home Control System"; Residential Group, Honeywell, Inc.; Minneapolis, Minnesota; 10 pages; 1983 IEEE.

H. Fischer, and H.R. Zieger; "Remote Building Management Ad DDC-Technoloty to Operate Distributed HVAC-Installations"; Staefa Control System GmbH; Humboldtstabe 30, D-Leinfelden-Echterdingen; 1992; pp. 127-132.

Intel, Hewlett-Packard; NEC, Dell; -IPMI-; "Intelligent Platform Management Interface Specification"; Document Revision 1.1; Feb. 20, 2002, v1.5; 460 pages (Part 1; Part 2; Part 3; and Part 4 attached).

\* cited by examiner

FIG. 3E-1

| SCREEN | HOW TO ACCESS | CONTENTS |
|---|---|---|
| | | CONSTANT INFORMATION (DISPLAYED AT BOTTOM OF ALL SCREENS)<br>TIME HH:MM<br>DATE (MONTH,DD,YYYY) |
| USER DASHBOARD | TOUCH "PRESS FOR MORE" ON HOME SCREEN | WEATHER<br>(TOUCH WEATHER TAB)<br>*CURRENT OUTDOOR TEMPERATURE/HUMIDITY<br><br>*IF A MEANS FOR ACQUIRING OUTDOOR TEMPERATURE IS AVAILABLE. OTHERWISE, THE SCREEN MAY PROMPT THE USER TO CONTACT MANUFACTURER FOR MORE INFORMATION |
| | | INDOOR HUMIDITY<br>(TOUCH INDOOR HUMIDITY TAB)<br>CURRENT INDOOR HUMIDITY<br>*CURRENT INDOOR HUMIDITY SETPOINT(S)<br>HUMIDIFICATION/DEHUMIDIFICATION COMFORT ZONE<br><br>*IF A MEANS FOR CONTROLLING HUM/DEHUM IS AVAILABLE |
| | | ALERTS<br>(TOUCH ALERTS TAB)<br>CURRENTLY ACTIVE ALERTS WITH OPTION TO:<br>• OBTAIN DEALER INFORMATION<br>• REMIND LATER (FOR SERVICE ALERTS ONLY)<br>• CLEAR (FOR SERVICE ALERTS ONLY) |
| | | HELP/USER SYSTEM CONFIGURATION<br>(TOUCH HELP TAB)<br><br>HELP<br>PROVIDES "CONTEXT SENSITIVE" HELP THAT PRESENTS DIALOG BOXES RELATING TO THE CURRENT SCREEN'S FUNCTIONS<br><br>USER SYSTEM CONFIGURATION<br>PROVIDES ACCESS TO ALL USER LOCAL SETTINGS<br><br>CLEAN SCREEN<br>PROVIDES ACCESS TO CLEAN SCREEN (30SEC COUNT DOWN) |
| | | INDOOR TEMPERATURE SETTINGS<br>(TOUCH INDOOR SETTINGS TAB)<br>CURRENT INDOOR TEMPERATURE<br>*CURRENT INDOOR TEMPERATURE SETPOINT(S)<br>SYSTEM MODE (AUTO, COOL, HEAT, EM HEAT, OFF)<br>FAN MODE (AUTO, ON, CIRCULATE)<br><br>*NOT VISIBLE WHEN THE SYSTEM IS IN OFF MODE |

TO FIG. 3E-2

FROM FIG. 3E-1

| SCREEN | HOW TO ACCESS | CONTENTS |
|---|---|---|
| | | PROGRAM SCHEDULE<br>(TOUCH PROGRAM TAB)<br>DISABLE/ENABLE PROGRAM SCHEDULE<br>MULTIPLE DAY SELECTION<br><br>PROGRAM SCHEDULE EVENT SETTINGS:<br>   1. TIME<br>   2. TEMPERATURE SETPOINTS:<br>      • HEATING/COOLING SETPOINTS<br>   3. FAN MODE |
| | | ZONING<br>(TOUCH ZONES TAB)<br>THE SCREEN MAY PROMPT THE USER TO CONTACT MANUFACTURER FOR MORE INFORMATION |
| | | RETURN TO HOME SCREEN<br>(TOUCH HOME TAB) |
| INSTALLER DASHBOARD | TOUCH AND HOLD (5 SECONDS) MANUFACTURER LOGO | INSTALLER-SPECIFIC FUNCTIONS |
| *ACTIVE ALERTS | TOUCH ALERT ICON | CURRENTLY ACTIVE ALERTS WITH OPTION TO:<br>   • DEALER INFORMATION/SEND FOR SERVICE<br>   • REMIND LATER (FOR SERVICE ALERTS ONLY)<br>   • CLEAR (FOR SERVICE ALERTS ONLY)<br><br>*IF AN ALERT IS ACTIVE, OTHERWISE ACCESS ALERTS TAB VIA USER DASHBOARD |

FIG. 3E-2

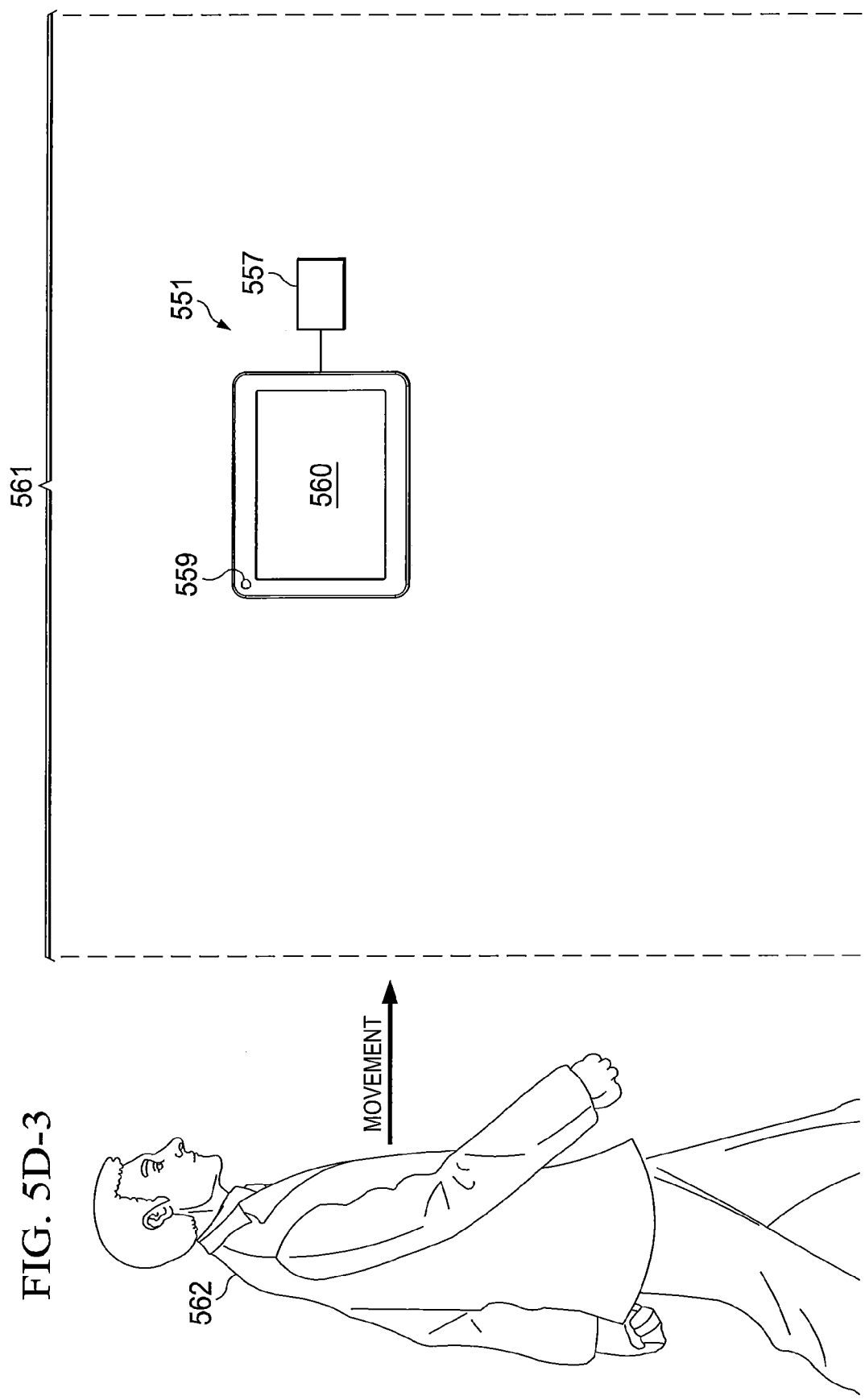

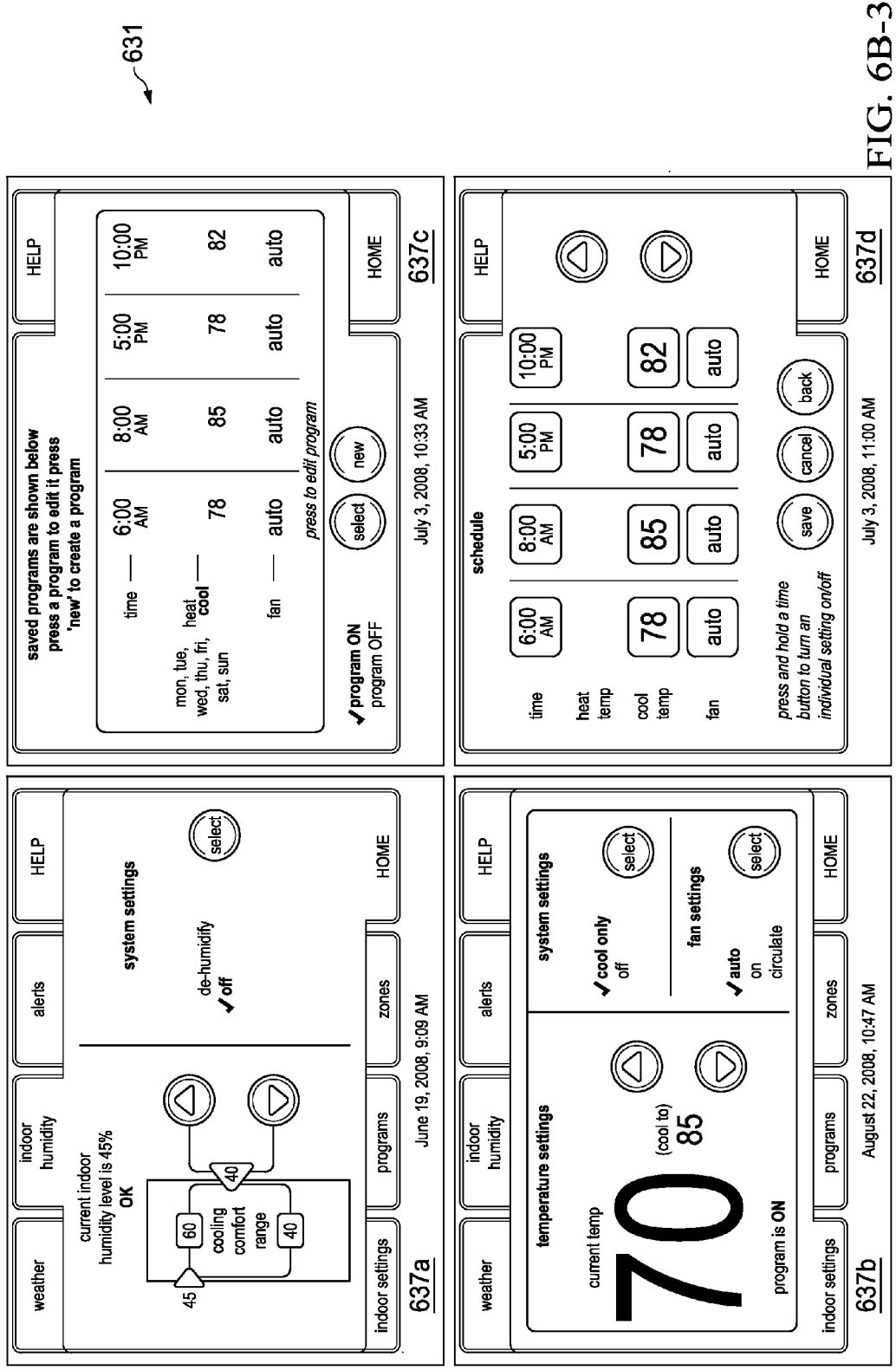

↓ PRESS HELP TAB

↓ TOUCH THE SCREEN

TO FIG. 7Aiv

FIG. 7Aii
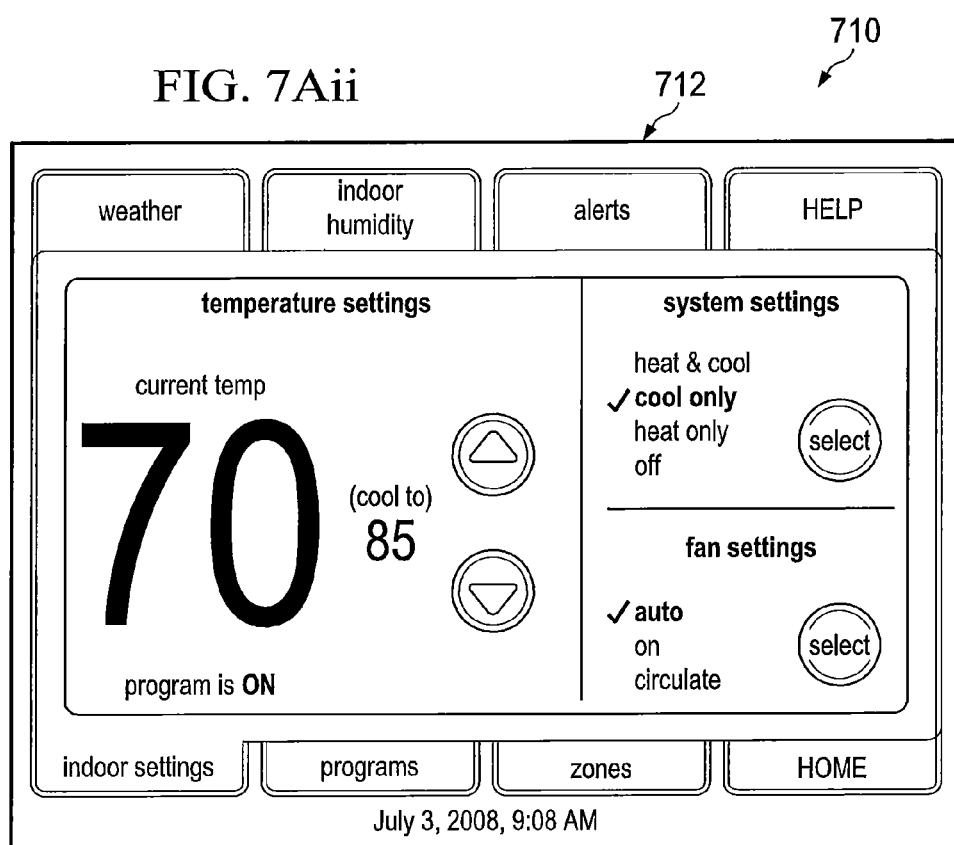
PRESS HELP TAB
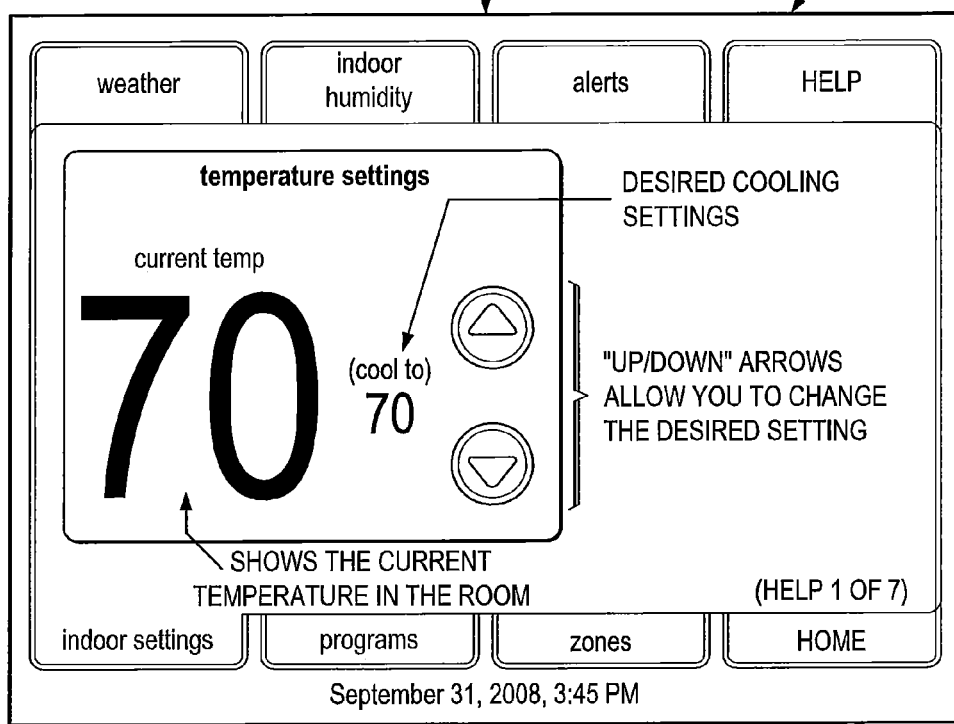
TOUCH THE SCREEN
TO FIG. 7Aiv

FIG. 7Aiii
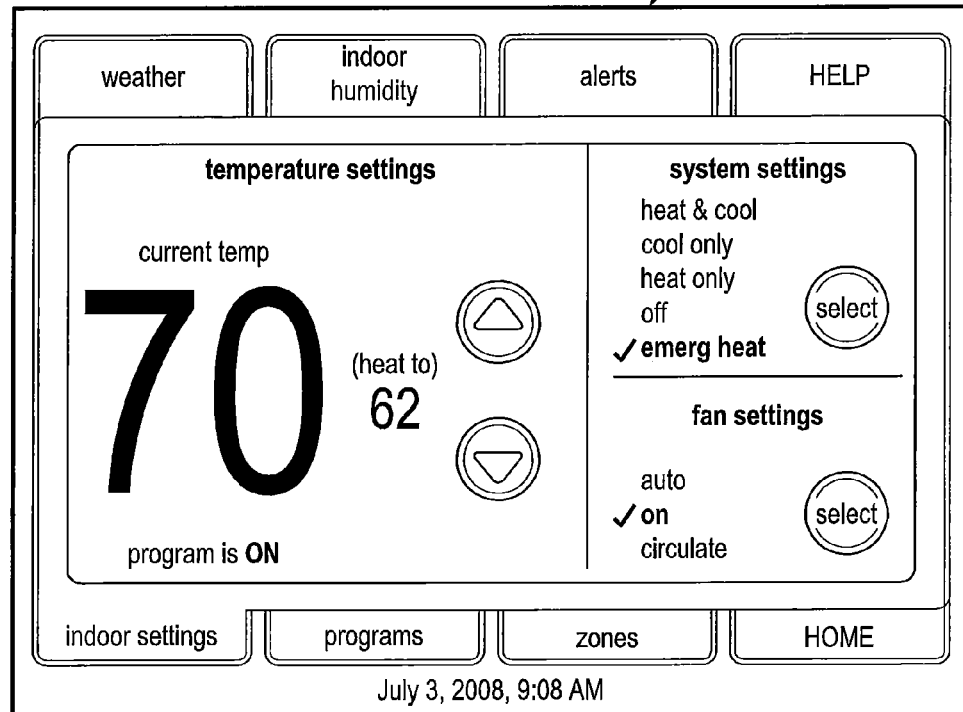
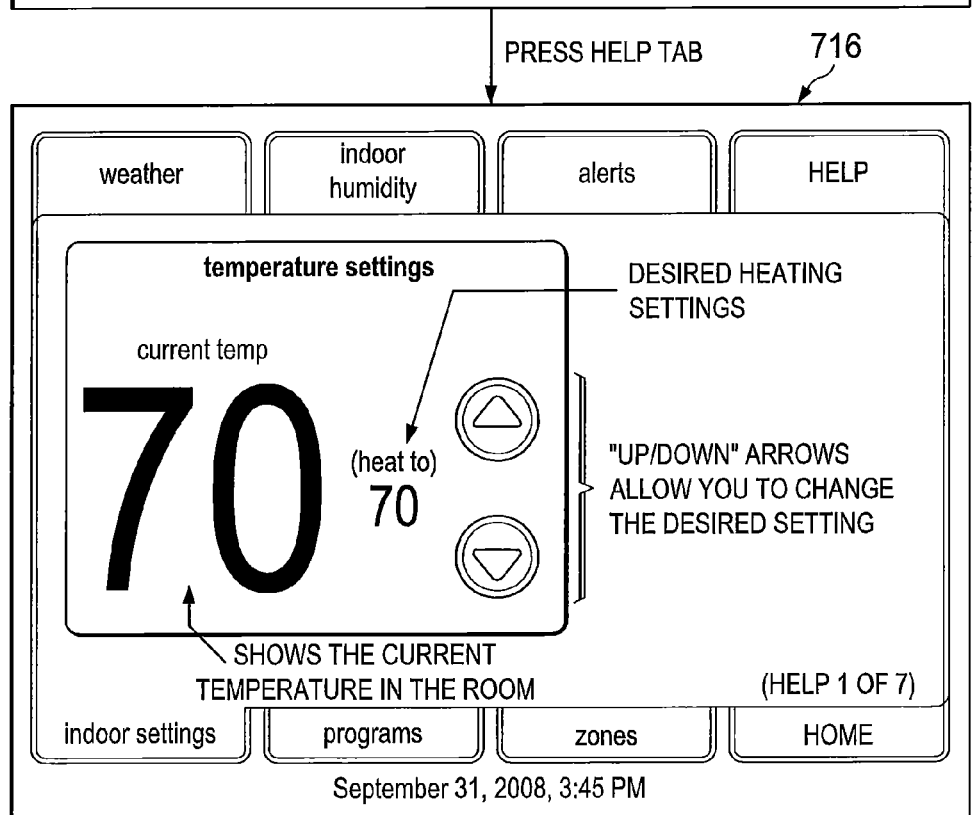

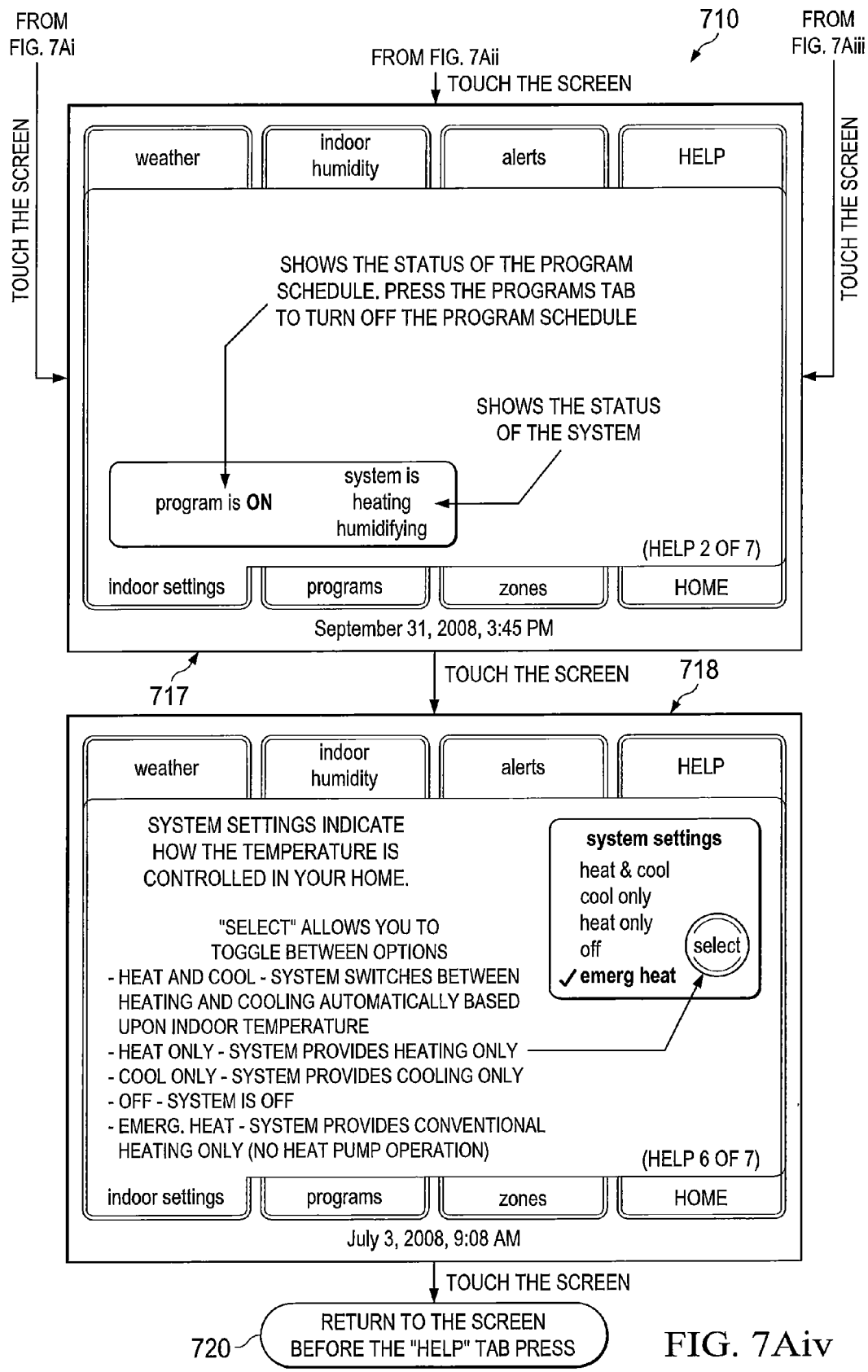
FIG. 7Aiv

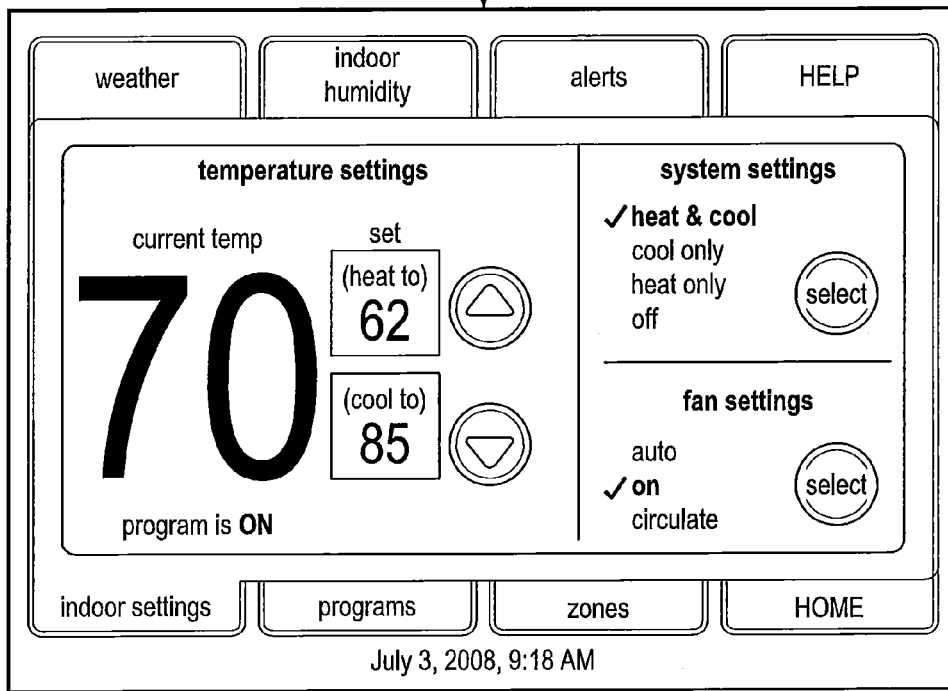
FIG. 7Bi
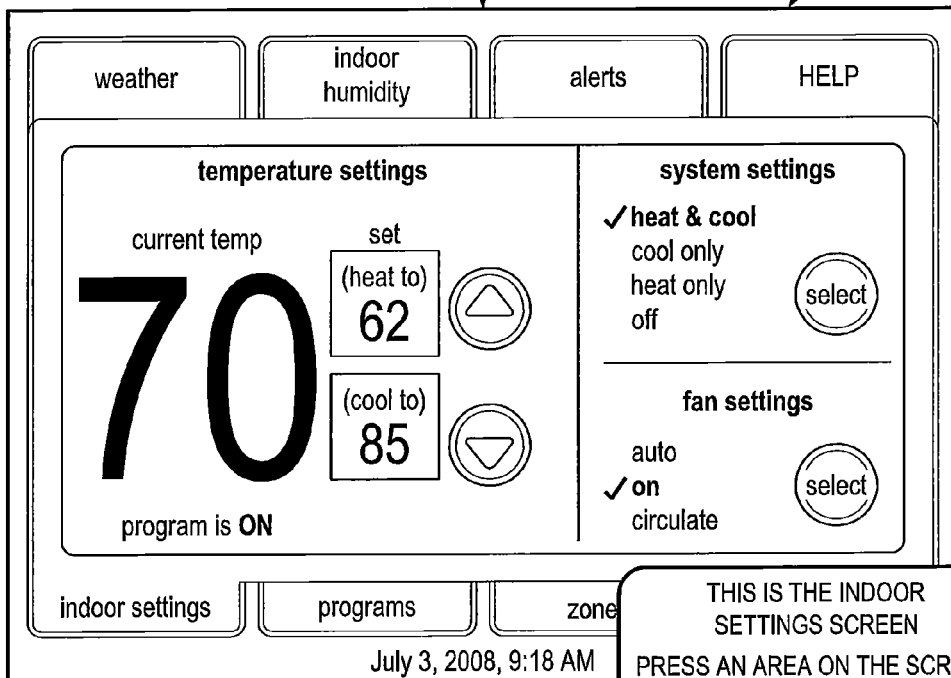

FIG. 7Bii
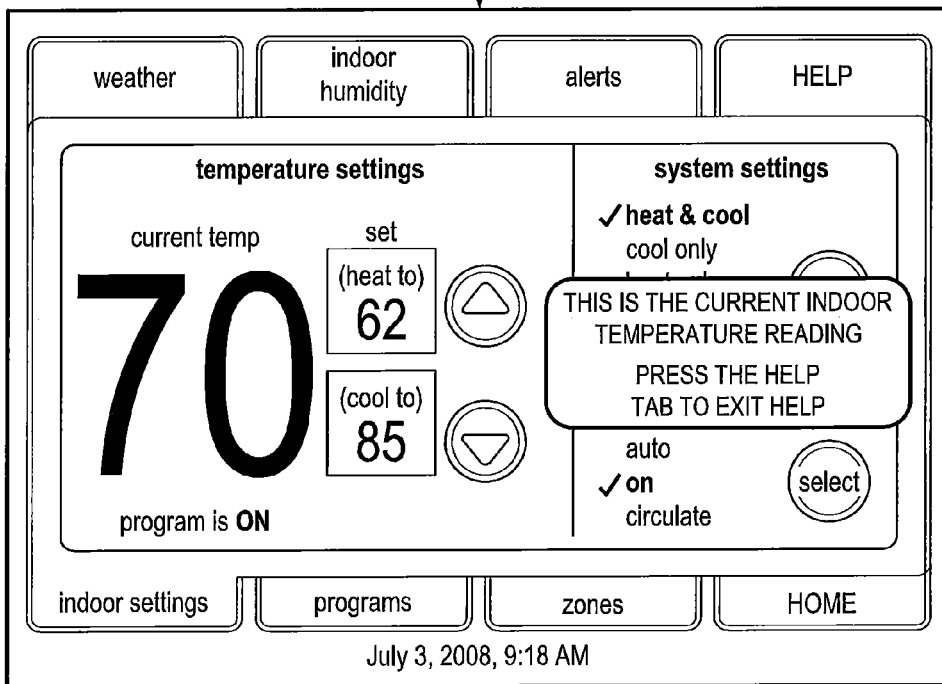
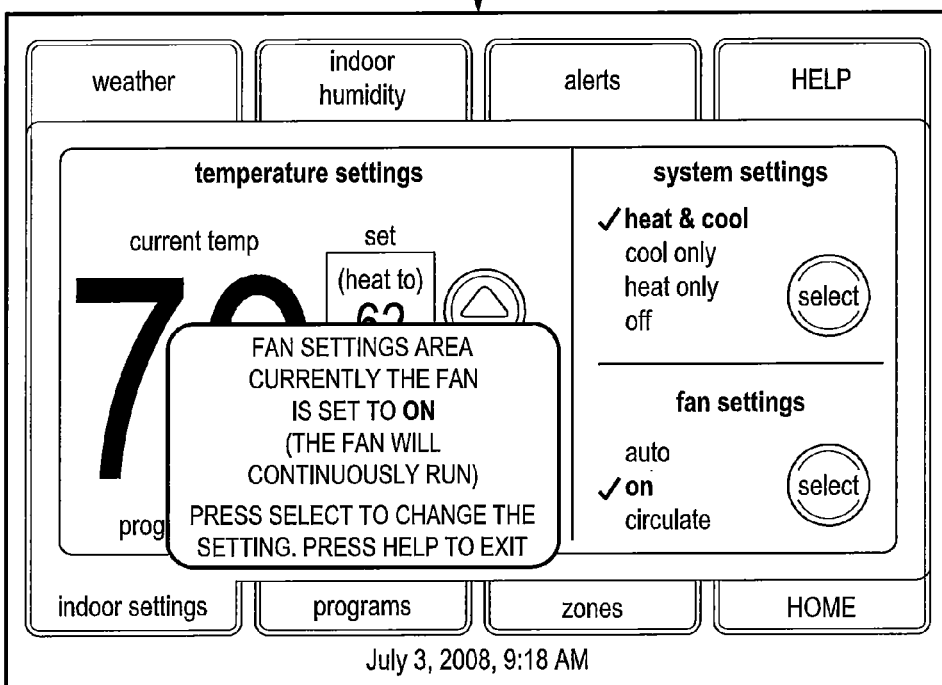

FIG. 7Biii
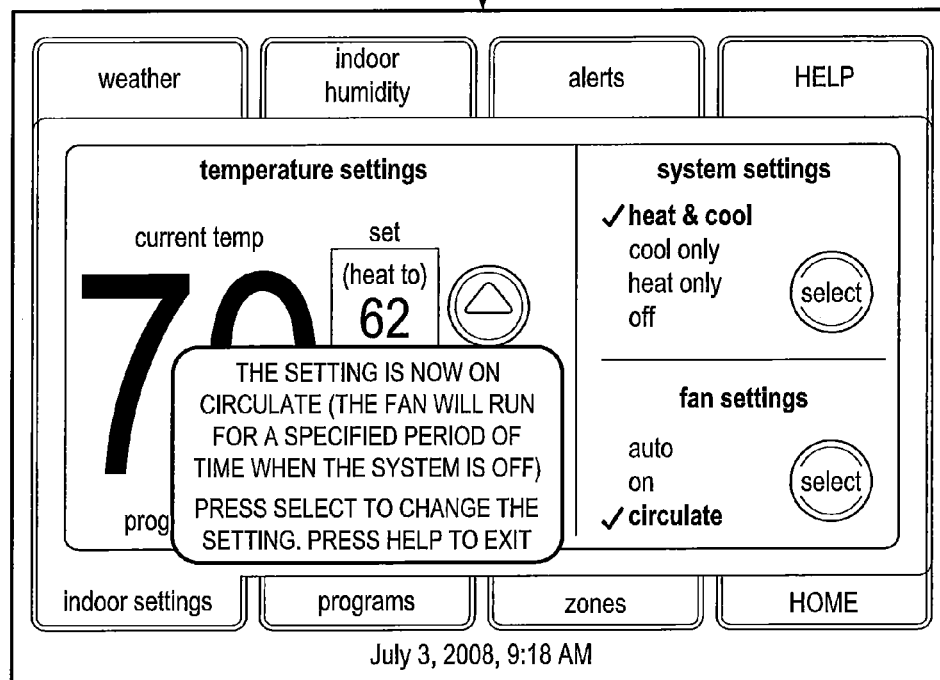
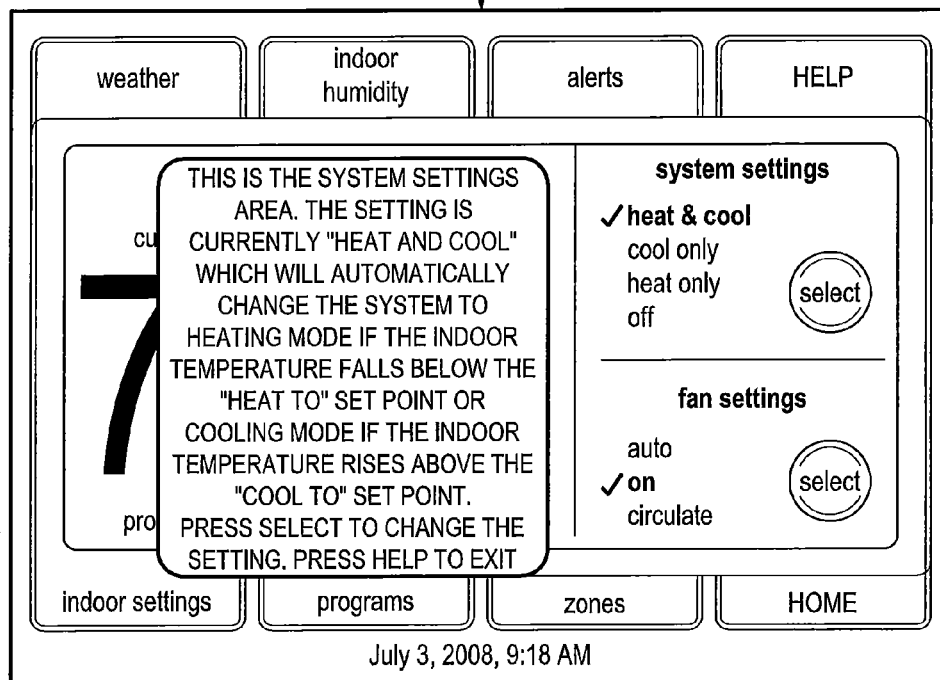

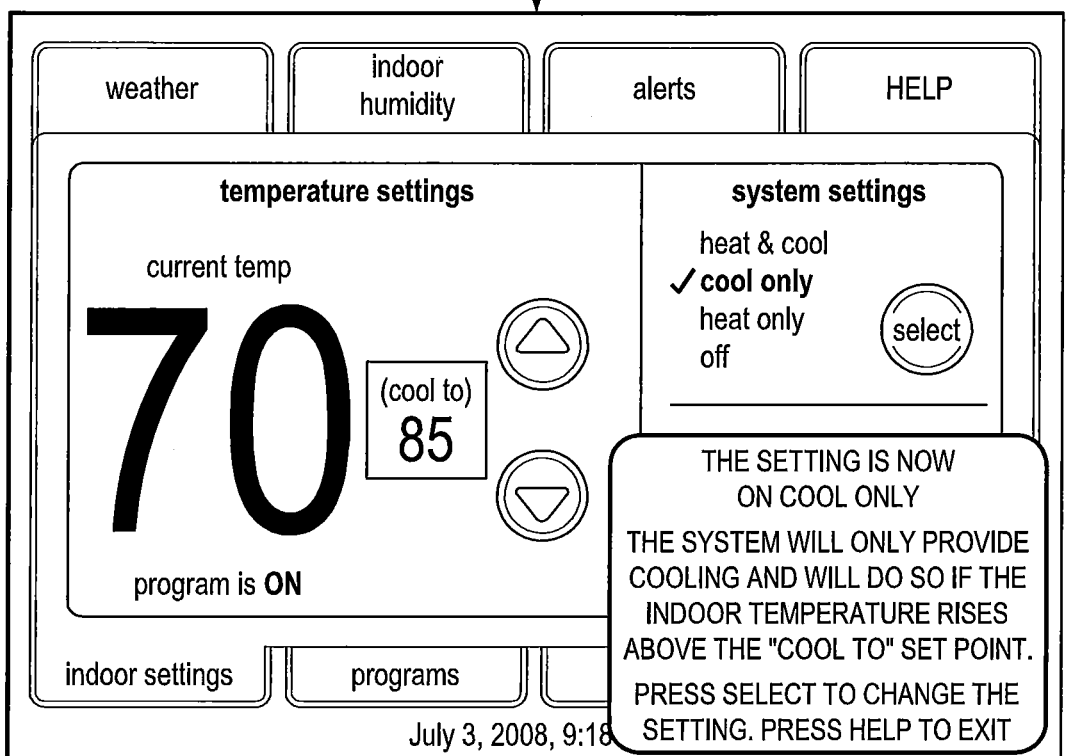
FIG. 7Biv

FIG. 9B-1
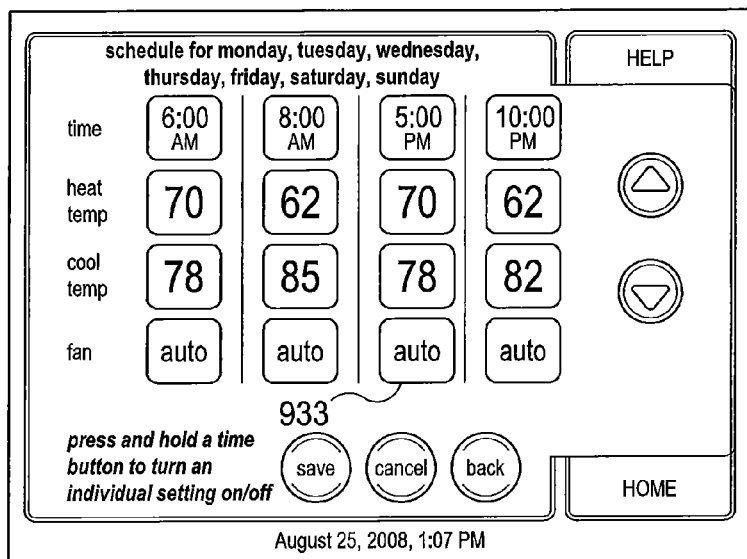
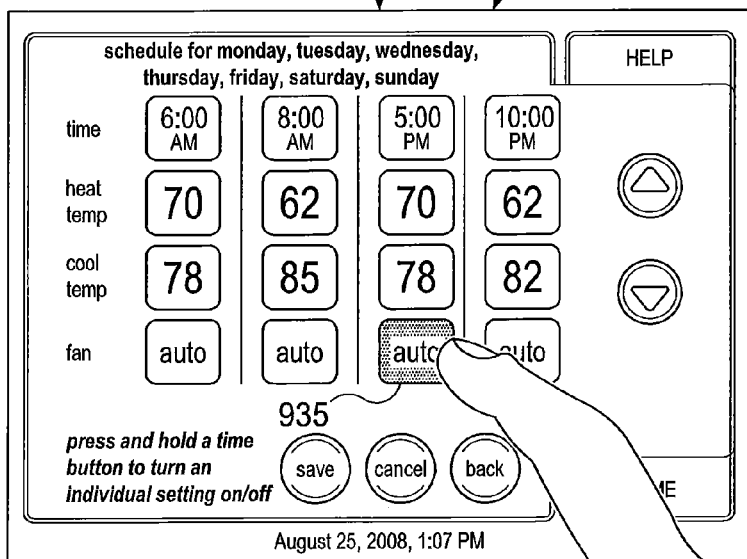
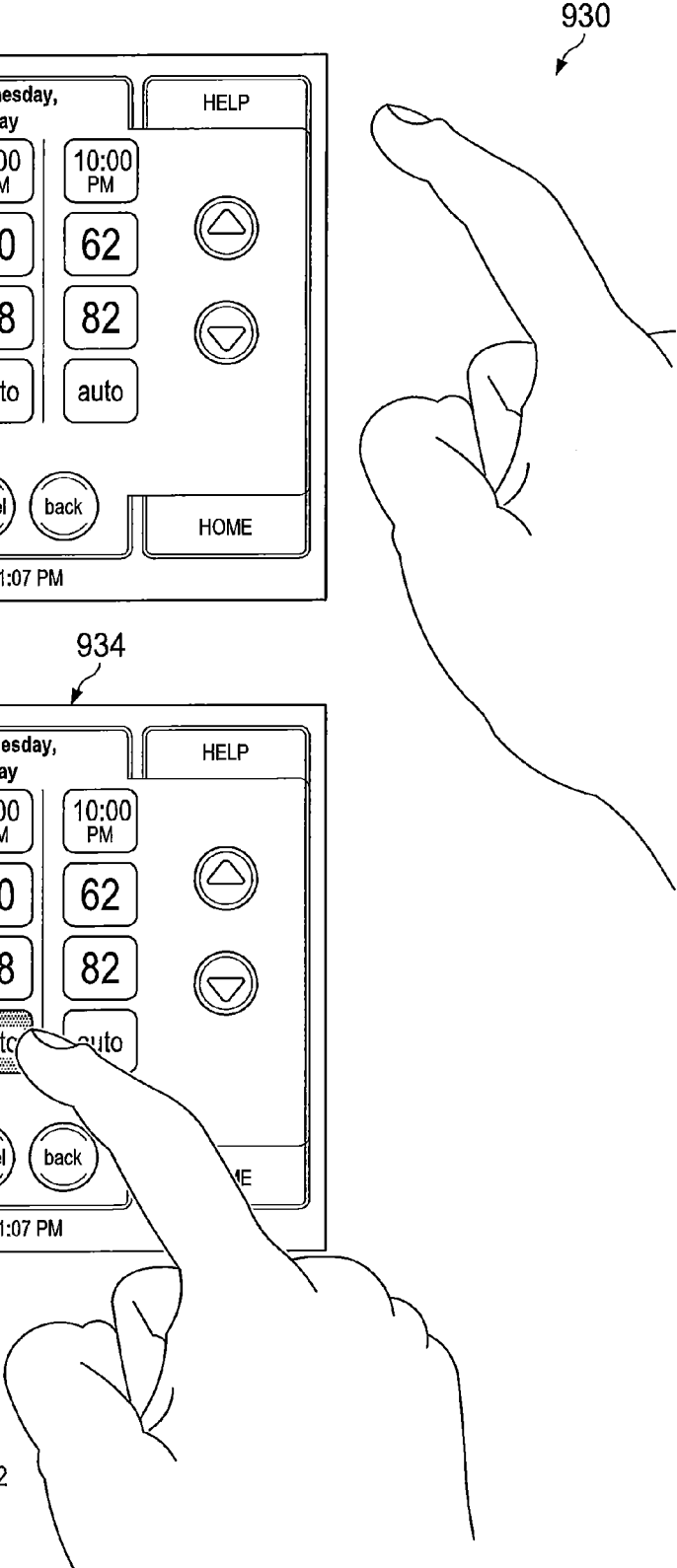
TO FIG. 9B-2

PRESS AND HOLD "5:00 PM"
TIME PERIOD FOR 2 SECONDS

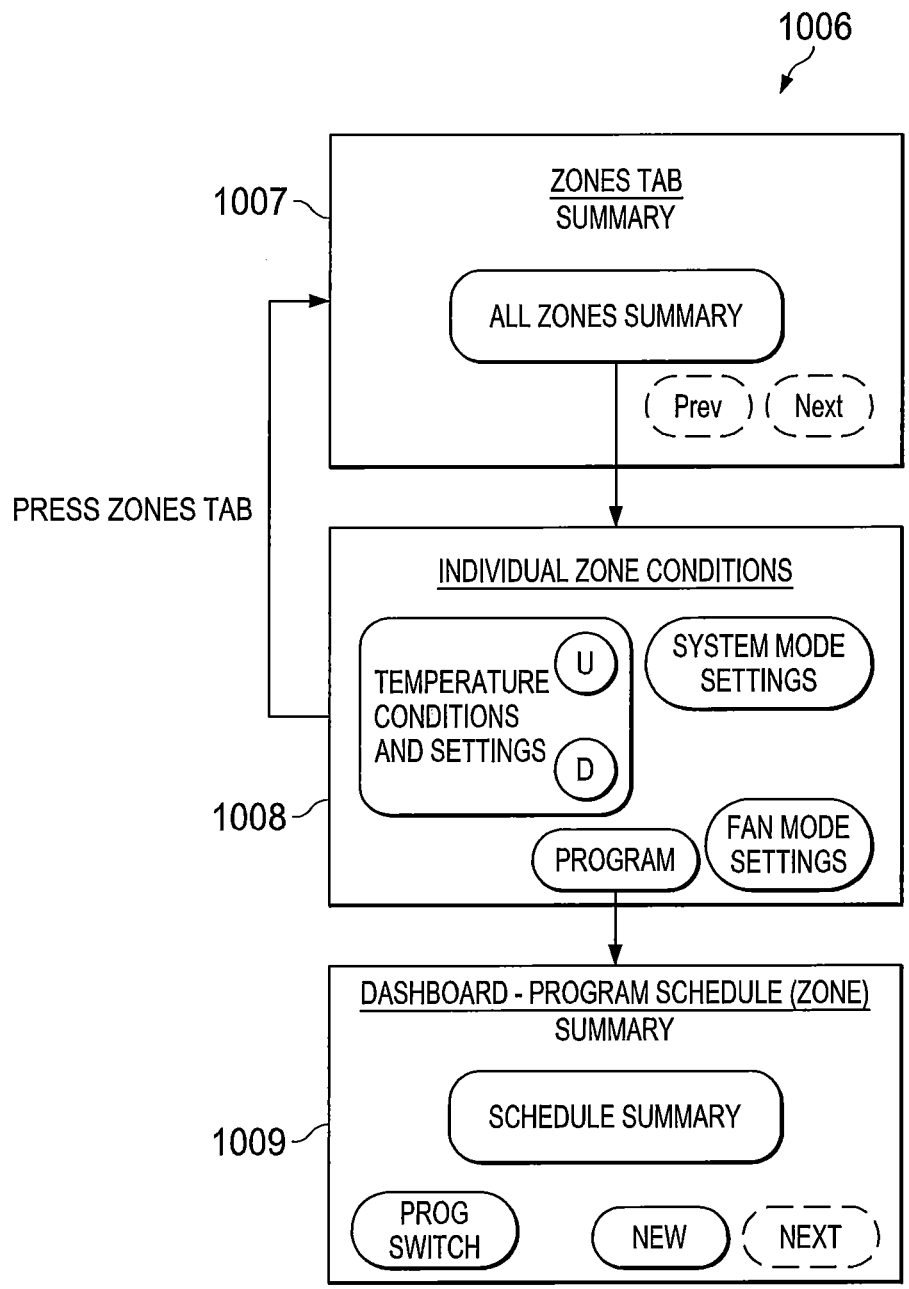
FIG. 9Fii

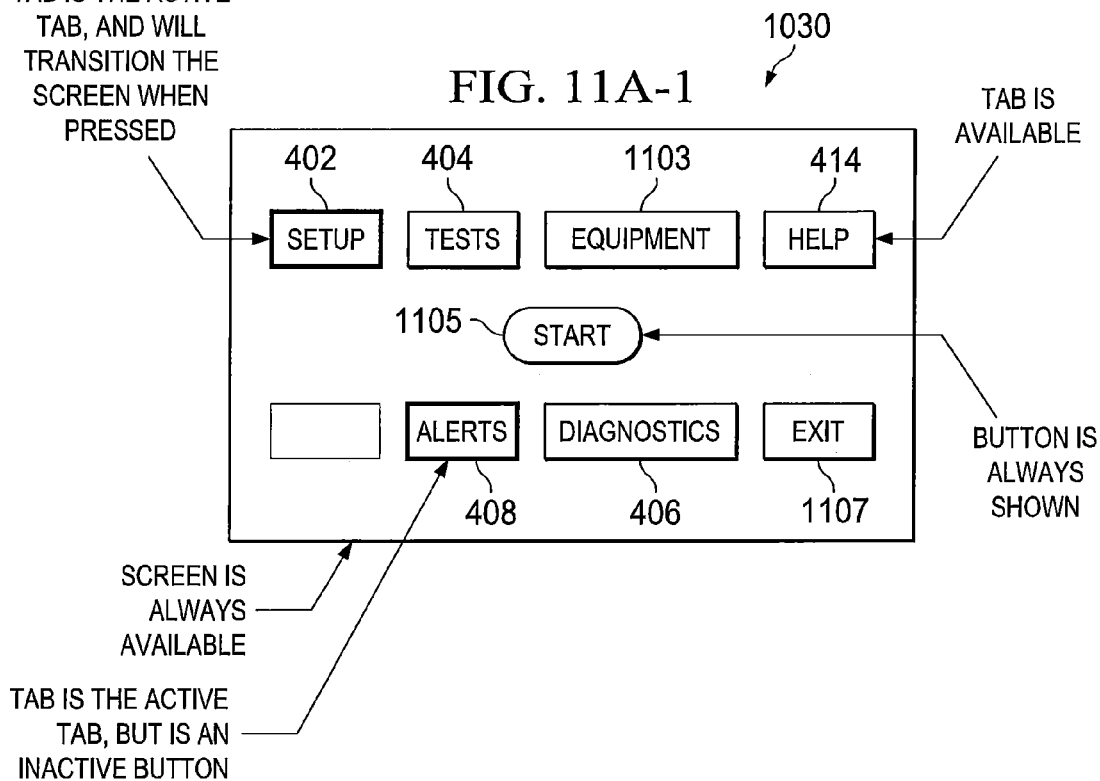
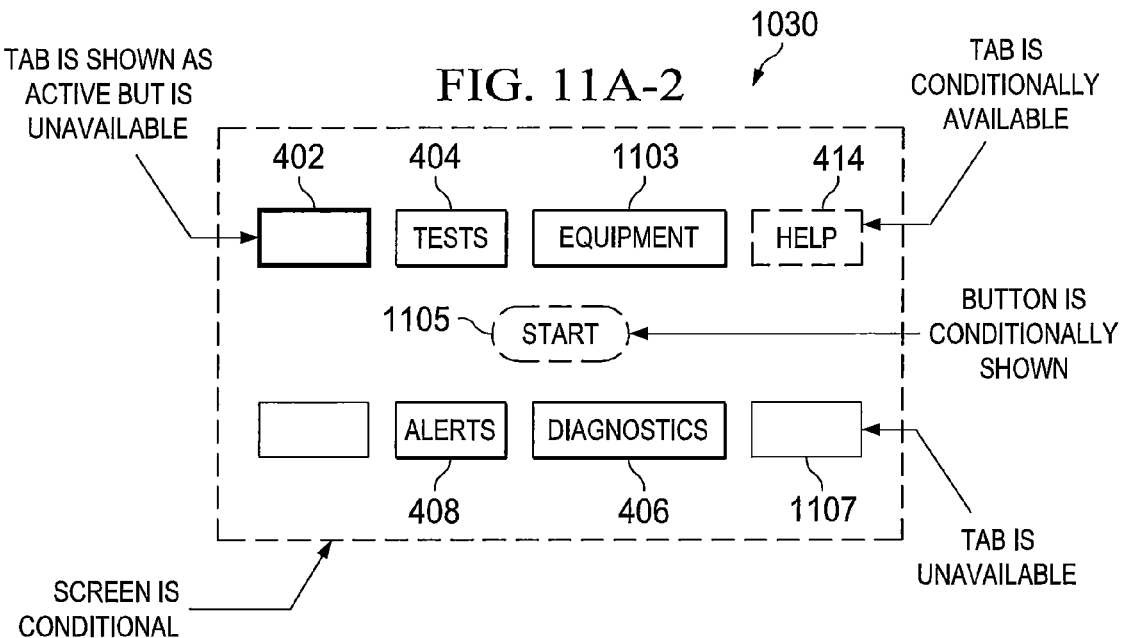

SYSTEM AND METHOD OF USE FOR A USER INTERFACE DASHBOARD OF A HEATING, VENTILATION AND AIR CONDITIONING NETWORK

CROSS-REFERENCE TO RELATED APPLICATIONS

This application claims the benefit of U.S. Provisional Application Ser. No. 61/167,135, filed by Grohman, et al., on Apr. 6, 2009, entitled "Comprehensive HVAC Control System", and is a continuation-in-part application of application Ser. No. 12/258,659, filed by Grohman on Oct. 27, 2008, now abandoned entitled "Apparatus and Method for Controlling an Environmental Conditioning Unit," both of which are commonly assigned with this application and incorporated herein by reference. This application is also related to the following U.S. patent applications, which are filed on even date herewith, commonly assigned with this application and incorporated herein by reference:

| Ser. No. | Inventors | Title |
| --- | --- | --- |
| 12/603,464 | Grohman, et al. | "Alarm and Diagnostics System and Method for a Distributed-Architecture Heating, Ventilation and Air Conditioning Network" |
| 12/603,534 | Wallaert, et al. | "Flush Wall Mount Controller and In-Set Mounting Plate for a Heating, Ventilation and Air Conditioning System" |
| 12/603,449 | Thorson, et al. | "System and Method of Use for a User Interface Dashboard of a Heating, Ventilation and Air Conditioning Network" |
| 12/603,382 | Grohman | "Device Abstraction System and Method for a Distributed-Architecture Heating, Ventilation and Air Conditioning Network" |
| 12/603,526 | Grohman, et al. | "Communication Protocol System and Method for a Distributed-Architecture Heating, Ventilation and Air Conditioning Network" |
| 12/603,527 | Hadzidedic | "Memory Recovery Scheme and Data Structure in a Heating, Ventilation and Air Conditioning Network" |
| 12/603,490 | Grohman | "System Recovery in a Heating, Ventilation and Air Conditioning Network" |
| 12/603,473 | Grohman, et al. | "System and Method for Zoning a Distributed-Architecture Heating, Ventilation and Air Conditioning Network" |
| 12/603,525 | Grohman, et al. | "Method of Controlling Equipment in a Heating, Ventilation and Air Conditioning Network" |
| 12/603,512 | Grohman, et al. | "Programming and Configuration in a Heating, Ventilation and Air Conditioning Network" |
| 12/603,431 | Mirza, et al. | "General Control Techniques in a Heating, Ventilation and Air Conditioning Network" |

TECHNICAL FIELD

This application is directed, in general, to HVAC systems and, more specifically, to a user interface dashboard and installer interface dashboard for a distributed-architecture heating, ventilation and air conditioning (HVAC) network, and methods of use thereof.

BACKGROUND

Climate control systems, also referred to as HVAC systems (the two terms will be used herein interchangeably), are employed to regulate the temperature, humidity and air quality of premises, such as a residence, office, store, warehouse, vehicle, trailer, or commercial or entertainment venue. The most basic climate control systems either move air (typically by means of an air handler, or more colloquially, a fan or blower), heat air (typically by means of a furnace) or cool air (typically by means of a compressor-driven refrigerant loop). A thermostat is typically included in the climate control systems to provide some level of automatic temperature control. In its simplest form, a thermostat turns the climate control system on or off as a function of a detected temperature. In a more complex form, a thermostat may take other factors, such as humidity or time, into consideration. Still, however, the operation of a thermostat remains turning the climate control system on or off in an attempt to maintain the temperature of the premises as close as possible to a desired setpoint temperature. Climate control systems as described above have been in wide use since the middle of the twentieth century.

SUMMARY

In a first aspect the disclosure provides an HVAC graphical interface dashboard. In an embodiment the dashboard includes a weather tab, wherein invoking the weather tab advances to a weather screen. The dashboard also includes an indoor humidity tab, wherein invoking the indoor humidity tab advances to a humidity screen which displays at least a current indoor humidity. The dashboard further includes an alerts tab, wherein invoking the alerts tab advances to an alerts screen. The dashboard also further includes a help tab, wherein invoking the help tab advances to a help screen that provides context sensitive help that presents at least one dialog box related to a function of a current screen. The dashboard yet also further includes an indoor settings tab, wherein invoking the indoor settings tab advances to an indoor settings screen which includes a current indoor temperature. The dashboard still further includes a programs tab, wherein invoking the programs tab advances to a programs screen wherein the programs screen includes a display of a plurality of pre-populated program schedule settings. The dashboard yet still further includes a home tab, wherein invoking the home tab advances to a home screen which provides a summary of indoor conditions.

In another aspect the disclosure provides a method for operating an HVAC interface having a plurality of tabs. In an embodiment the method includes: providing a weather tab, wherein invoking the weather tab advances to a weather screen. The method also includes providing an indoor humidity tab, wherein invoking the indoor humidity tab advances to a humidity screen which displays at least a current indoor humidity. The method further includes providing an alerts tab, wherein invoking the alerts tab advances to an alerts screen. The method yet further includes providing a help tab, wherein invoking the help tab advances to a help screen that provides context sensitive help that presents at least one dialog box related to a function of a current screen. The method yet still further includes providing an indoor settings tab, wherein invoking the indoor settings tab advances to an indoor settings screen which includes a current indoor temperature. The method also yet further includes providing a programs tab, wherein invoking the programs tab advances to a programs screen wherein the programs screen includes a display of a plurality of pre-populated program settings. The method also includes providing a home tab, wherein invoking the home tab advances to a home screen which provides a summary of indoor conditions. The method also yet still further includes invoking one of the screens.

A third aspect provides an HVAC system including a graphical interface dashboard and at least one coupled device. In an embodiment the dashboard includes a weather tab, wherein invoking the weather tab advances to a weather screen. The dashboard also includes an indoor humidity tab, wherein invoking the indoor humidity tab advances to a humidity screen which displays at least a current indoor humidity. The dashboard further includes an alerts tab, wherein invoking the alerts tab advances to an alerts screen. The dashboard further includes a help tab, wherein invoking the help tab advances to a help screen that provides context sensitive help that presents at least one dialog box related to a function of a current screen. The dashboard yet also further includes an indoor settings tab, wherein invoking the indoor settings tab advances to an indoor settings screen which includes a current indoor temperature. The dashboard still further includes a programs tab, wherein invoking the programs tab advances to a programs screen wherein the programs screen includes a display of a plurality of pre-populated program settings. The dashboard yet still further includes a home tab, wherein invoking the home tab advances to a home screen which provides a summary of indoor conditions. The second aspect further includes at least one coupled device selected from the group including: a) an air handler, b) a furnace, c) an evaporator coil, d) a condenser coil and e) a compressor, wherein at least one coupled device is viewable from at least one of the tabs.

BRIEF DESCRIPTION

Reference is now made to the following descriptions taken in conjunction with the accompanying drawings, in which:

FIGS. 3E-1 and 3E-2 illustrate a table that discloses subject matter of screens correlated to tabs of FIG. 3D;

FIGS. 5D-1 through 5D-5 illustrate an employment of an embodiment of a motion detector for use with the dashboard of FIG. 3;

FIGS. 6B-1-6B-4 illustrates an exemplary employment of screen selectable settings for setting a humidity point in a humidity screen of FIG. 3D that is dependent upon equipment installed in the HVAC system of FIG. 1;

Figure 1:
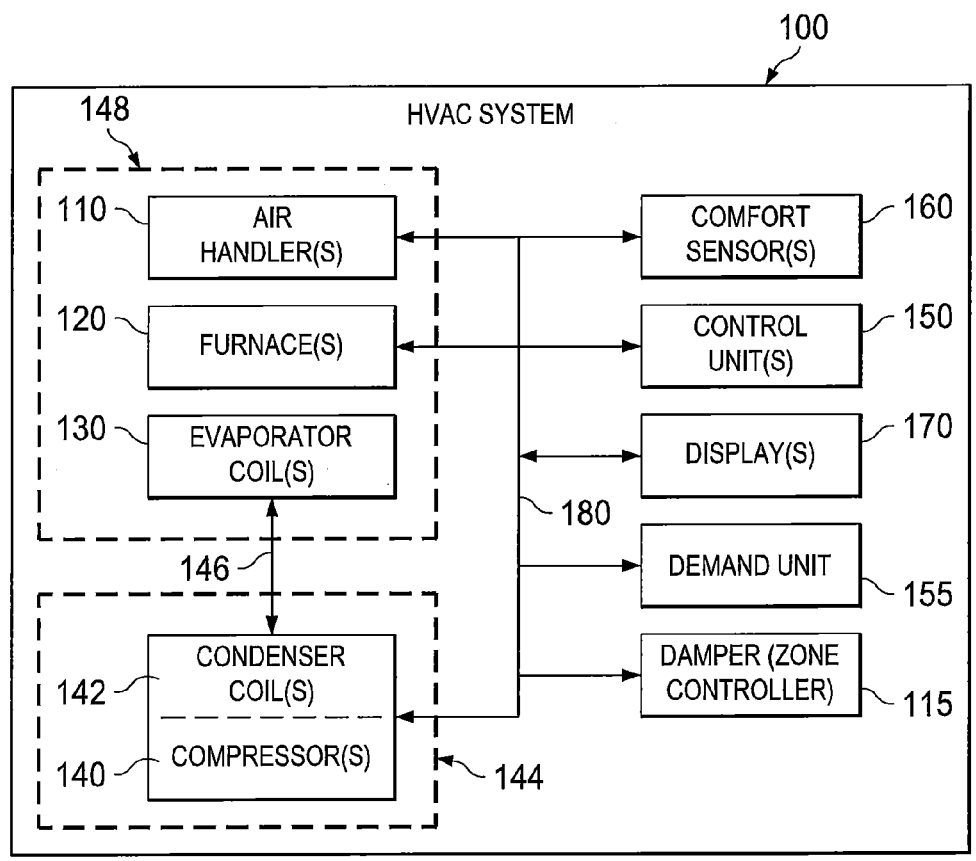
FIG. 1 is a high-level block diagram of an HVAC system within which a device abstraction system and method may be contained or carried out.
Figure 2:
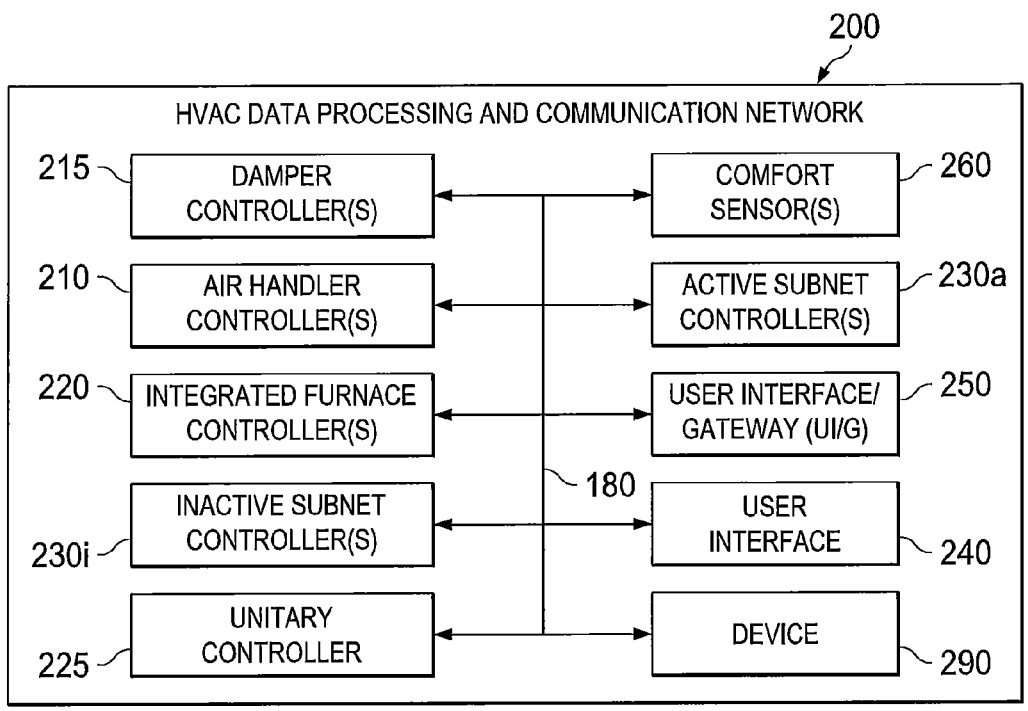
FIG. 2 is a high-level block diagram of one embodiment of an HVAC data processing and communication network 200.
Figure 3A:
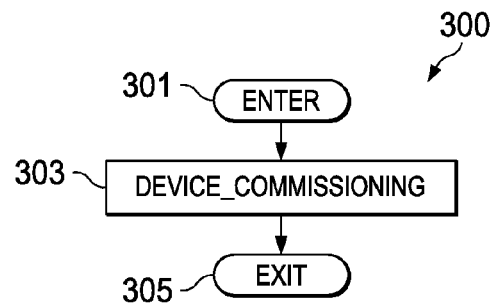
FIG. 3A is a diagram of a series of steps in an event sequence that depicts a device commissioning in an HVAC network having an active subnet controller.
Figure 3C:
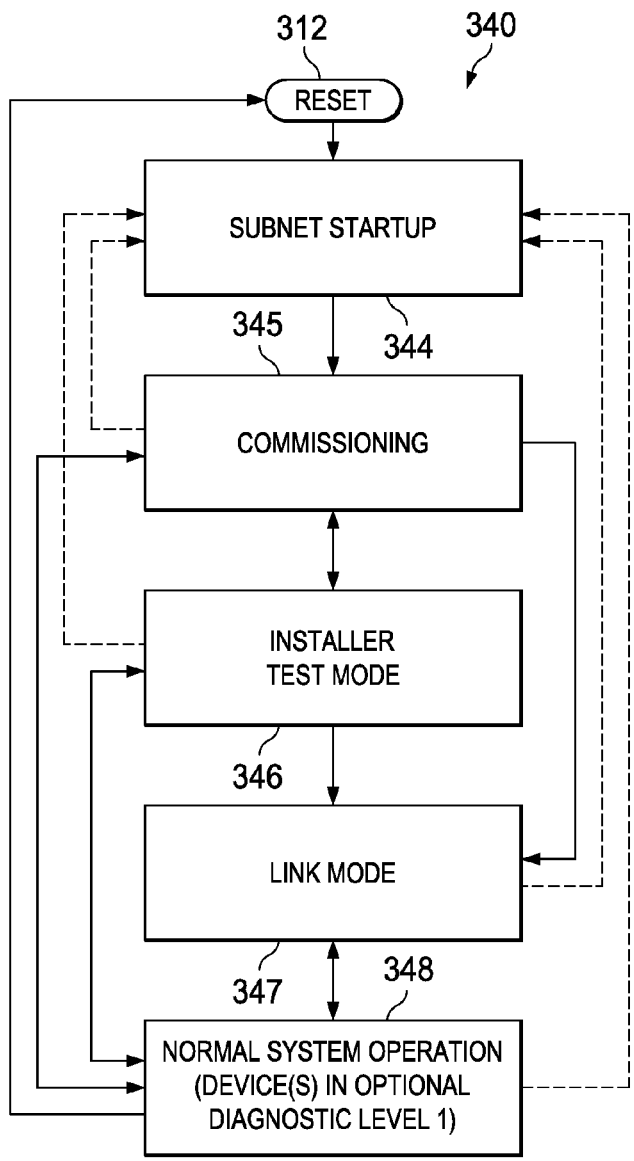
FIG. 3C is a diagram of the above series of steps of FIG. 3B to be followed by a subnet controller to synchronize with a device of the HVAC system.
Figure 3B:
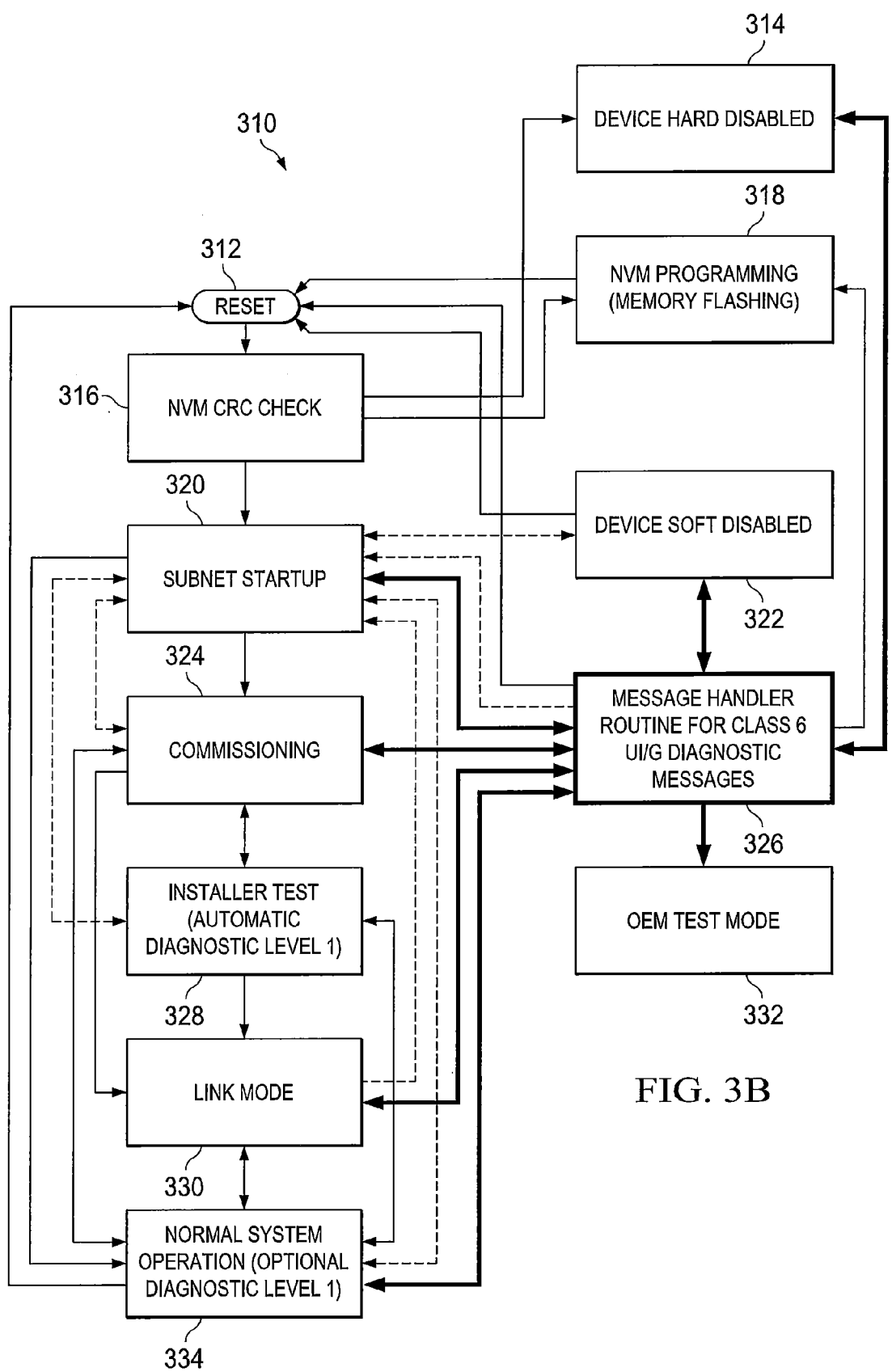
FIG. 3B is a diagram of a series of steps that occur in relation to a commissioning of a subnet including an addressable unit.
Figure 3D:
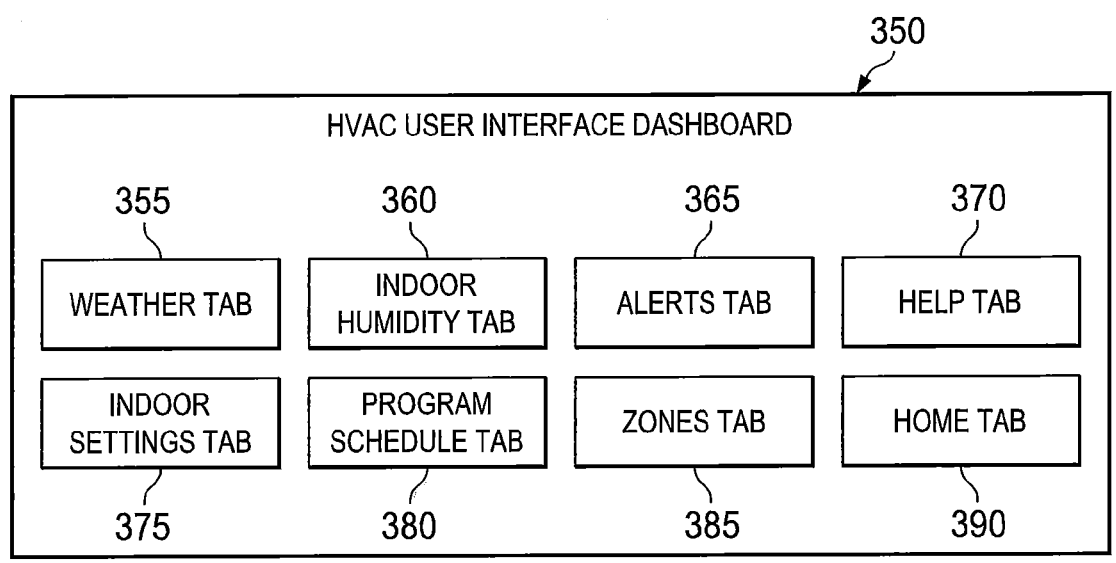
FIG. 3D is a high-level block diagram of one embodiment of a dashboard of a user interface for an HVAC system having a plurality of tabs, each tab configured to invoke one or more corresponding screens.
Figure 4:
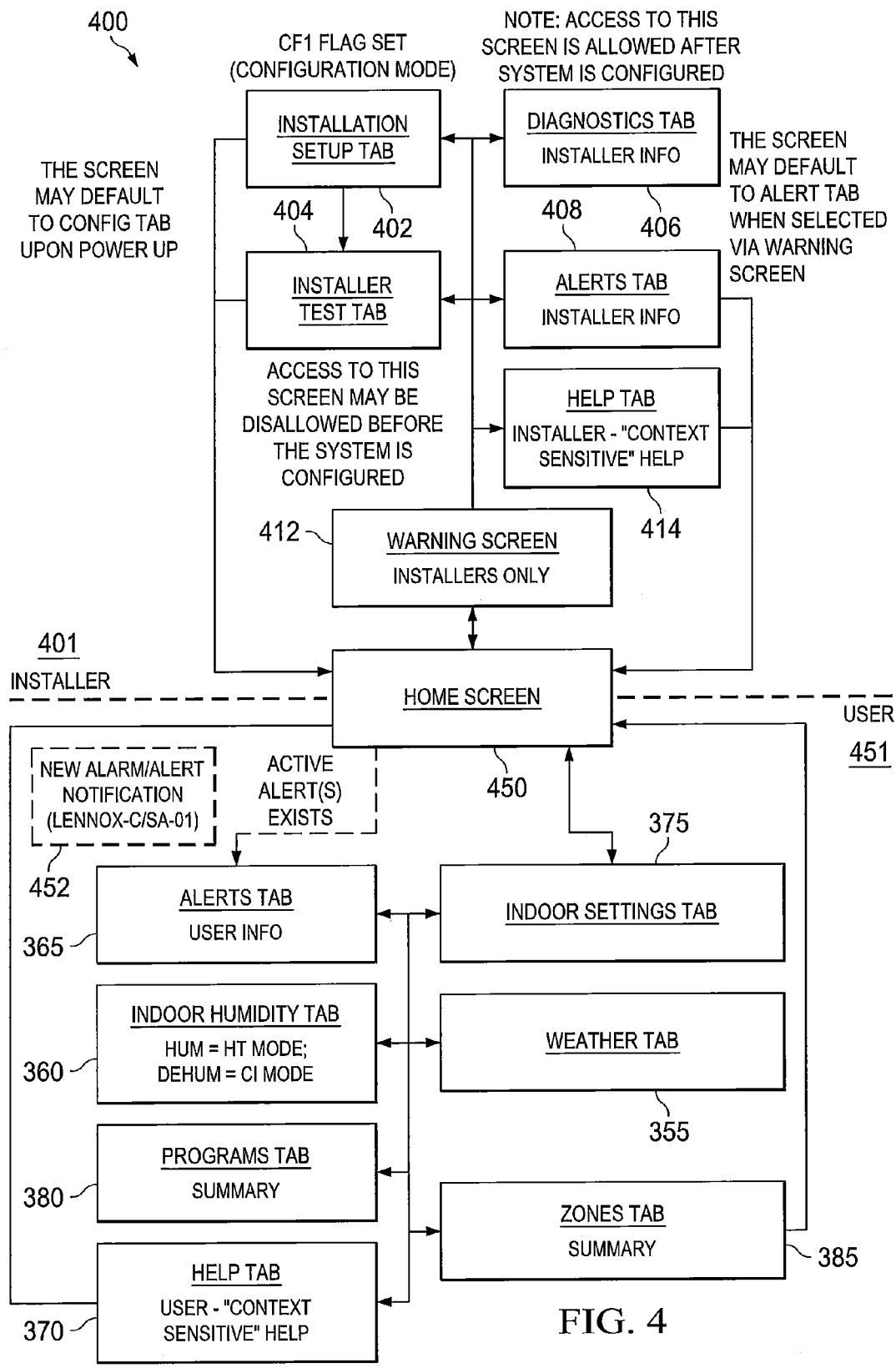
FIG. 4 is a high-level flow diagram of exemplary transitions, for both a user and an installer, between various screens corresponding to various tabs of the dashboard of FIG. 3 and various screens of an interface dashboard of FIGS. 7A and 7B, and an inter-relationship between FIG. 3D and FIGS. 7A and 7B.
Figure 7A:
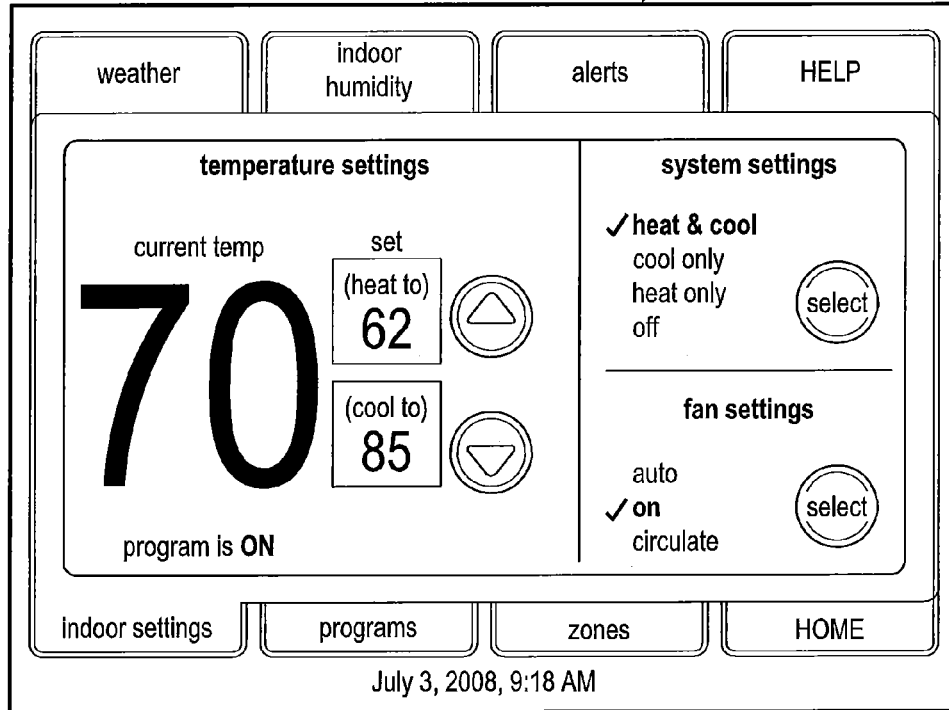
Figure 7A:
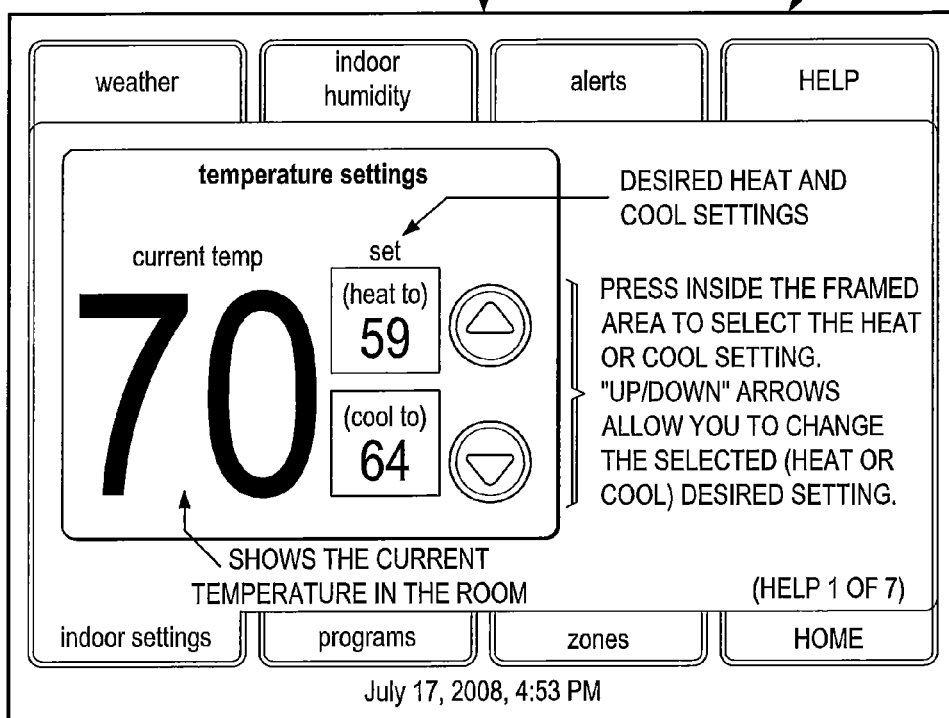
Figure 9A:
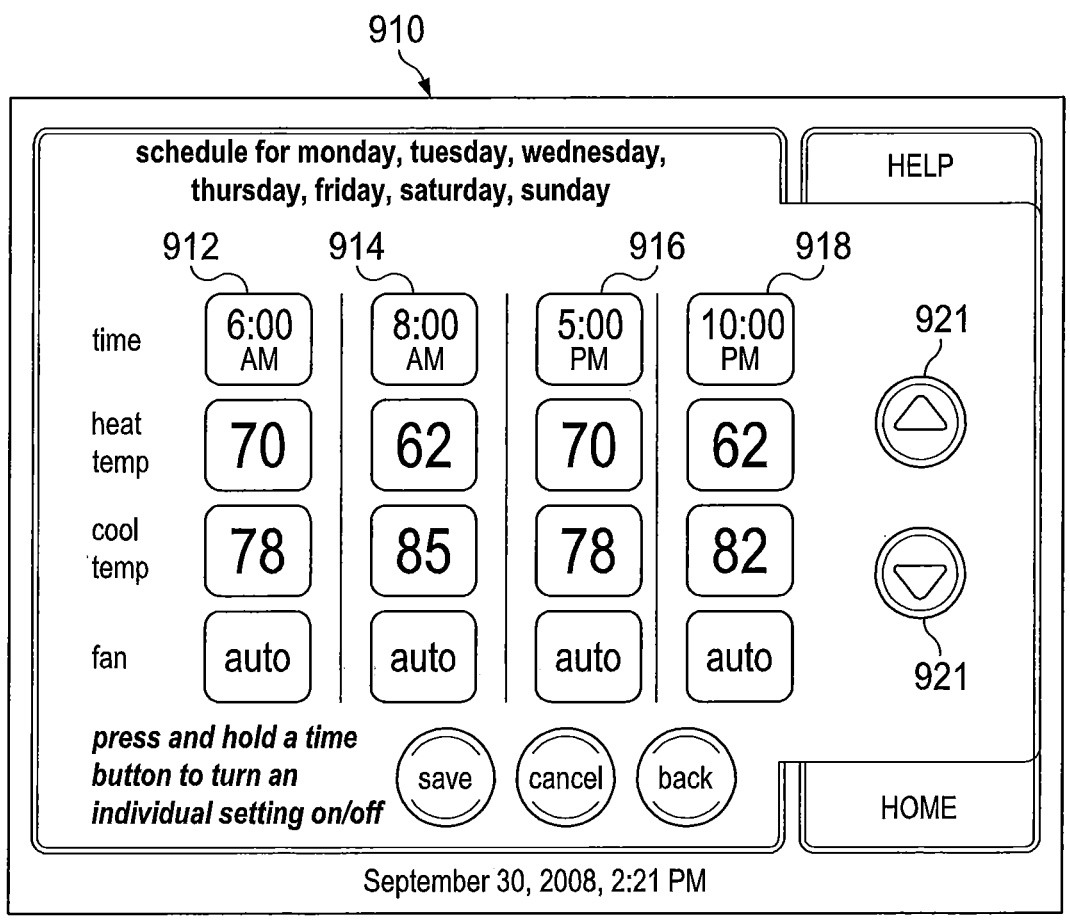
Figures 2, 9B:
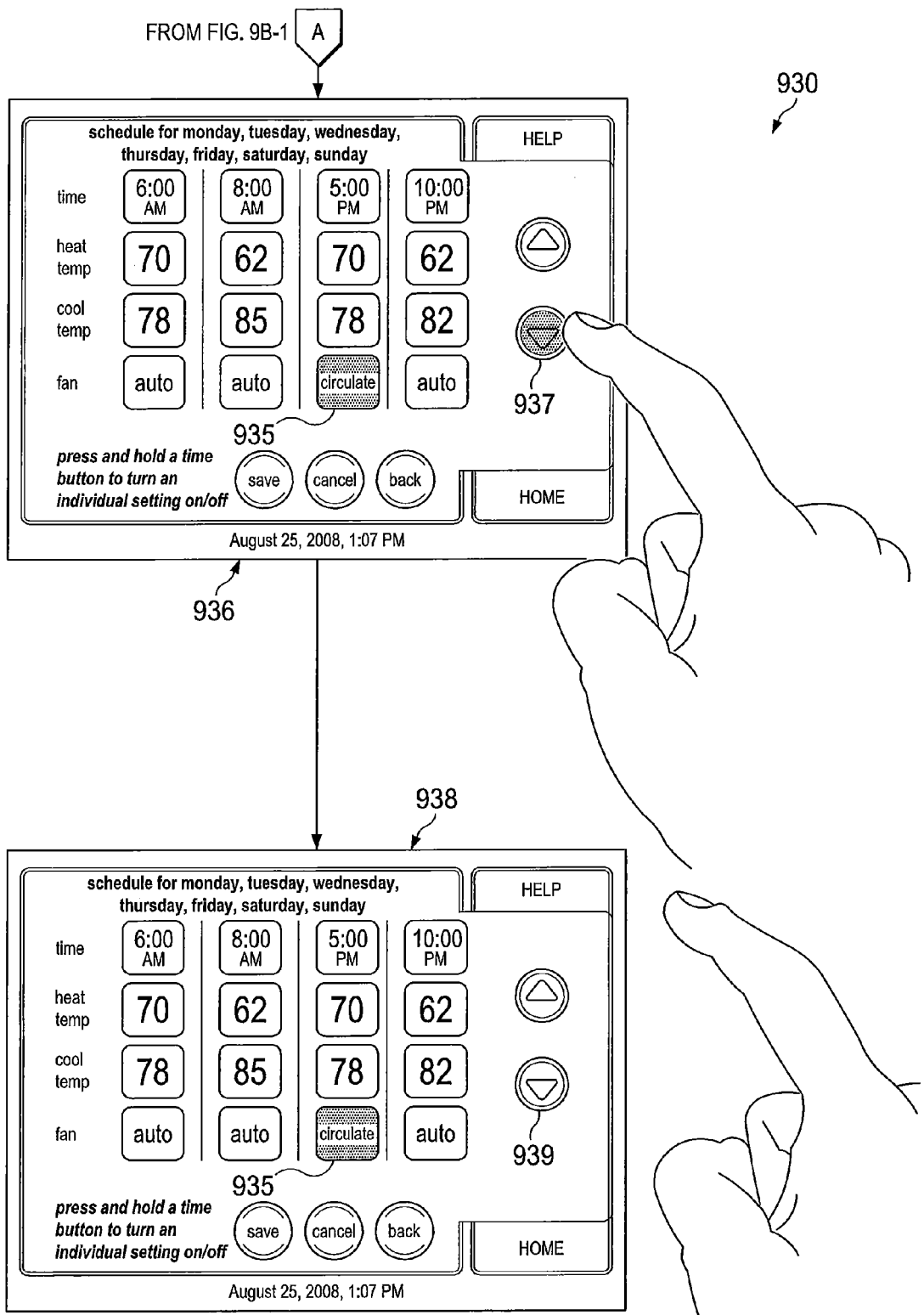
Figure 9C:
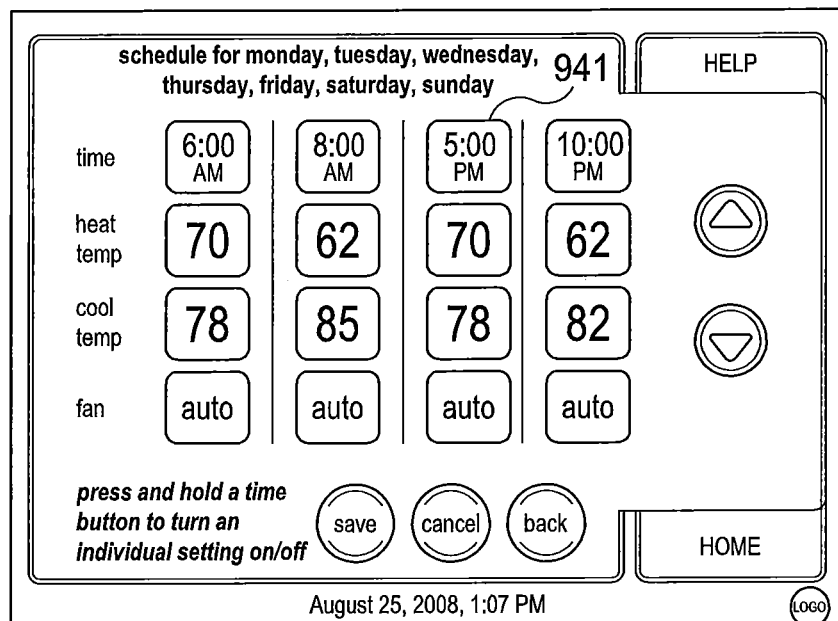
Figure 9C:
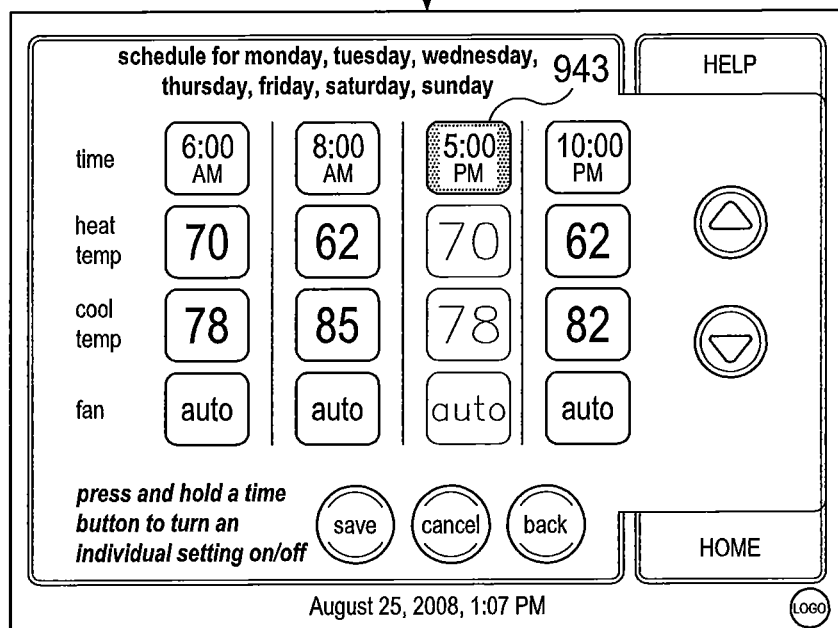
Figures 1, 9D:
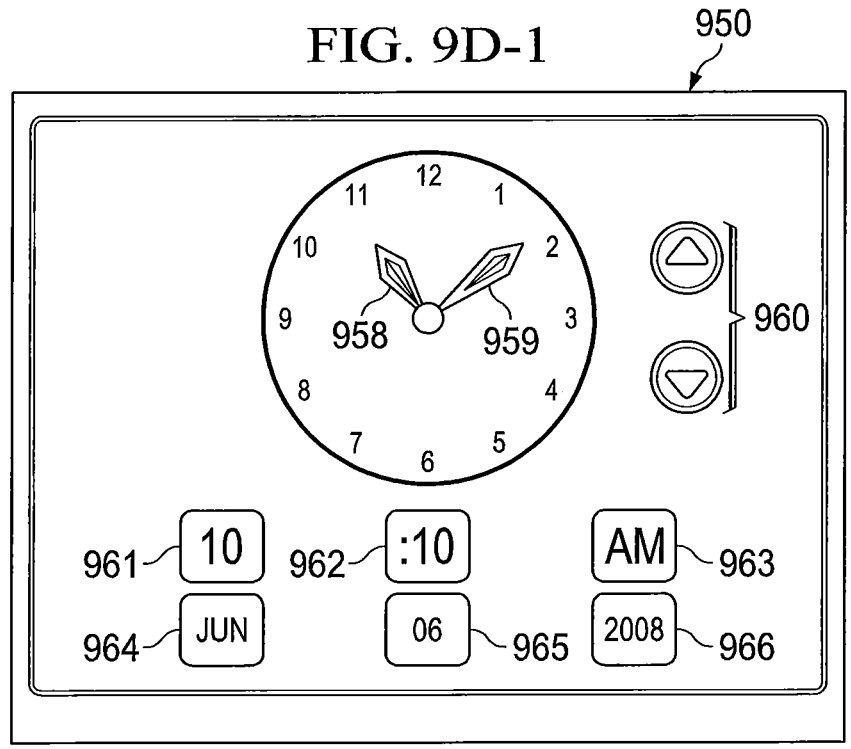
Figures 2, 9D:
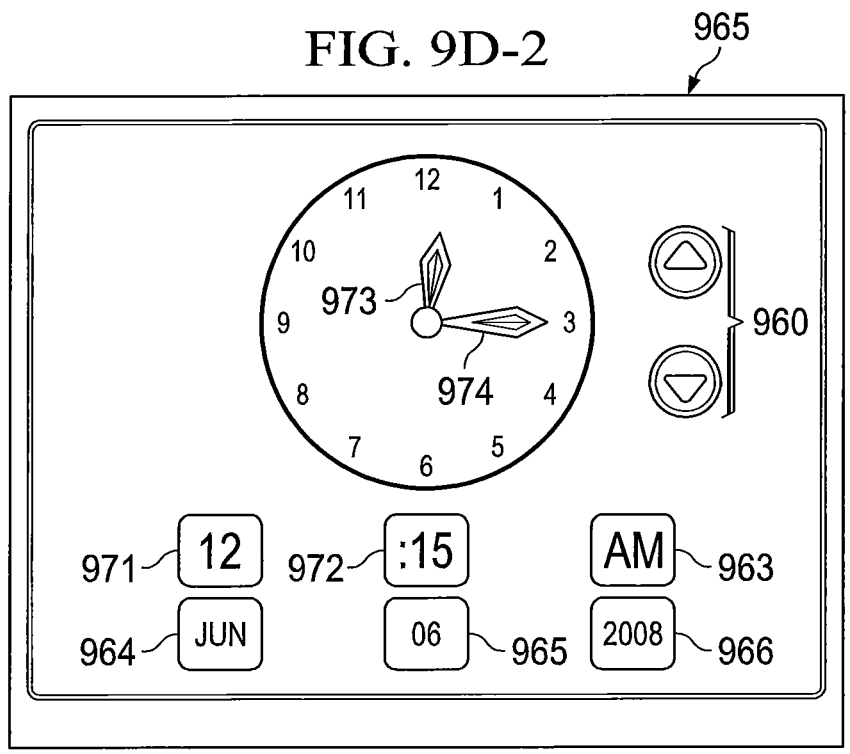
Figure 9E:
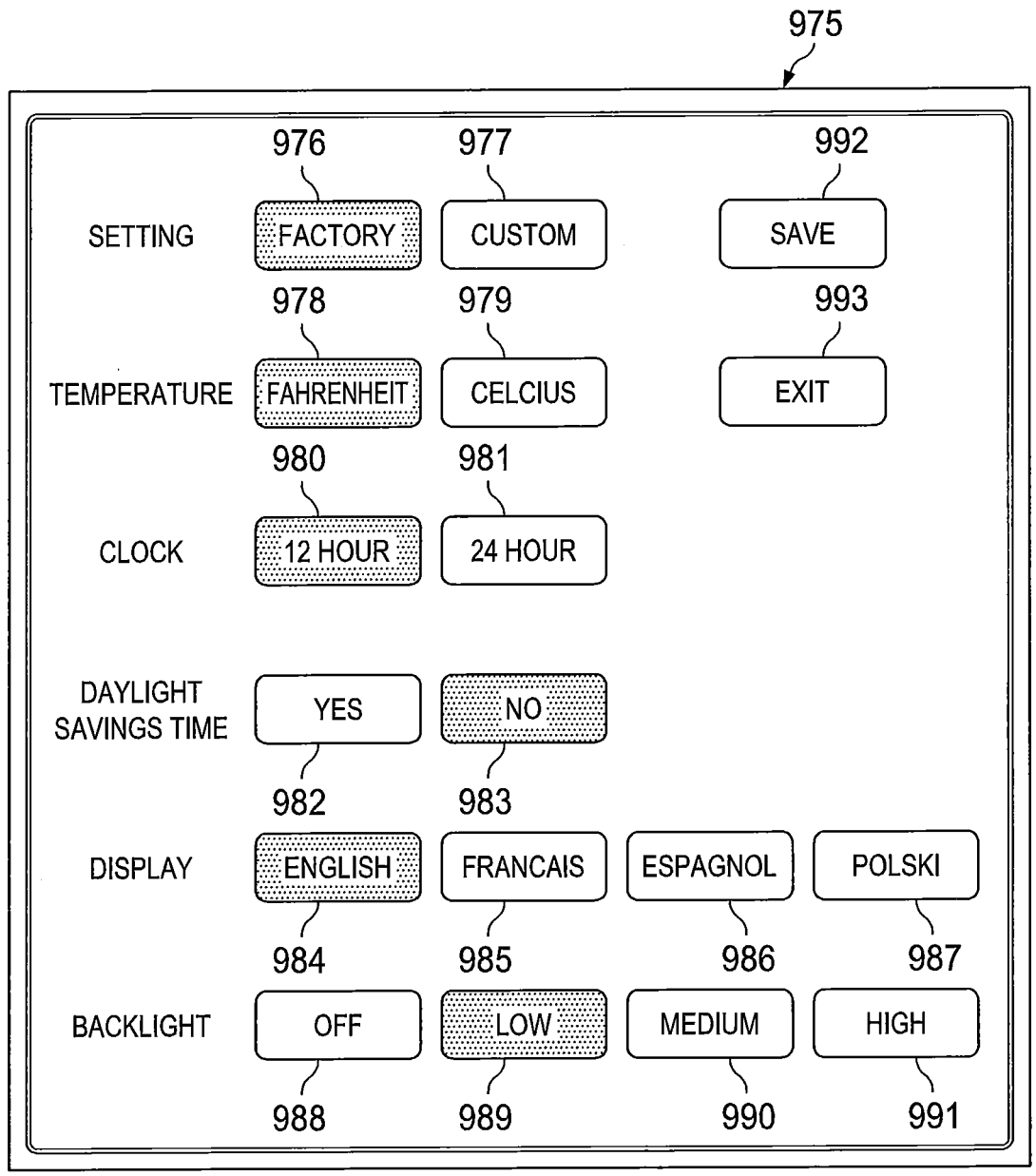
Figure 9F:
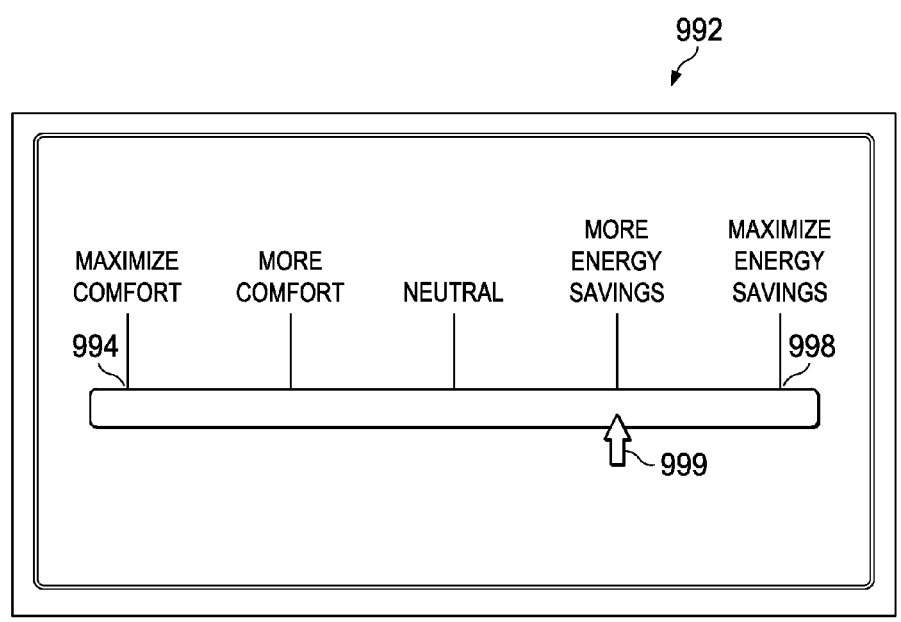
Figure 9F:
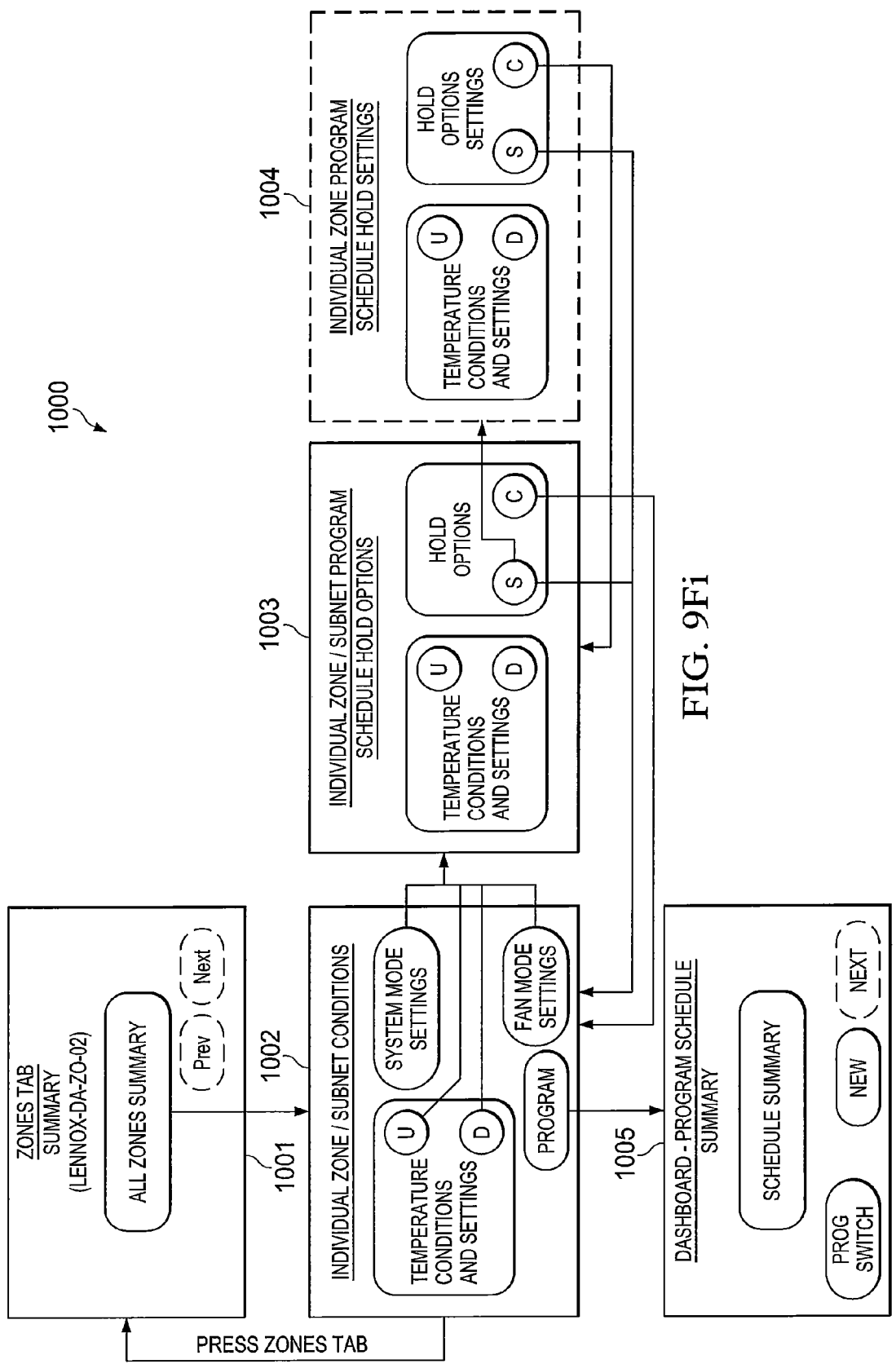
Figure 10A:
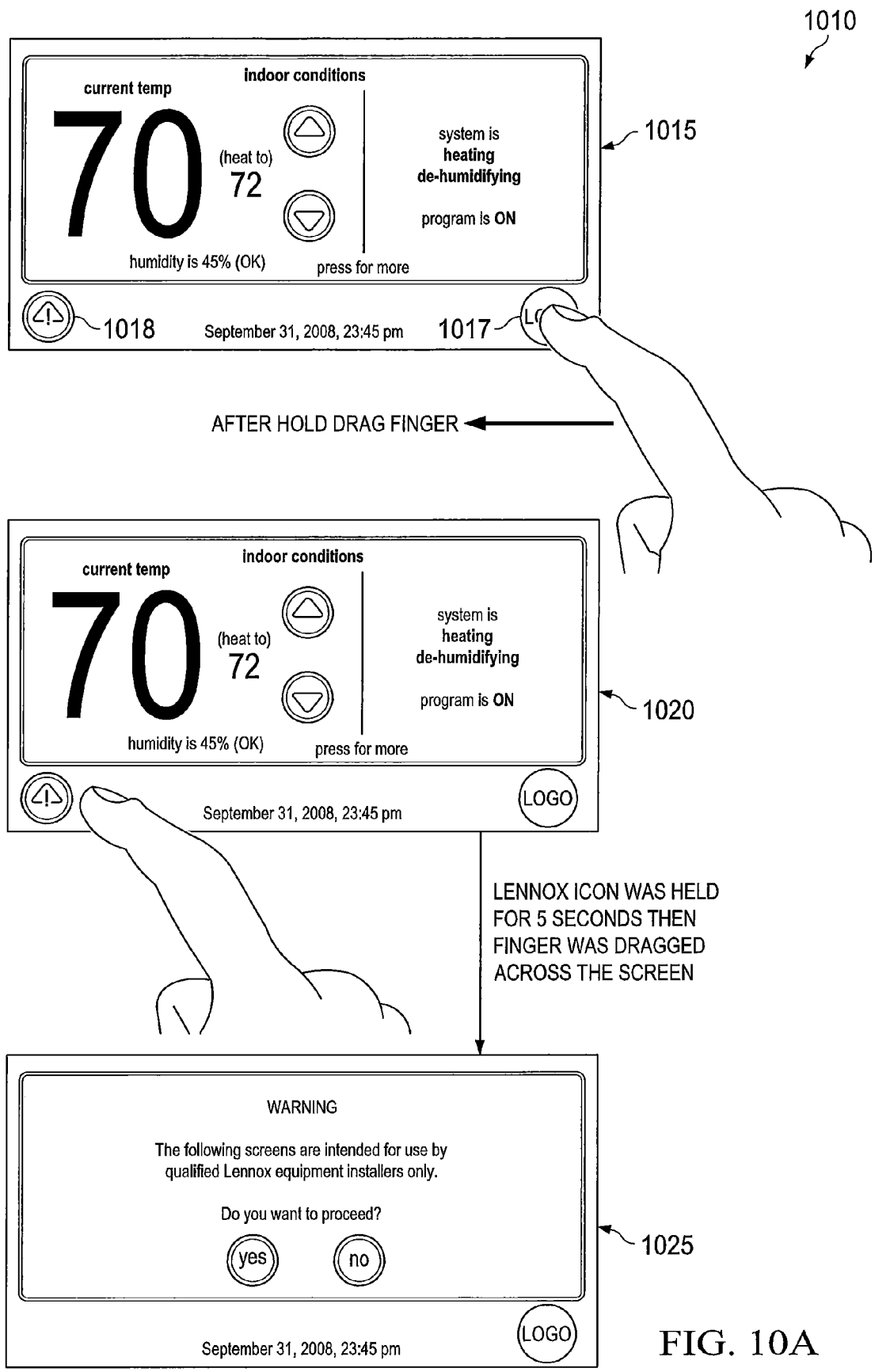
Figure 10B:
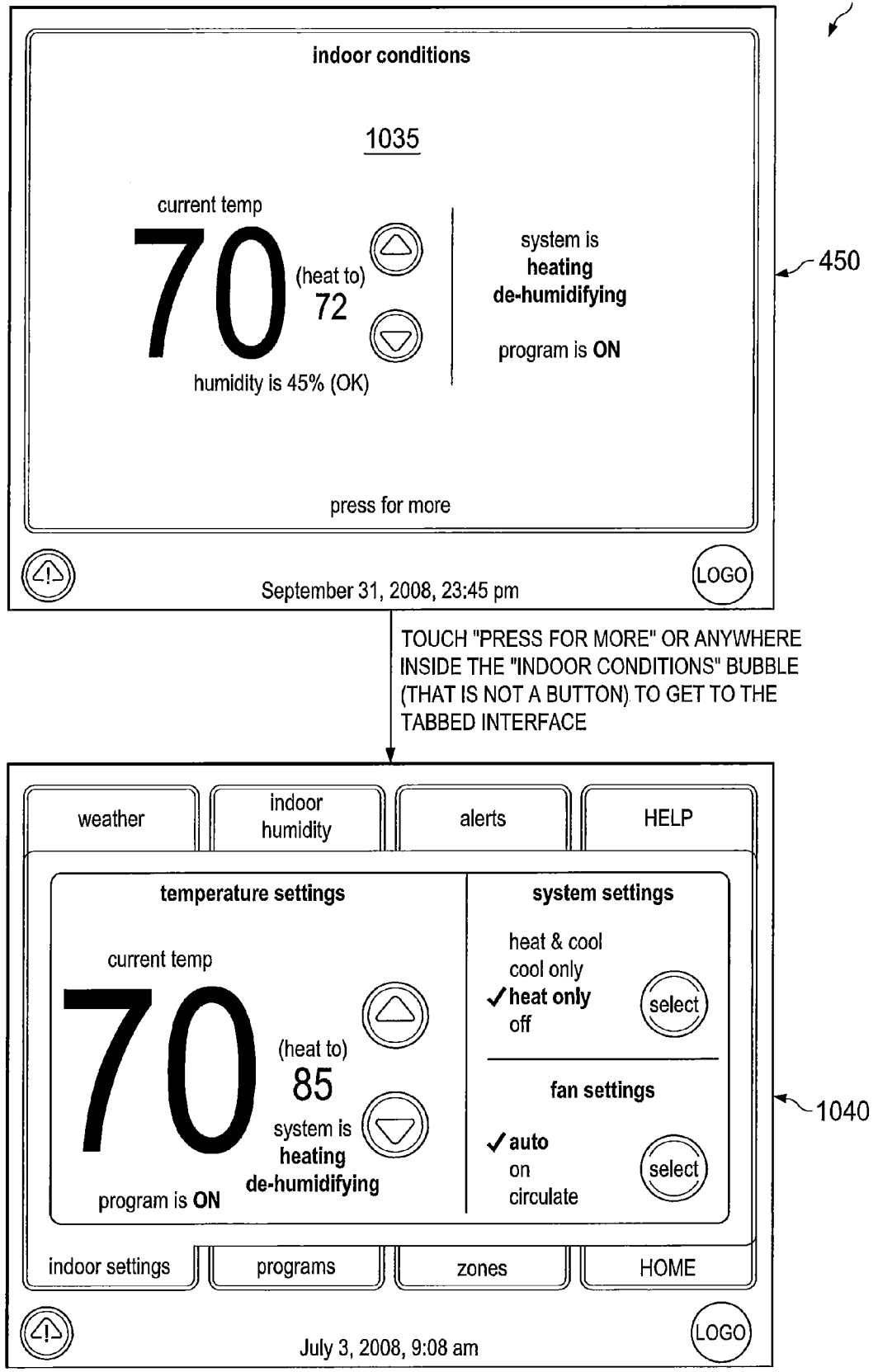
Figure 11B:
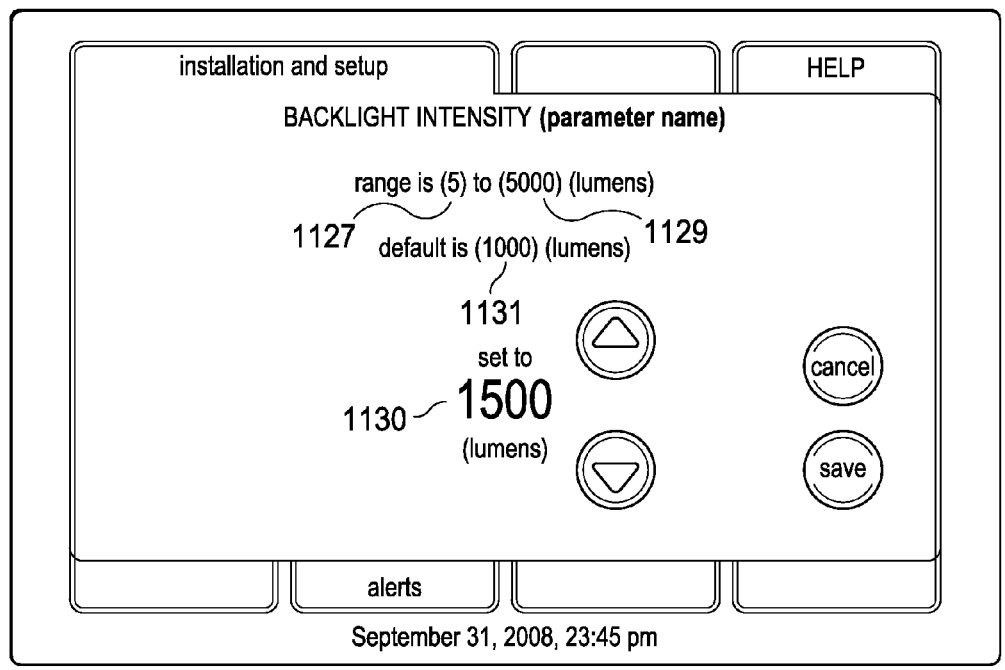
Figure 11C:
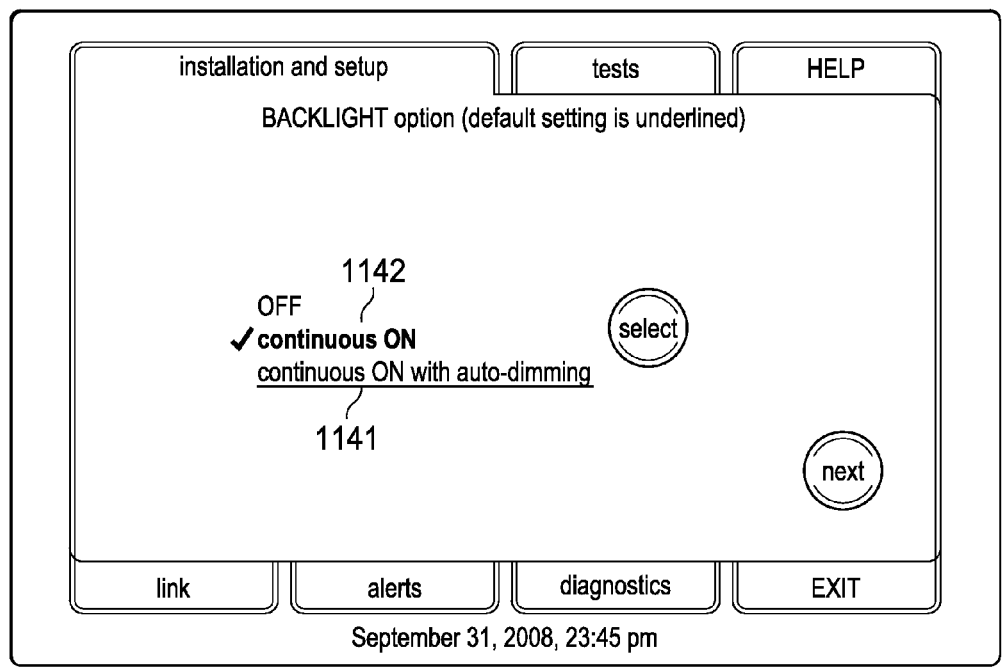
Figures 1, 11D:
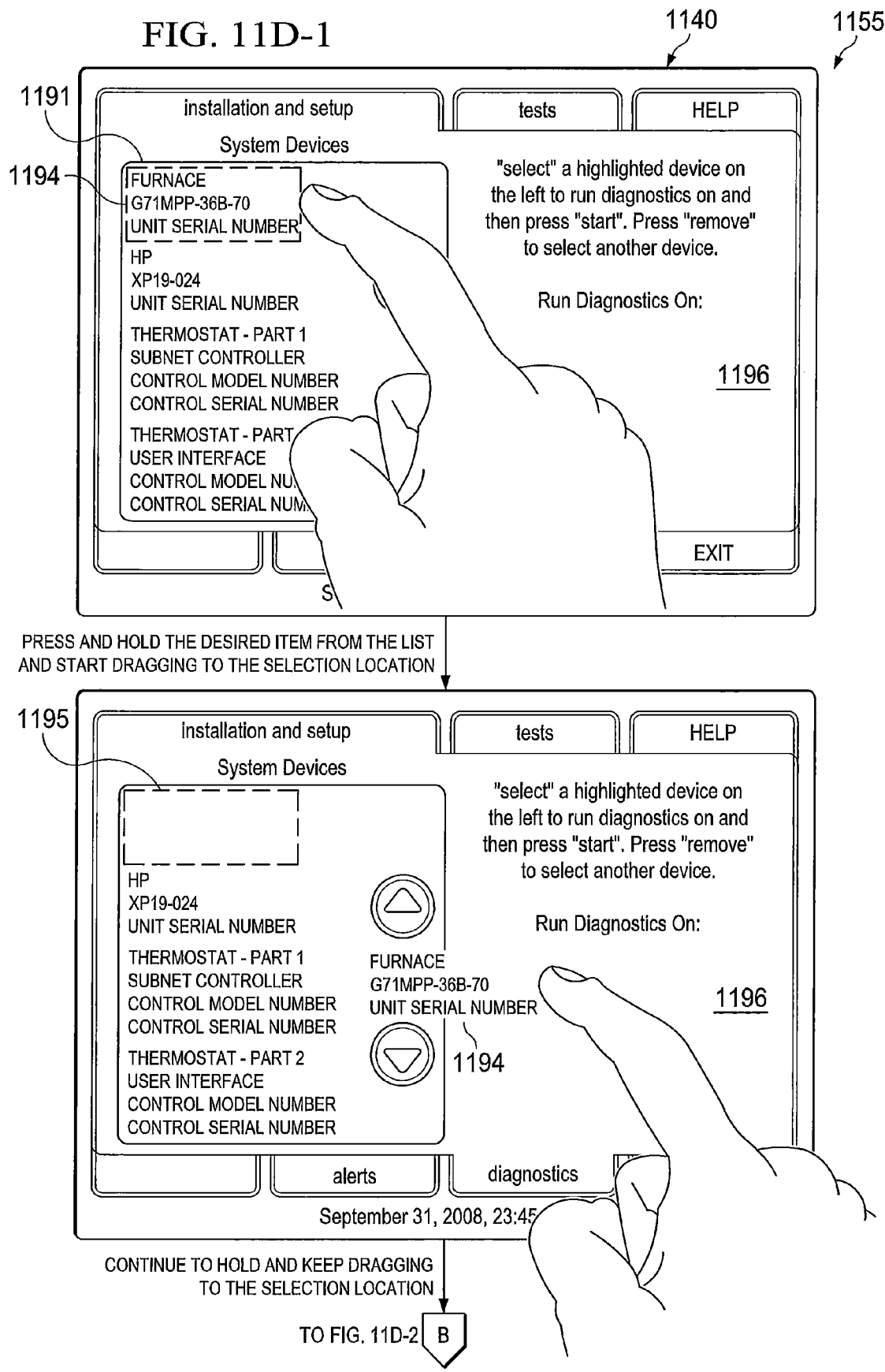
Figures 2, 11D:
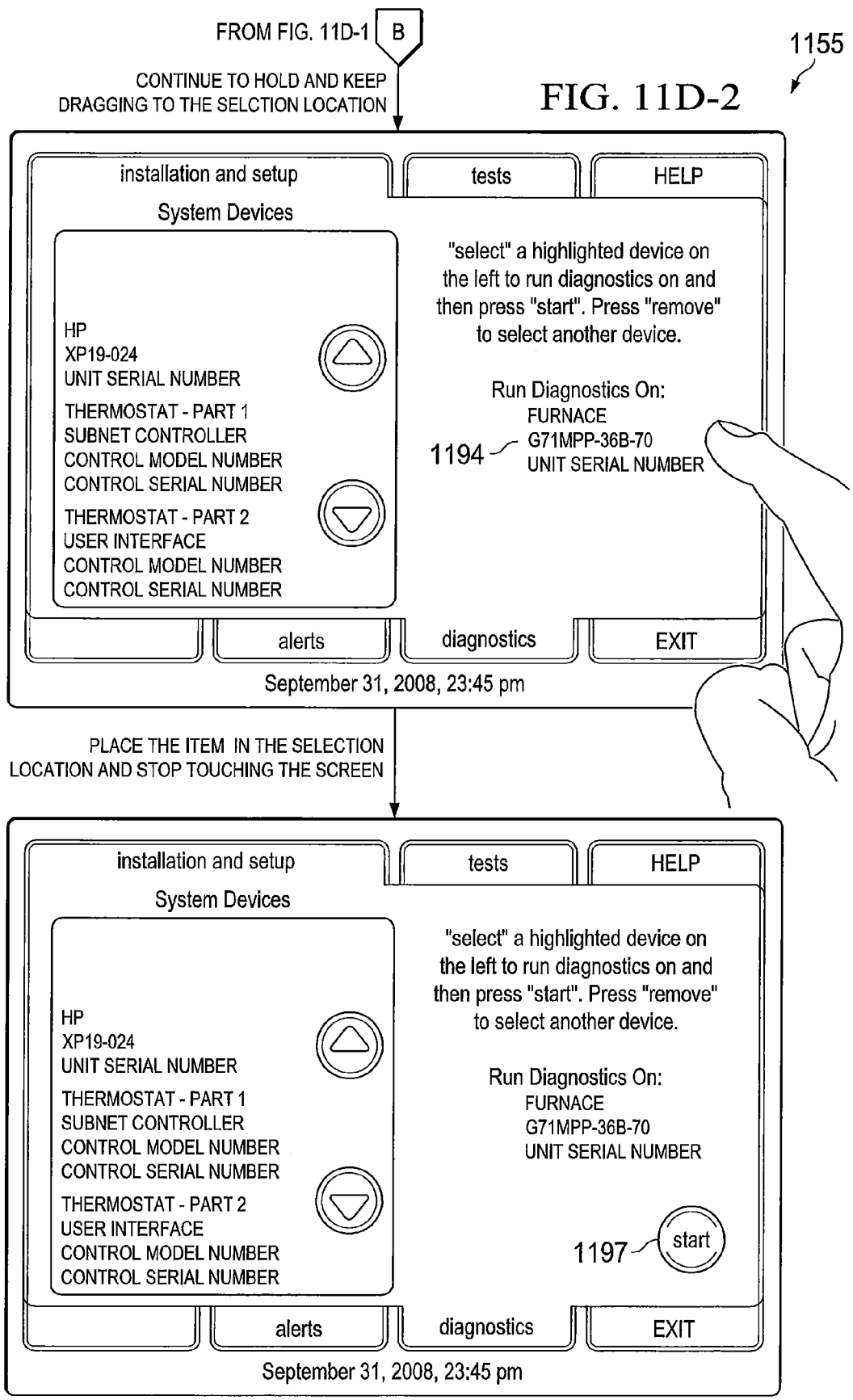
Figure 12:
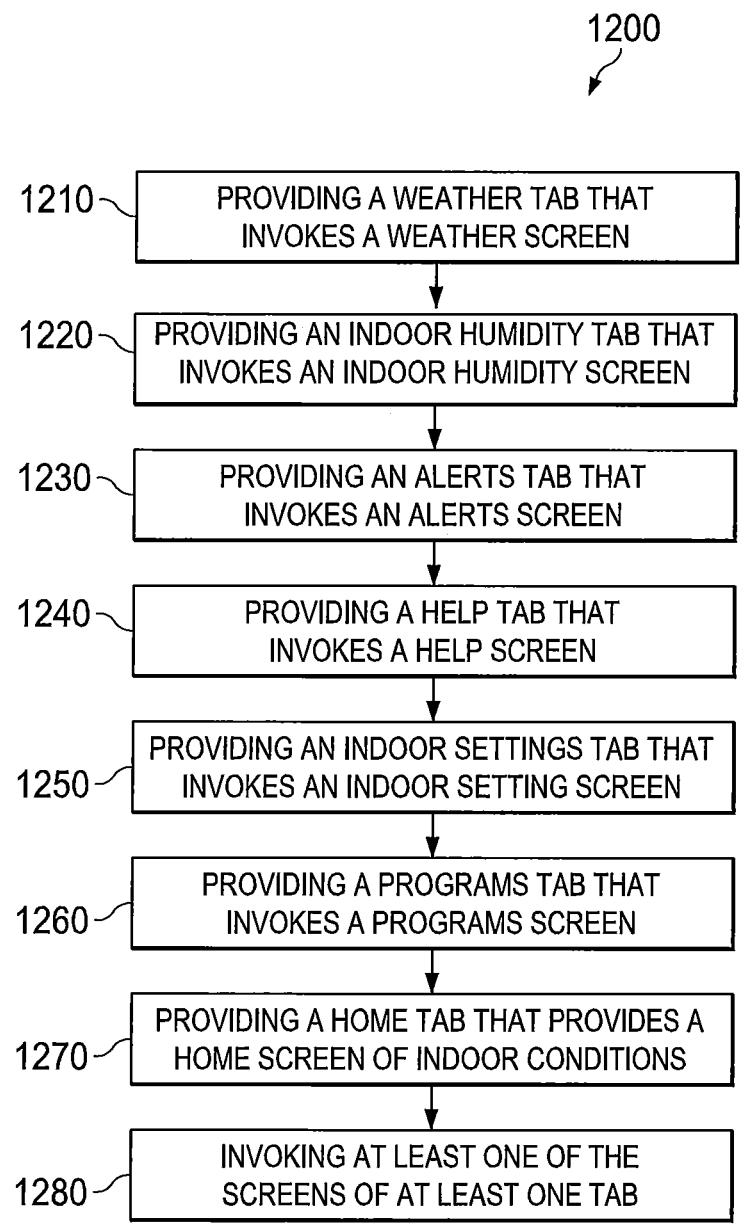
Figure 13A:
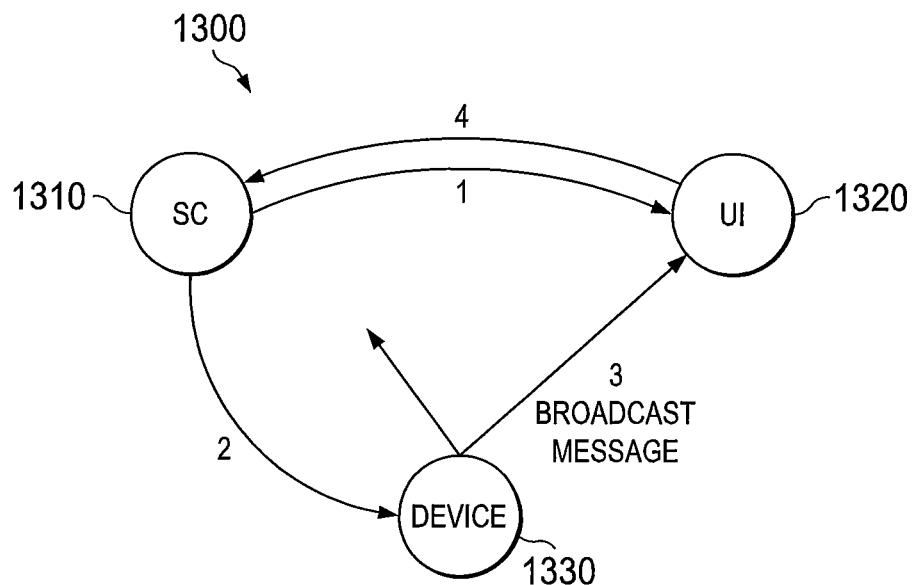
Figure 13B:
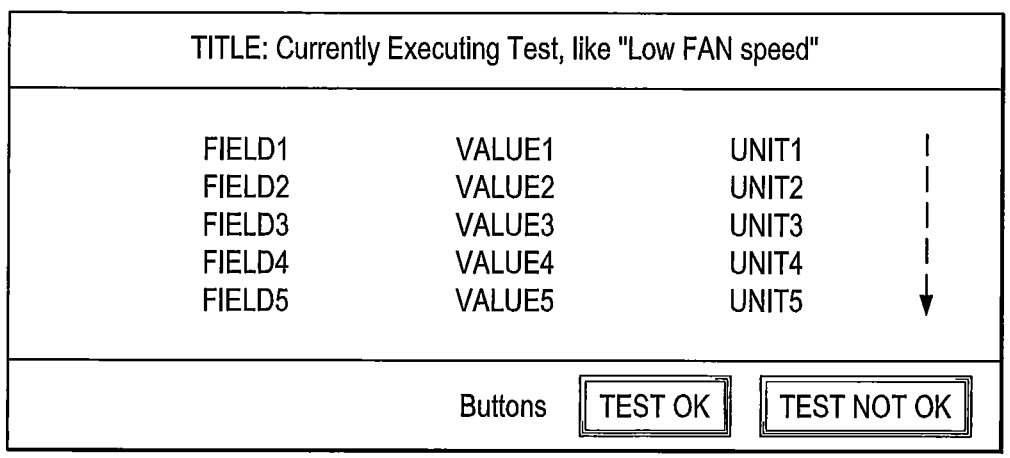

FIGS. 7Ai-7Aiv and 7Bi-7Biv illustrate an exemplary flow of various transitions of a help screen that arise as a result of a previous screen of FIG. 3D;

FIGS. 8A-8D illustrates exemplary screens of found equipment that appears in an indoor settings tab of FIG. 3D as dependent upon equipment being found in the HVAC system of FIG. 1;

FIG. 9A illustrates an exemplary plurality of program schedule setpoints displayed on one screen of a programs tab of FIG. 3;

FIGS. 9B-1 and 9B-2 illustrates an exemplary persistent color inversion for a selected button until a next button press within the programs screen of the programs tab of FIG. 3D;

FIG. 9C illustrates an exemplary deactivation of a time period within the programs screen of FIG. 3D;

FIGS. 9D-1 and 9D-2 illustrate embodiments of a virtual analog clock in a programs screen of FIG. 3D;

FIG. 9E illustrates one embodiment of a program screen that allows for a reset of at least one value related to the dashboard of FIG. 3D;

FIG. 9F illustrates one embodiment of a slider for setting a comfort point for a programs screen of FIG. 3D;

FIGS. 9Fi and 9Fii illustrate exemplary flows of a transition of a programs screen of the dashboard of FIG. 3D;

FIG. 10A illustrates an exemplary movement of a finger across a home screen to allow access to either an installer or a zone screen for an embodiment of the dashboard of FIG. 3D;

FIG. 10B illustrates an exemplary invocation of a plurality of dashboard tabs from a home screen of FIG. 3D;

FIGS. 11A-1 and 11A-2 illustrate embodiments of an installer dashboard that employs screens of FIG. 4;

FIG. 11B illustrates an exemplary display of minimum, maximum and default values for one embodiment of an installer screen of FIGS. 11A1 and 11A2 for a device connected to the HVAC system of FIG. 1;

FIG. 11C illustrates an exemplary underlining of default value for one embodiment of an installer screen of an installer screen of FIGS. 11A1 and 11A2;

FIGS. 11D-1 and 11D-2 illustrates an exemplary moving a device icon for an item to be diagnosed to a right side of a diagnostic screen of an embodiment of the installer dashboard of an installer screen of FIGS. 11A1 and 11A2;

FIG. 12 illustrates an exemplary method for providing an interface for an HVAC system of FIG. 1; and FIGS. 13A and 13B illustrate a subnet controller teaching a user interface how to interpret data on a network within bounds earlier defined as a user interface screen.

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose and perhaps able to repair itself, may require fewer, simpler repairs and may have a longer service life.

FIG. 1 is a high-level block diagram of an HVAC system, generally designated 100. The HVAC system may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In the context of a zoned system 100, the one or more dampers 115 may be referred to as zone controllers 115. In an alternative embodiment, the system 100 is configured to provide heating and, therefore, includes one or more furnaces 120, typically associated with the one or more air handlers 110. In an alternative embodiment, the system 100 is configured to provide cooling and, therefore, includes one or more refrigerant evaporator coils 130, typically associated with the one or more air handlers 110. Such embodiment of the system 100 also includes one or more compressors 140 and associated condenser coils 142, which are typically associated in one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units.

For convenience in the following discussion, a demand unit 155, sometimes referred to as a unit 155, is representative of the various units exemplified by the air handler 110, furnace 120, and compressor 140, and more generally includes an HVAC component that provides a service in response to control by the control unit 150. The service may be, e.g., heating, cooling, or air circulation. The demand unit 155 may provide more than one service, and if so, one service may be a primary service, and another service may be an ancillary service. For example, for a cooling unit that also circulates air, the primary service may be cooling, and the ancillary service may be air circulation (e.g. by a blower).

The demand unit 155 may have a maximum service capacity associated therewith. For example, the furnace 120 may have a maximum heat output (often expressed in terms of British Thermal Units (BTU) or Joules), or a blower may have a maximum airflow capacity (often expressed in terms of cubic feet per minute (CFM) or cubic meters per minute (CMM)). In some cases, the demand unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus, couples the one or more air handlers 110, the one or more furnaces 120, the one or more evaporator coils 130, the one or more condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages.

FIG. 2 is a high-level block diagram of one embodiment of an HVAC data processing and communication network 200 that may be employed in the HVAC system 100 of FIG. 1. One or more air handler controllers ("AHCs") 210 may be associated with the one or more air handlers 110 of FIG. 1. One or more integrated furnace controllers ("IFCs") 220 may be associated with the one or more furnaces 120. One or more damper controller modules 215, also referred to herein as a zone controller module 215, may be associated with the one or more dampers 114 that interface the one or more dampers to the data bus 180. One or more unitary controllers 225 may be associated with one or more evaporator coils 130 and one or more condenser coils 142 and compressors 140 of FIG. 1. The network 200 includes an active subnet controller ("aSC") 230a and an inactive subnet controller ("iSC") 230i. The aSC 230a is responsible for configuring and monitoring the system 100 and for implementation of heating, cooling, air quality, ventilation or any other functional algorithms therein. Two or more aSCs 230a may also be employed to divide the network 200 into subnetworks, or subnets, simplifying network configuration, communication and control. The iSC 230i is a subnet controller that does not actively control the network 200. In some embodiments, the iSC 230i listens to all messages passed over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane, the subnet controller is referred to generally as an SC 230.

A user interface ("UI") 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260, referred to herein after simply as a comfort sensor, may provide an interface between the data bus 180 and each of the one or more comfort sensors 160.

Each of the components 210, 220, 225, 230a, 230i, 240, 250, 260 may include a general interface device configured to interface to the data bus 180, as described below. (For ease of description any of the networked components, e.g., the components 210, 220, 225, 230a, 230i, 240, 250, 260, may be referred to generally herein as a device 290. In other words, the device 290 of FIG. 2 is a proxy for any of a furnace, a heat pump, a subnet controller, etc., and that device's associated interface means.) The data bus 180 in some embodiments is implemented using the Bosch CAN (Controller Area Network) specification, revision 2, and may be synonymously referred to herein as a residential serial bus ("RSBus") 180. The data bus 180 provides communication between or among the aforementioned elements of the network 200. It should be understood that the use of the term "residential" is nonlimiting; the network 200 may be employed in any premises whatsoever, fixed or mobile. In wireless embodiments, the data bus 180 may be implemented, e.g., using Bluetooth™ or a similar wireless standard.

Generally, the network 200 allows for the remote comfort sensors 160, the control unit 150, and user display 170 and/or remote user displays 170 to operate independently as separate logical units, and can be located in separate locations within the network 200. This is unlike the prior art, wherein these functionalities were required to be located within a single physical and logical structure.

Turning now to FIG. 3A, illustrated is a diagram of a commissioning process 300 of a series of steps that occur in relation to a commissioning of the demand unit 155. The commissioning process 300 includes an enter state 301, a device commissioning state 303, and an exit state 305. The HVAC system 100 can be described as being partitioned into a plurality of subnets, each subnet controlled by its own active subnet controller 230.

Device commissioning can generally be defined as setting operational parameters for a device in the network of the HVAC system, including its installation parameters. Generally, the commissioning process 300 is used by the subnet controller 230 when it is active to: a) set operating "Installer Parameters" for a networked device, such as air handlers 110, (henceforth to be referred to collectively, for the sake of convenience, as the demand unit 155, although other devices are also contemplated), b) to load UI/Gs 240, 250 with names and settings of "Installer Parameters and Features" of the demand units 155, c) to configure replacement parts for the demand units 155, and d) to restore values of "Installer Parameters and Features" in the demand units 155 if those "Parameters and Features" were lost due to memory corruption or any other event. Device commissioning is a process used in the HVAC system 100, either in a "configuration" mode or in a "verification" mode.

In the "configuration" mode, the demand unit 155 shares its information with the active subnet controller 230a in an anticipation of being employable in the HVAC system 100, and an appropriate subnet. Generally, the commissioning process 300 provides a convenient way to change or restore functional parameters, both for the active subnet controller 230a and the demand unit 155.

In both the "verification" mode and the "configuration" mode, the demand unit 155 is checked for memory errors or other configuration or programming errors. There are differences in device 290 behavior between the "configuration" mode and in the "verification" mode, to be detailed below.

The "subnet startup" mode programs the subnet controller 230 to be active. The "subnet startup" mode enables subnet communications, (i.e., communication within a subnet), and also deactivates a "link" sub-mode. A "link" mode may be generally defined as a mode that allows a number of subnets to work together on the same HVAC network 200, and that assigns subnet numbers for each subnet to allow this communication.

The "installer test" mode is employed when an installer installs and tests aspects and demand units 155 of the HVAC system 100. The "normal operations" mode is an ongoing operation of devices 290 of the HVAC system 100 in a normal use.

More specifically, the device commissioning process 300 can be employed with: a) the "configuration" mode, which is invoked when transitioning to the commissioning state 303 from the "subnet startup mode" or "installer test" mode, or the "normal mode" (see below), or b) a "verification" mode. The "verification" mode is invoked when transitioning to the commissioning state 303 from the "subnet startup" mode.

The following describes an illustrative embodiment of a using the process 300 to commission the demand unit 155, first for a "commission" mode, and then for a "verification" mode. The process of commissioning differs from a "subnet startup," in that commissioning requires that the network configuration, including configuration and activation of subnet controllers 230, has already been completed before the commissioning process 300 for the device 290 can start. Please note that there can be more than one subnet controller 230 on a subnet, but only one subnet controller 230a is active at any one time.

In one embodiment, in order to enter into a state 320 of a state machine 310 (described in detail below with respect to FIG. 3B) in the "configuration" mode, the unit 155 receives either: a) an "aSC" ('active subnet controller') Device Assignment message", having "Assigned State" bits set to "Commissioning"; or b) a receipt of an "aSC Change State" message, with "New aSC State" bits set to "Commissioning," from the active subnet controller 230. For both "configuration" and "verification" modes, an "aSC Device Assignment" message can be generally regarded as a message that assigns the unit 155 to a particular active subnet controller 230a. For both "configuration" and "verification" modes, an "aSC Change State" message can be generally regarded as a message that starts and ends employment of the commissioning process 300 for the devices 290.

In one embodiment, in the state 320 in the configuration mode, all units 155 respond to the "aSC Device Assignment" message with their respective "Device Status" messages, indicating that the units 155 are now in the commissioning process 300 due to their response to this previous message. For both "configuration" and "verification" modes, the "Device Status" message can be generally defined as a message that informs the active subnet controller 230a of what actions are being taken by the unit 155 at a given time.

However, alternatively in other embodiments, in the state 320 in the "configuration" mode, if the units 155 are instead busy, as indicated by "aSC Acknowledge" bits of the "Device Status" message sent to the active subnet controller 230a set as a "Control Busy," the active subnet controller 230a waits for the busy units 155 to clear their "aSC Acknowledge" bits before proceeding with further elements of the Commissioning process 300. The units 155 then resend their "Device Status" messages as soon as they are no longer busy.

From this point on, all units 155 send their "Device Status" messages periodically and on any status change, both during and after the commissioning process 300. If the unit 155 does not clear its "aSC Acknowledge" bits within a minute, the active subnet controller 230a sends an "Unresponsive Device2" alarm for each such unit 155. If in "configuration" mode, the active subnet controller 230a remains in the waiting mode indefinitely, until the unit 155 responds correctly, or the subnet is reset manually or after a timeout is reached. In "verification" mode the active subnet controller 230a proceeds further to exit the state.

In the "configuration" mode, each unit 155 remembers all of its optional sensors that are currently attached to it. Furthermore, each unit 155 may store a local copy in its non-volatile memory ("NVM") of any other unit features that it is dependent on. A unit 155 feature can be generally defined as any datum that is fixed and cannot be changed by the installer, serviceman or the home owner. Changing of a "Feature" value normally involves reprogramming of the unit's 155 firmware.

In at least some embodiments, a feature is something that is a fixed value, that is hard-wired into a device. In other words, no installer or home owner can change it. Features are programmed into the unit 155 during a manufacturing or an assembly process. Features can be recovered in a home, during a Data non-volatile memory ("NVM") recovery substate of Commissioning state only—the recovery substate happens automatically and without installer or user intervention. In a further embodiment, parameters can be changed by the installers only. In a yet further embodiment, the network 200 of the HVAC system 100 employs "variables"—those can be changed by the installers and also the home owners.

In some embodiments, a "Parameter List" is normally a Feature that contains a special list of specific parameters included in the unit 155. Parameter values can be changed, and their state can be changed also (from enabled to disabled and vice-versa), but their presence is set once and for all in a given firmware version. Therefore, a list of Parameters (not their values) is also fixed, and is thus treated as a "Feature."

However, although elements of the "configuration" mode commissioning and "verification" mode commissioning are similar, when the active subnet controller 230 is in "verification" mode instead of in "configuration" mode, the active subnet controller 230a can exit commissioning process 300 regardless of the value of the alarms of the units 155. However, alternatively, if the active subnet controller 230a is in "configuration" mode, the active subnet controller 230a will not exit from its commissioning process 300 for as long as at least one unit's 155 "aSC Acknowledge" flags are set to "Control Busy." In one embodiment of the "verification" mode, the active subnet controller 230a timeouts the installation and resets the subnet to default parameters.

In the "verification" mode, assuming the unit 155 operates with a non-corrupted (original or restored copy) NVM, each unit 155 checks any of its attached sensors to see if they match with the parameters that were present in a most recent configuration of the unit 155. In some embodiments, alarms are generated by the unit 155 for missing or malfunctioning sensors as soon as the faulty condition is detected, to be employed by the user interfaces and gateways present on the subnet to notify the installer or homeowner of the encountered problem. The unexpected absence of certain sensors may inhibit the operation of the unit 155 or the subnet. This is normally manifested by the signaling of the appropriate Service Bits in the Device Status message used by the active subnet controller 230a, to determine the operational viability or health of the subnet's systems.

In some embodiments, the device commissioning process 300 (via the state machine 310) then transitions into a link-mode startup state 330 (FIG. 3B), and then ends, upon either: a) the last unit 155 receiving all of unit 155 parameters that it is dependent on, when in "verification" mode; or b) upon a request by a user, when in "configuration" mode. The active subnet controller 230 then proceeds to ensure that no subnet unit 155 has its "aSC Acknowledge" flag set to a "Control Busy" state. The "aSC Acknowledge" flag not being set indicates that all of a non-volatile memory of a given unit 155 had been written to with the necessary parameters. If no "Control Busy" state is detected, the active subnet controller 230a then issues the "aSC Change State" message, which forces the unit 155 from a commissioning state to a non-commissioning state, in either a "configuration" or a "verification" mode.

In some embodiments, when the unit 155 in the process 300 fails its NVM data integrity check in an "NVM Check State," and the active subnet controller is unable to perform NVM Recovery, the unit 155 instead employs its default data stored in its non-volatile (Flash) memory and/or uses default calculations to initialize the data dependent on other devices in the system. The other device data to be used for commissioning could have been obtained in either the "verification" or "configuration" mode. For data or other parameters that were not transferred or generated as part of that session of the commissioning process 300, default values are used.

In one embodiment, upon a detection of a system configuration error, such as a missing device whose features or parameters the unit 155 depends upon, it uses the locally stored copy of the other device's features that it depends upon, and ignores any potential feature value conflicts. In another embodiment, the unit 155 uses the locally stored copy of other parameters of the unit 155 that it depends on and ignores any potential dependent parameter value conflicts. In other words, the unit 155 employs a first installed parameter as a template for a second installed parameter on a second device. In a third embodiment, the unit 155 will change its parameter or feature values only if explicitly instructed by the active subnet controller 230 or the UI/G 240, 250.

Turning now to FIG. 3B, illustrated is the HVAC device state machine 310 illustrated for a subnet, including the unit 155, in more detail. Solid lines indicate normal state transitions when the subnet is transitioning from one state to another state, dashed lines indicate a subroutine call and red lines, alternating dotted and dashed lines indicate unexpected yet valid transitions. All states other than a state 326 represent device states, and the state 326 represents a message handling routine.

As is illustrated in the present embodiment, a reset state 312 of a subnet advances to a NVR CRC check 316 for a given device (such as unit 155). If the device fails the test, the device advances to a device hard disable 314. If the device passes, however, then in the subnet startup state 320, various features and parameters of the unit 155 are shared with the subnet. Then, in substate 324, device commissioning as described in FIG. 3A occurs. This then leads to an installer test sub-mode 328. This, in turn, then leads to the link mode start-up 330, as described above. Finally, then in a step 334, normal system operation occurs, although the system can reset to state 312 or have error messages in the state 326.

In a further embodiment, during the NVM CRC check 316, the state machine 310 can advance to a NVM programming state 318. This can occur due to such factors as a failure of a non-volatile memory, or an initial programming of the NVM. In a yet further embodiment, each of these units 155 is programmed to deal with one form of a diagnostic message regarding system errors in the state 326, and from there to testing the device 290 itself in an OEM test mode 332.

Turning now to FIG. 3C, illustrated is a state flow diagram 340 for the active subnet controller 230a in relation to the unit 155. Generally, it is the responsibility of the active subnet controller 230a to implement proper state transitions. The other units 155 follow the explicit direction of the aSC 230a for all valid transactions. These state diagrams are included to help ensure that a state of the unit 155 is the same as the subnet controller. The aSC 230a is responsible for device synchronization. If the unit 155 is detected out of synch with the rest of the system, the aSC 230a, in some embodiments, immediately tries to bring the unit 155 to the current system state, if possible.

If an addressable unit 155 is detected in subnet startup 344, the active subnet controller 230a applies asynchronous startup rules, which generally pertain to how many parameters are to be passed between device 290 and the active subnet controller 230.

If an addressable unit 155 is detected in commissioning 345, installer test 346, link mode 347 or normal operation 348 substates, the unit 155, in some embodiments, is brought to the current state via a resend of an "aSC Change State" message, which involves transitioning from a first current aSC state to a second current aSC state.

In some embodiments, if a unit 155 is detected in the OEM Test mode 332 or a Soft Disabled state 322 (FIG. 3B), the unit 155 shall be reset by the active subnet controller 230a in the step 312. If a unit 155 is detected in "Hard Disabled" or "NVM Programming" state, the active subnet controller 230a assumes that it is not available on the subnet.

In a further embodiment, inactive subnet controllers 230i are required to keep the most up to date subnet and HVAC system configuration information. Inactive subnet controllers 230i listen to all UI/G and aSC messages and continuously update their non-volatile memory to attempt to be as consistent as possible with the settings stored in active subnet controller 230.

Aspects of Interface

FIG. 3D illustrates an exemplary HVAC user interface dashboard ("dashboard") 350 to the user interface 240 to both read and program the active subnet controllers 230a, 230i and other elements of the HVAC network 200 of the HVAC system 100. The dashboard 350 can be included within the displays 170.

In the illustrated embodiment, the dashboard 350 includes a weather tab 355, an indoor humidity tab 360, an alerts tab 365, a help tab 370, an indoor settings tab 375, a program schedule tab 380, sometimes referred to herein as a programs tab 380, a zones tab 385 and a home tab 390, each of which invokes its own corresponding user or installer interface screen or screens. There can be some redundancy of information or functionality between screens corresponding to the different tabs, but each tab includes screens that contain at least some information or functionality that is not found in any other single tab. Furthermore, each tab can be either invoked by a user, such as through touching a tab, or each tab can be invoked remotely, such as by an installer.

Reviewing FIG. 3D with aid of FIGS. 3E-1 and 3E-2, generally, pressing the weather tab 355 advances a user to an exemplary weather screen. The weather screen displays current outdoor weather if a current outdoor temperature and/or humidity is available.

Pressing the exemplary indoor humidity tab 360 advances a user to an indoor humidity screen. The humidity screen allows for the user to change a system dehumidify mode. Dehumidify mode selections include: humidify, dehumidify, humidify and dehumidify and off. A user can cycle through these selections.

The exemplary indoor humidity screen allows a user to view both absolute and relative humidity, and also to set "setpoints" for absolute and relative humidity (i.e., points at which a humidifier or dehumidifier is turned on and off). In one embodiment, relative humidity ("RH") can range from 15% to 45% RH and can be either programmed or humidification on demand. Similarly, dehumidification can be from 40-40% RH and can be either programmed dehumidification or demand.

An indoor humidity screen also allows a user to view humidification and dehumidification comfort zones. In this context, a comfort zone can be generally defined as a zone of a HVAC system that has separate setpoints for temperature and humidity, etc.

Pressing the exemplary alerts tab 365 advances a user to an alerts screen. The alerts screen allows a user to obtain dealer information about currently active alerts and set the dashboard 350 to remind a user later for service alerts. In some embodiments, a select button of the alerts screen of the alerts tab 365 allows the user to obtain a dealer's contact information. The select button allows the user to clear an active alert (all service alerts and specified critical alerts, and also allows the user to clear an active alert (service or critical)). In some embodiments, when a "new service/critical alert" occurs or "remind later" extension time expires, the dashboard 350 floods any current screen with an alert, in other words, the alert overlays any other screen.

An alarm message displays alerts visible to the user, whereas all alerts are visible to the installer. The installer can learn of these alerts either viewing the alerts tab 365 of the dashboard 350 in person or remotely through a message conveyed through the user interface/gateway 250.

Pressing the exemplary help tab 370 advances a user to a help screen. The help screen can include context sensitive help, an option to clear a screen and user system configuration. The context sensitive help presents dialog boxes relating to a current screen's functions, and user system configurations can provide access to all user local settings (i.e., any setting that does not require an installer to make a change, but can instead by made by a user.)

In some embodiments, there can be a time-based notification of consumables in the help screen, either for the user or for an installer. These consumables can include, in some embodiments: media filters, UV bulbs and humidifier pads. All information concerning consumables can be accessible by both the installer as well as the user via the help screen. In some embodiments, a user and installer can enable and manually change the time settings for any timer of the HVAC system 100 through the help screen. Similarly, a maintenance reminder can be accessible by the installer, as well as the user, via the help screen.

Pressing the exemplary indoor settings tab 375 advances a user to an indoor settings screen. In one embodiment, the indoor settings screen display indoor temperature measurement and temperature settings. The indoor settings also display the system mode settings and fan mode settings. In one embodiment, system mode selections include: heat, cool, heat and cool, off and emergency heat. Fan mode selections include: automatic, on and circulate. The dashboard 350 allows the user to change the system mode and the fan mode through cycling through various choices.

In one embodiment, equipment employed within the system mode dictates which system modes (heat, cool, heat & cool, emergency heat) are visible. For example, a "Heat & Cool" selection of the system mode is visible only when both heating equipment and cooling equipment are present in the system. Typically, the system mode selection of "Off" is always visible.

The indoor temperature settings screen also allows a user to change current temperature setpoints, (i.e., points at which a heater or air conditioner is turned on and off) unless this would override a programmed setting, in which case, a hold occurs until an end of the programmed time occurs and the new setpoints become the operating values of the HVAC system 100.

The exemplary dashboard 350 also allows its system mode settings and fan mode settings to be obtained and changed via RSBus devices (e.g. User Interface/Gateway 250 coupled to the bus 180) remotely. If the dashboard 350 is requested, remotely or locally, to change the system mode to an invalid setting, the system mode is not changed.

Furthermore, the indoor settings tab 375 allows for a user/installer to view all system information and comfort settings (i.e., temperature and humidity) and allow editing of all current settings, as well as fan mode settings. The indoor settings tab 375 allows the fan mode (on, auto, circulate) to be obtained and changed via the RSBus (e.g., via bus 180 and user interface/gateway 250.)

Pressing the exemplary programs tab 380 advances a user to a programs schedule screen. The programs schedule screen allows for viewing/editing/enabling future program schedule events (e.g., temperature setpoints, system modes and fan modes) in the HVAC system 100. The programs screen allows a programming of event times, temperature setpoints and fan mode for each pre-defined period. A program schedule does not run when the system mode is set to "off."

In one embodiment, the programs screen is seven-day programmable with the ability to select multiple days for programming. In one embodiment, the programs screen is capable of programming up to four (4) events per 24-hour period. In one embodiment, program schedules for temperature setpoints are programmed for a seven day schedule, up to four periods per day and are stored in non-volatile memory. In one embodiment, program schedule events can be set in 15-minute increments of time. The scheduled events execute in order based on time of day. In one embodiment, the user interface 240 provides the capability to enable/disable any period of any given day by pressing the corresponding time button for two seconds.

Generally, if a mode changes, such as a fan mode change, is made within the program schedule screen is made while a program schedule of the programs tab 380 is actively executing, a program schedule "hold" mode is invoked until a next program schedule event, at which time the new setpoint is acted upon. If a temperature setpoint change is made while the program schedule of the programs tab 380 is not active, the dashboard 350 updates the display with the new setpoint and acts upon this new setpoint.

Generally, the exemplary dashboard 350 allows its programmed temperature setpoints (heat, cool) and modes to be obtained/changed via RSBus devices (e.g. User Interface/Gateway 250 over the bus 180) remotely. If the dashboard 350 is requested (remotely or locally) to change either setpoint, either temperature or humidity, to a setting beyond the setpoint limits, the setpoint is not changed. If the dashboard 350 is requested remotely or locally to change the fan mode or system mode to an invalid setting, the fan mode or system mode is not changed.

In some embodiments, the cooling setpoint is shown only when cooling equipment is present in the system. Likewise, the heating setpoint is shown only when heating equipment is present in the system. The dashboard 350 may not allow two program scheduled events to begin at the same time. In other words, there can be only one setpoint for either a humidity or a temperature for a given time period—one for each.

In one embodiment, up and down arrows of a program screens of the programs tab 380 allows the user to edit a selected box information. A save button allows the user to save changes to the program schedule. A cancel button allows the user to quit the program schedule edit screen without saving changes. A back button returns the user to the program schedule day selection screen. (Not illustrated.)

In some embodiments, pressing the zones tab 385 advances a user to a zone screen which, in one embodiment, is accessible only by an installer with a proper key. Generally, the zone screen deals with information that is pertinent to programming HVAC equipment for various environmental "zones" within the HVAC system (e.g., living room, bedroom, kitchen, etc.) The zone screen therefore advises the user to contact the manufacture for more information regarding the zone screen. The zones tab 385 then either advances to a home screen of the programs tab 380 or back to the overall user dashboard 350.

Generally, the home screen of the home tab 390 includes a summary of indoor environmental conditions for a user. A home screen indicates a status of the program schedule (ON, OFF). The home screen indicates temperature control status (heating, cooling, off, waiting) as well as humidity control (humidifying, dehumidifying, waiting) of the HVAC system 100. In one embodiment, when a given system is set to "off," only "system is off" is displayed in the home screen.

In some embodiments, the dashboard 350 returns to the home screen after 30 seconds has elapsed since a last screen or tab press, including from any other tab of the dashboard 350. In some embodiments, after a 30 second period of inactivity, any changes made to a screen requiring an active "set" or "save" button press are lost. The dashboard 350 instead returns to the home screen. In some further embodiments, after a user-selectable time period of inactivity, an initial screen press, even upon a tab, causes only a backlight to activate with the home screen as the initial screen shown. The home tab 390 can include a series of screens that are navigable from the home screen via an icon press.

Although not illustrated in FIG. 3D, an installer dashboard including installer screens can also be accessed through the home screen by an installer with a proper key. Generally, the installer screens allow for an installation and configuration of various pieces of equipment in the HVAC system 100. The installer screens can also enable various default values as parameters of operation.

In some embodiments, when a button of a screen of the dashboard 350 is held, the dashboard 350 initially displays an update to the value being changed at a rate of change of 0.5 seconds. After a button hold of 3 seconds, the rate of change is increased to 0.25 seconds.

The user dashboard 350 can itself be a color and touchscreen. The dashboard 350 can include a dynamic full color dot matrix LCD display. A touch pad may be built into/over the dashboard 350. Typically, a maximum delay between any key press and display feedback (indication by selected button, screen change, etc.) is 0.2 seconds.

FIG. 4 illustrates a high-level flow diagram 400 of exemplary transitions, for both user and installer, between user interface screens corresponding to various tabs of the exemplary dashboard of FIG. 3D and various exemplary interface screens of an interface dashboard of FIGS. 11A1 and 11A2.

The exemplary flow 400 has an installer screen flow 401 and a user screen flow 451. The installer screen flow 401 of the dashboard 350 provides access to all installer screens (including subnet start up, configuration, commissioning, installer tests, alerts and diagnostics). The screens of the user screen flow 451 are accessible through the tabs 355-390 of FIG. 3D, with the exception of a new alert screen 452, which the dashboard 350 generates upon a new alert. In a further embodiment, the dashboard 350 allows each screen of the flow 400 to be invoked remotely by a user and/or installer via the User Interface/Gateway 250.

Upon power-up of the HVAC system 100, an installation tab 402 of the installer flow 401 appears. Unless an installer inputs a correct key code within a given time period, the flow 400 transitions to a home screen 450. However, if the installer inputs the correct key, an installer screen corresponding to the installer test tab 404 appears. The installer can then install and configure various devices in the HVAC system 100. After installation, the installer flow 401 then advances to the home screen 450.

In one embodiment, the installer flow 401 includes a series of screens that are accessible from the home screen 450 via both a) an icon press; and then b) a correct entry of a correct key sequence. In one embodiment, pressing a dealer logo, such as a "Lennox™" logo, on the home screen 450 for 5 seconds allows an installer to execute system startup processes, as well as view/edit the alerts and diagnostics via the installer configuration screens of the flow 401.

Generally, the home screen 450 provides a high level overview of the current indoor conditions. The home screen 450, in some embodiments, displays the indoor temperature, indoor relative humidity status, outdoor temperature and system status (e.g. heating, cooling, off, humidifying, dehumidifying, etc.) of the HVAC system 100.

From the home screen 450, a warning screen 412 for an installer can be generated by the dashboard 350. This warning screen 412 can be conveyed to an installer either directly when installer is present, or through a remote communication, such as over the bus 180 through gateway 250, and then perhaps through the Internet to the installer. The warning screen 412 generally states that there is a type of problem that should be addressed by an installer, but may not give all details. Once the warning screen 412 is acknowledged by an installer, an alerts tab 408 has a screen that is the default screen for the dashboard 350.

From the warning screen 412, the installer can also advance to either a diagnostics screen of a diagnostics tab 406, a contextual help screen of the installer help tab 414, the installer screen of the installation setup tab 402, or an installer screen of the installer test tab 404.

In some embodiments, for a user, from the home screen 450, the new alert screen 452 can arise upon a first detection by the HVAC system 100 of an alert. Similarly, the alerts tab 365 can be used to invoke and view an alerts screen. In one embodiment, the alerts tab 365 can be used to access every other tab in the dashboard 350.

In the illustrated exemplary flow 400, the home screen 450 transitions to either the alerts tab 365 if an active alert exists or the indoor settings tab 375. From the indoor settings tab 375, all other user tabs are also accessible. These include the weather tab 355, the indoor humidity tab 360, the alerts tab 365, the help tab 370, the programs tab 380 and the zones tab 385. Please note that, in some embodiments, the zones tab 385 can transition to the home screen 450, and the zones of the zones tab 385 are typically set by an installer of the HVAC system 100.

Regarding the alerts screen 452, in one embodiment, if the dashboard 350 is displaying a popup alert at the time when another alert (to be displayed to the user) occurs, the dashboard 350 continues to display the current alert screen 452. When a current alert has been addressed, the dashboard then overwrites the screen with the newest alert. If multiple popup alerts exist simultaneously, the dashboard 350 displays each (in order of occurrence—timestamp) one-by-one after the previous new alert is addressed. There is not a time-out for a new alert flooding the screen. The new alert remains on the screen of the dashboard 350 until addressed by the user/installer.

Figure 5:
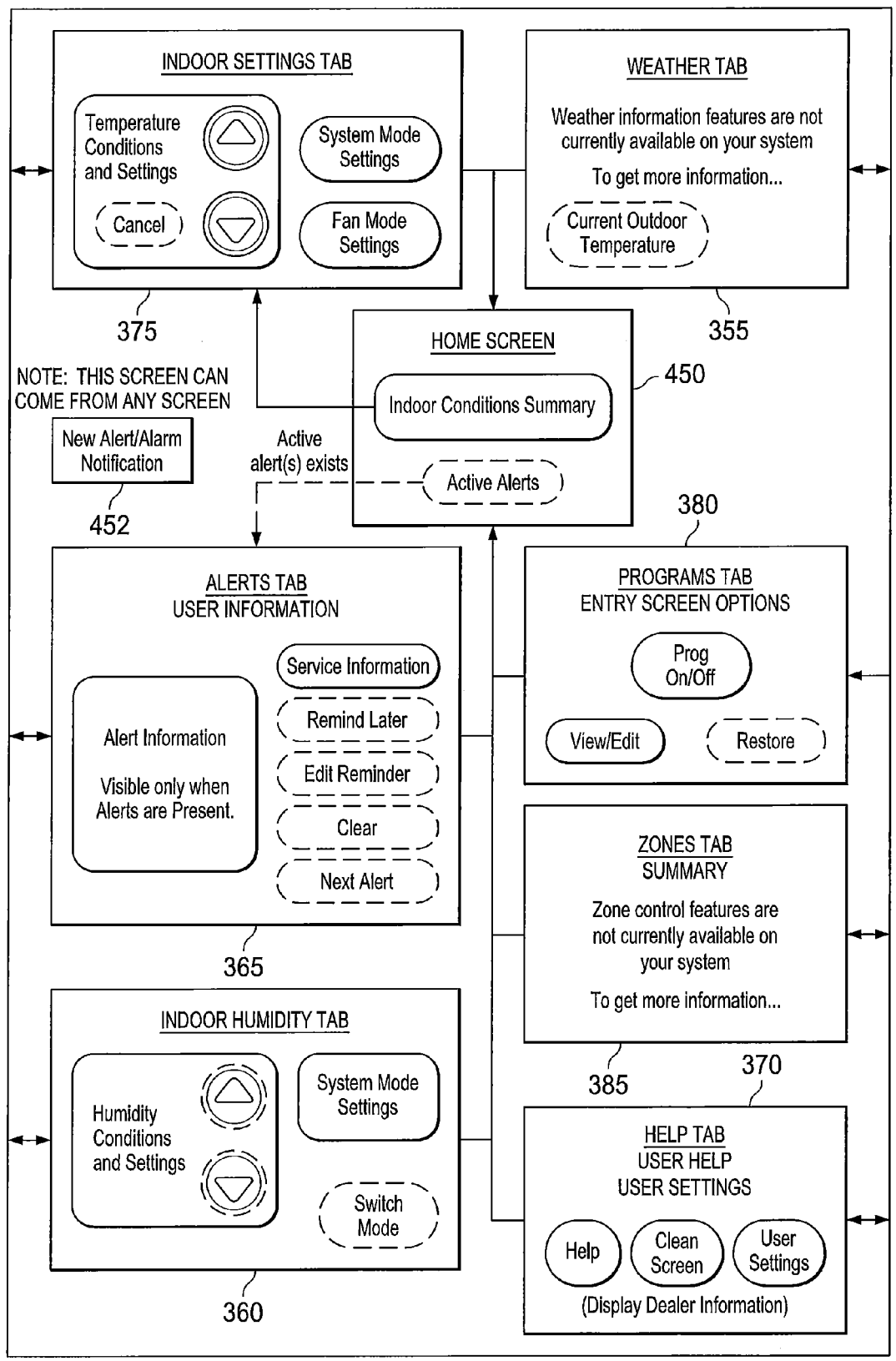
FIG. 5 is an exemplary flow diagram of the user interface screens of FIG. 4, illustrated in more detail.

Turning briefly now to FIG. 5, illustrated are exemplary corresponding screens of the tabs of FIGS. 3D and 4 illustrated in more detail. The weather tab 355 can display weather info when available. The indoor humidity tab 360 enables a user to set humidity modes and setpoints. The alerts tab 365 can display alert info. The home screen 450 can interact with the other illustrated tabs. The indoor settings tab 375 can set display and set temperature conditions and settings (setpoints), overall system mode and fan mode. The programs tab 380 enables a user to program various times. The zones tab 385 forwards an admonition to the user to request more information from the manufacturer, and then transfers back to the home screen 450.

Generally, FIGS. 5A through 5D-2, to be discussed below, illustrate aspects of the present disclosure that are applicable to at least some, and can be to all, of the user screens of FIG. 3D and FIG. 4.

Figure 5A:
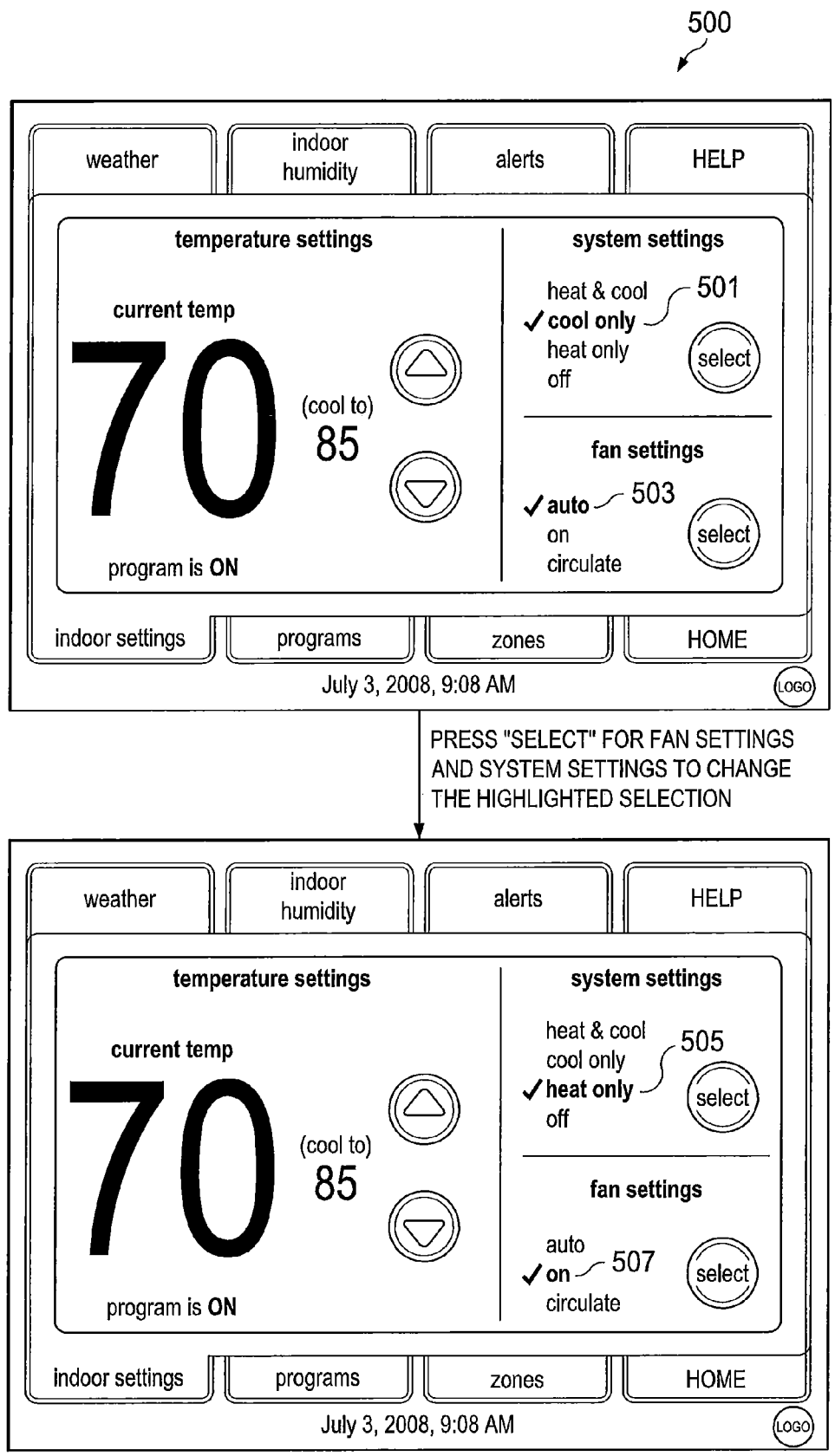
FIG. 5A illustrates one embodiment of exemplary screens that bold a selected item when that selected item is compared to other selected items in a list of a tab of the dashboard of FIG. 3D.

Turning now to FIG. 5A, illustrated is an embodiment of the screen 500 of the dashboard 350 that bolds a selected item 501, 503, 505, 507 relative to other selected items in a list in the dashboard 350. The user can highlight a selected item in white; the other selected items are in grey.

Figure 5B:
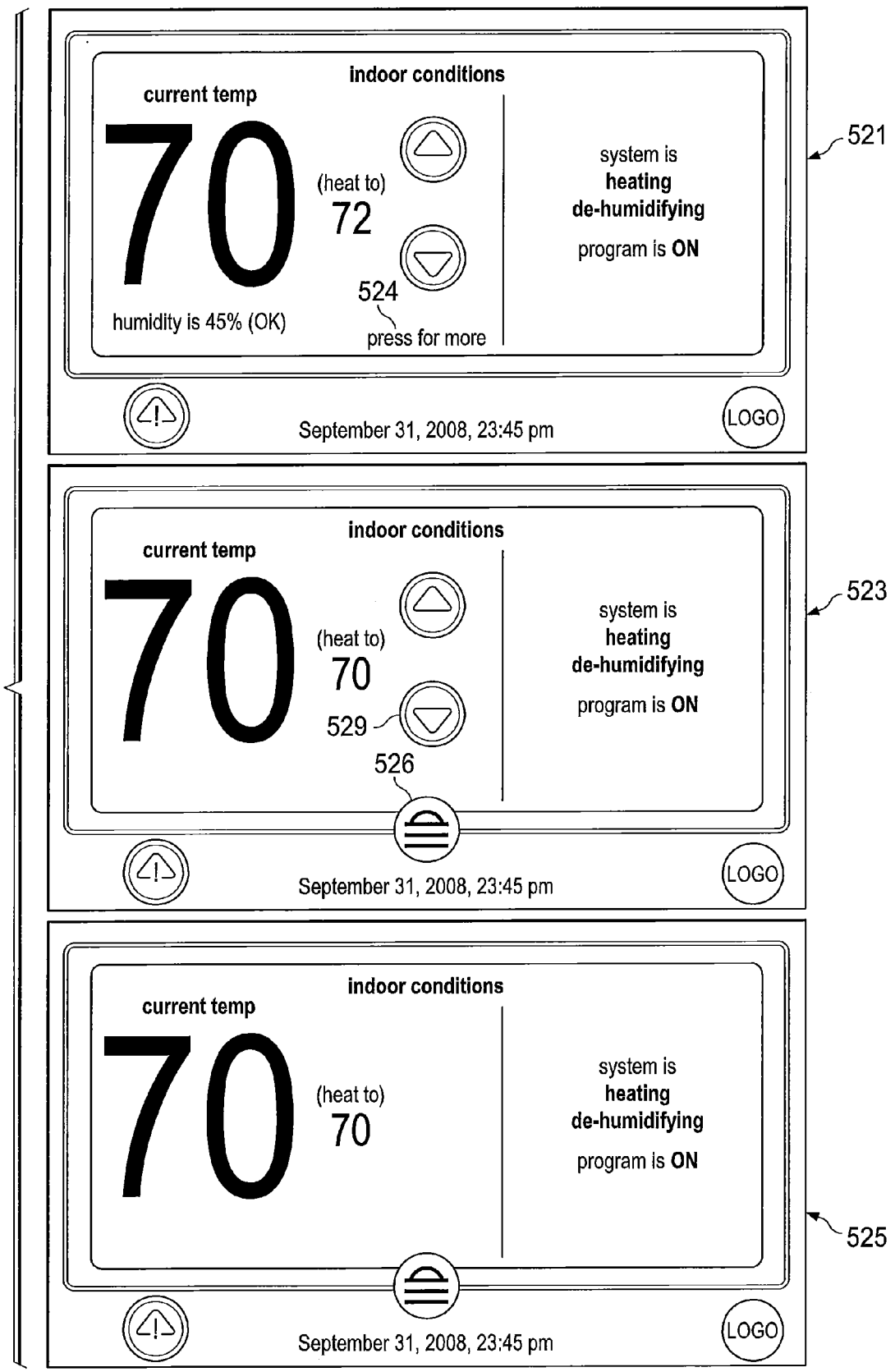
FIG. 5B illustrates, in one embodiment, a partial and complete locking of a screen of the dashboard of FIG. 3D.

Turning now to FIG. 5B, illustrated is an embodiment of an unlocked screen mode 521, a partially locked screen mode 523, and a fully locked screen mode 525 of the dashboard 350. The partially locked screen mode 523 places a lock-pad icon 526 over a text 524 that states "press for more," and also deactivates all buttons except up-down arrows 529. Partially locked mode has a limited functionality.

In one embodiment, the fully locked mode 525 deactivates all buttons and removes the up/down arrows from a screen. To unlock the partially locked screen mode 523 or the fully locked screen mode 525, a user presses and holds the lock-pad icon 526 for a selected period of time, such as five seconds. In one embodiment, the fully locked screen mode 525 can also occur due to a passage of a pre-selected amount of time. The partially locked screen mode 523 or the fully locked screen mode 525 can display control parameters for an extended period of time.

Figure 5C:
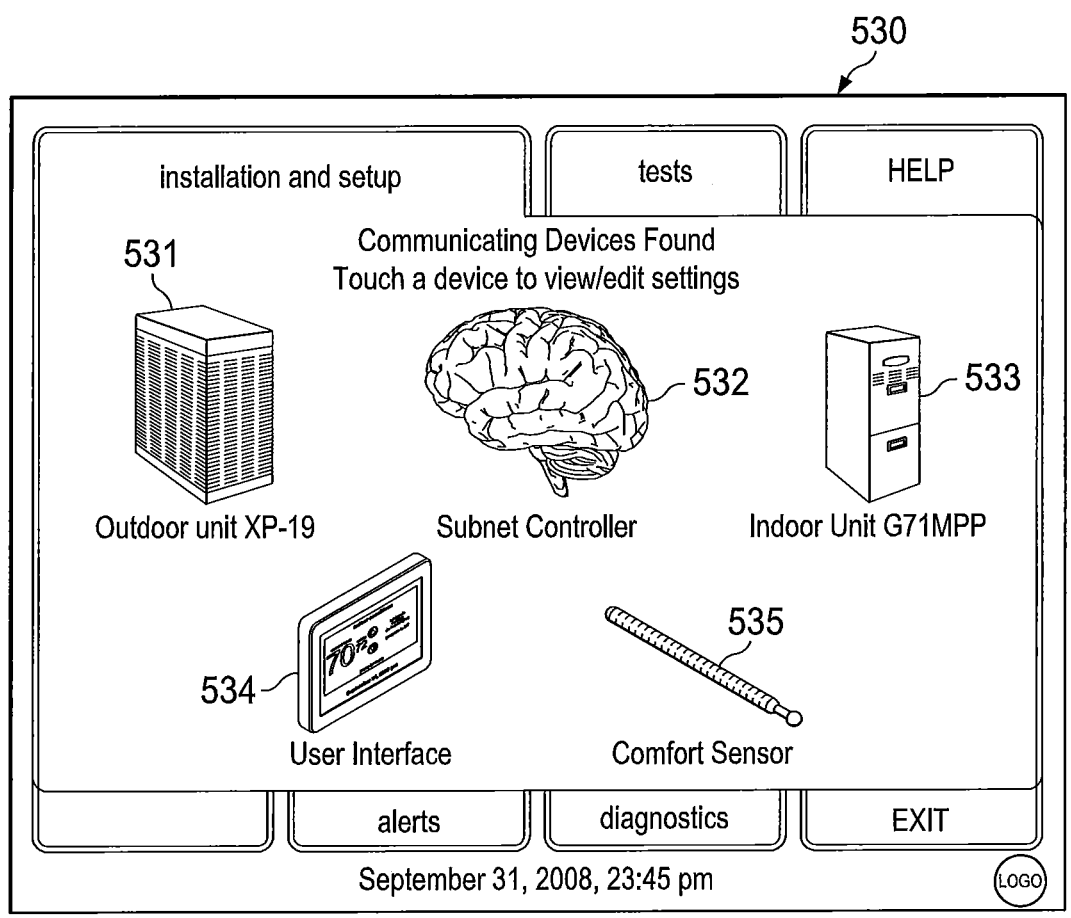
FIG. 5C illustrates, in one embodiment, an employment of icons for various devices instead of text entries of the dashboard of FIG. 3D.

Turning to FIG. 5C, illustrated is an exemplary screen 530 of the dashboard 350 illustrating a display of discovered equipment in the HVAC system 100. Generally, in prior art interfaces, a text list is used to inform a user/installer about found communicating devices in an HVAC system. However, in FIG. 5C, icons or pictures of equipment 531-535 are used instead to help a user/installer understand what devices and/or equipment is connected to the HVAC system 100. In the exemplary screen of FIG. 5C, each of the discovered devices or equipment 531-535 has a graphical user interface ("GUI") for employment by the installer, although other tabs of the dashboard 350 can also employ icons for found or discovered equipment.

Figures 1, 5D:
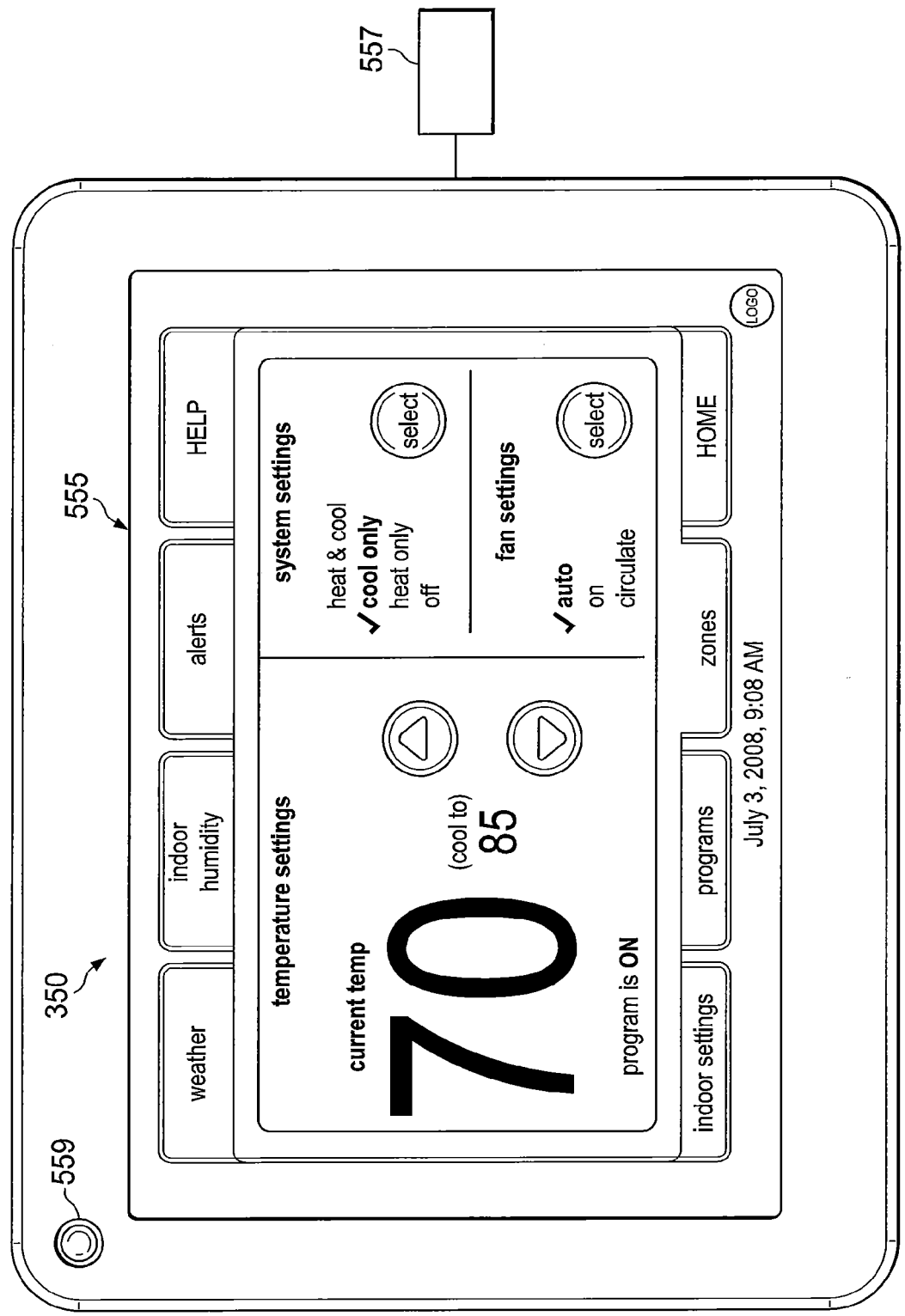
Figures 2, 5D:
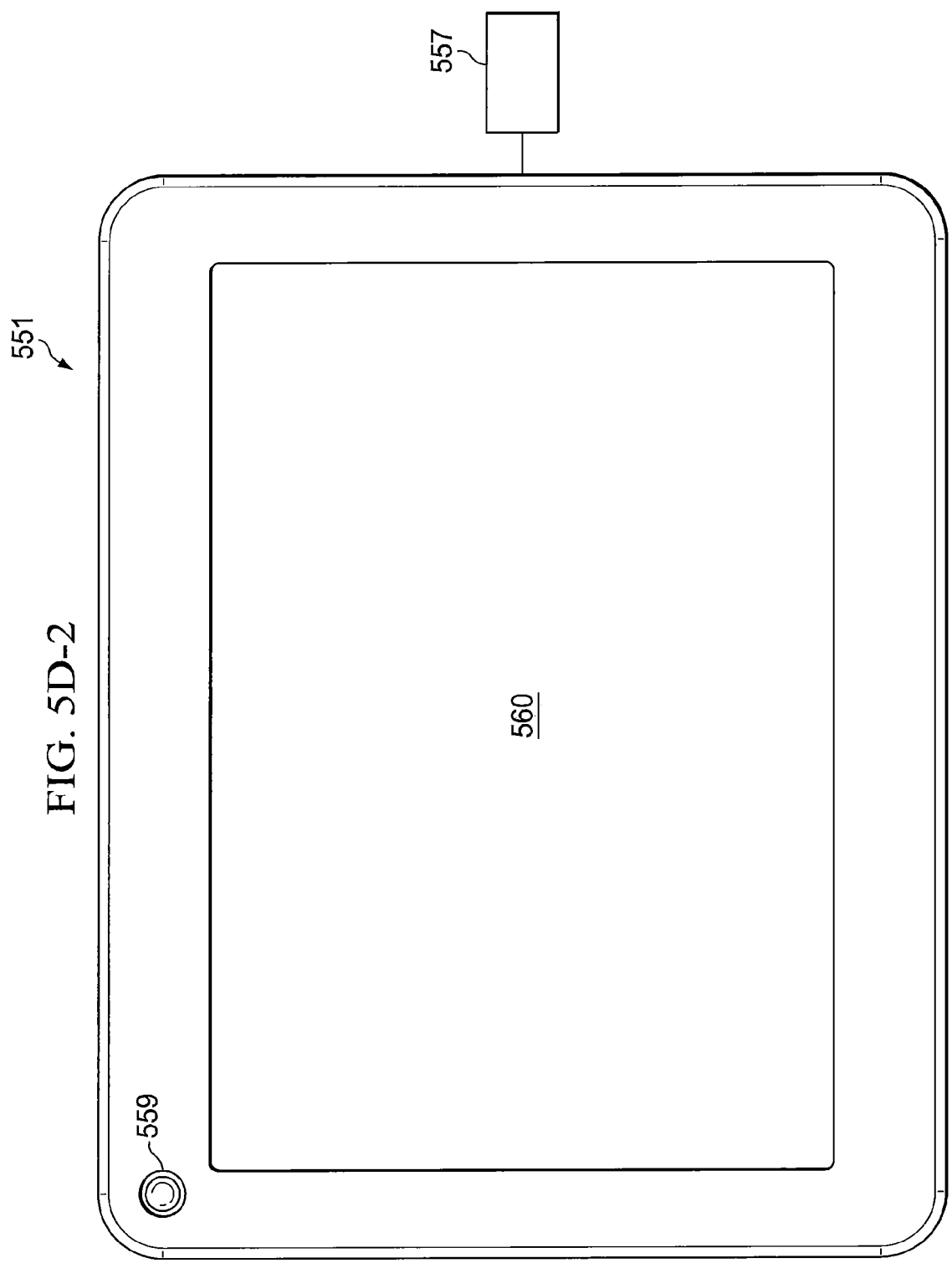
Figures 4, 5D:
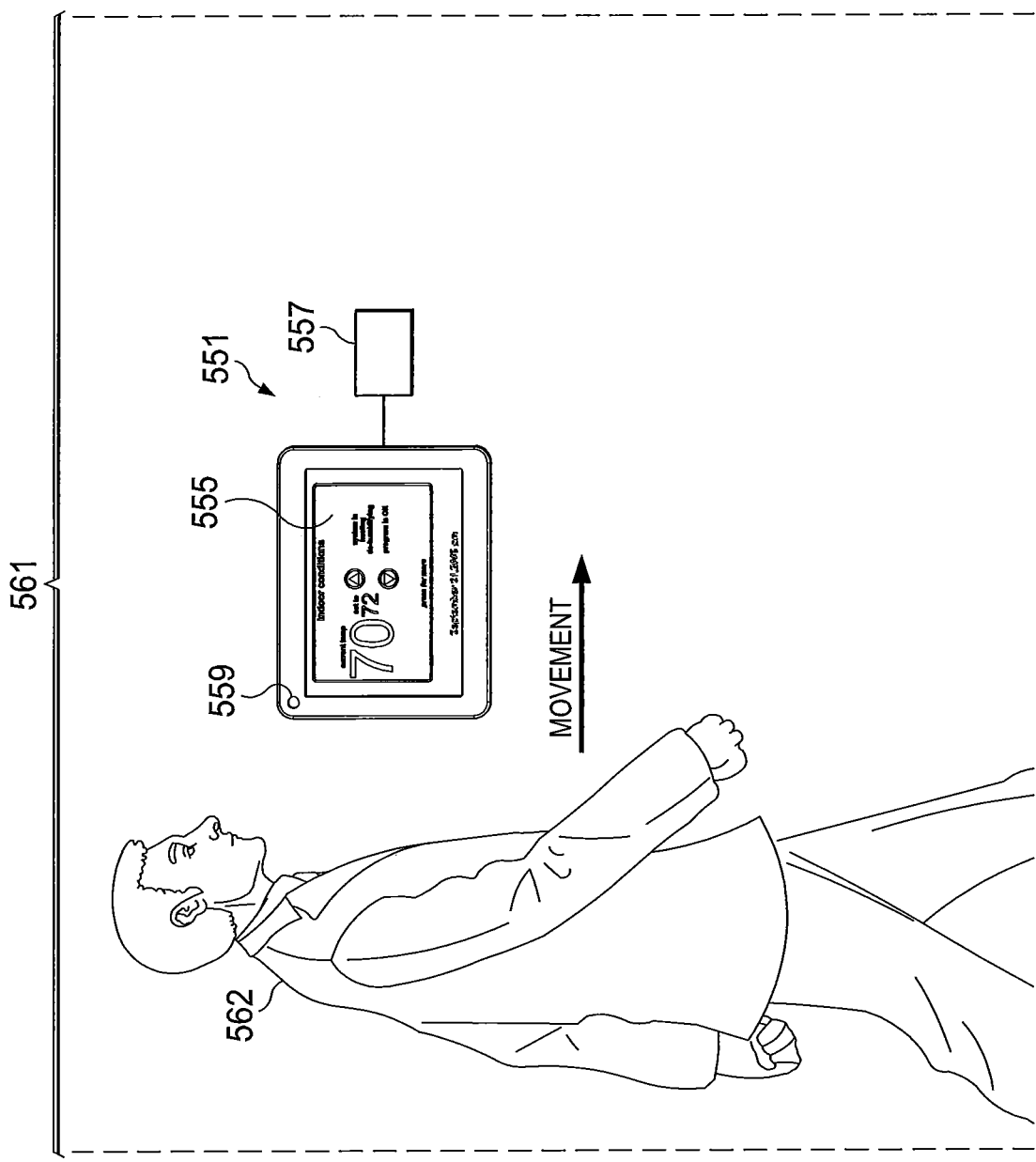
Figure 5D:
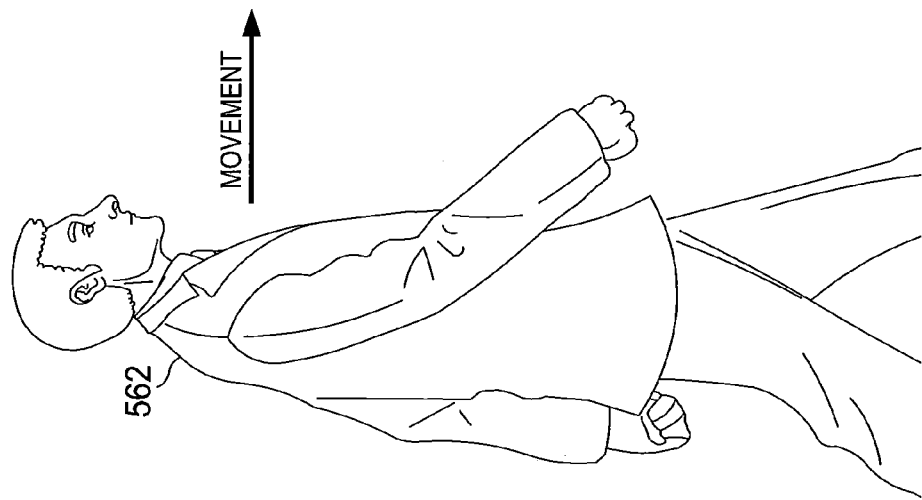
Figure 5:
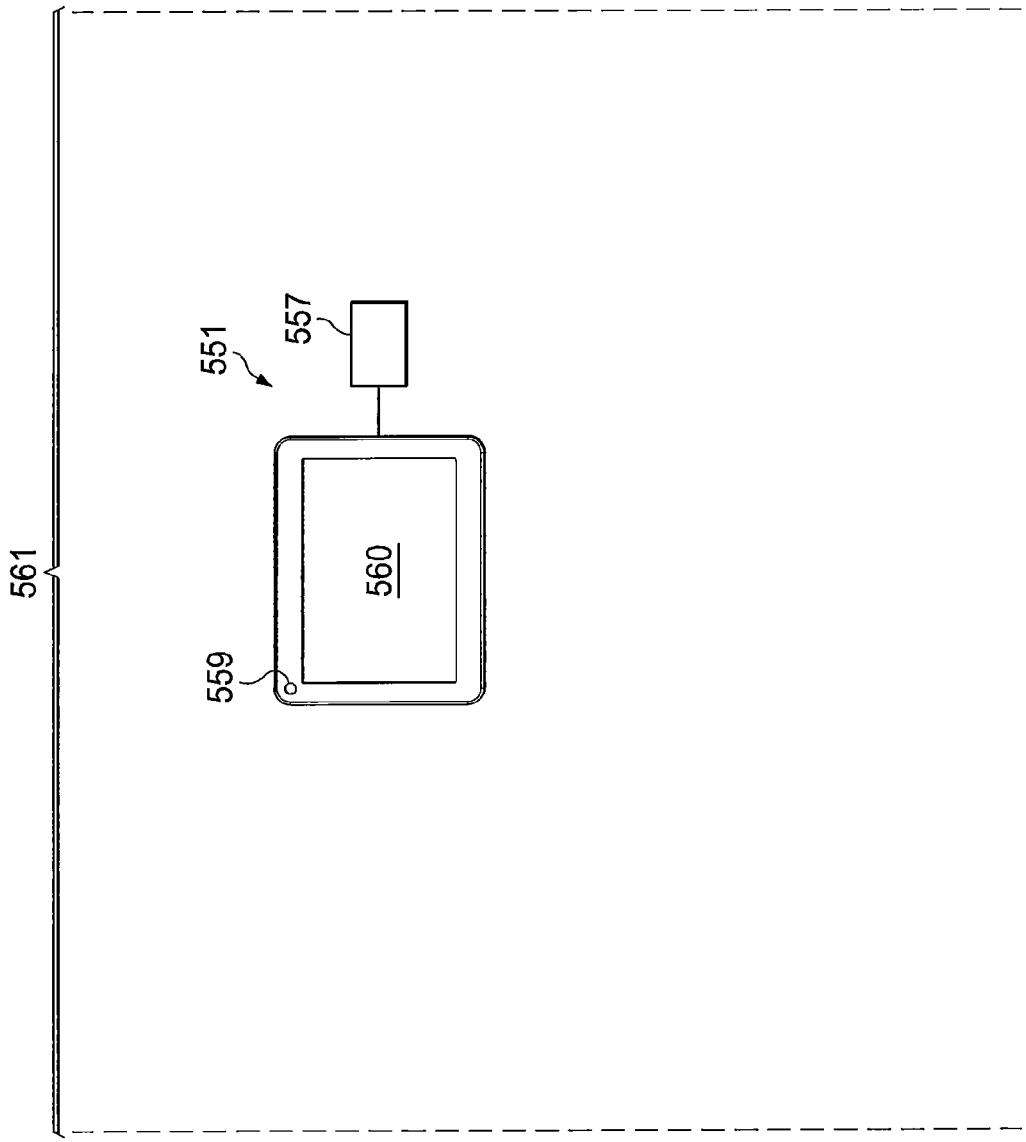

Turning now to FIG. 5D-1, illustrated is an exemplary embodiment of a dashboard 350 having a lighting system 551 including a) a screen 555 that needs a backlight to display information to b) a backlight 557 and c) a motion detector 559, wherein the backlight is turned on by the motion detector 559 upon a detection of motion within a selected range. The screen 555 can be an LCD screen.

Generally, the lighting system 551 allows a user to view indoor settings, without having to touch a button on the dashboard 350, through employment of the sensor 559 and the backlight 557. With one embodiment of the system 551, a home owner can view indoor settings when passing by a dashboard 350, which activates the sensor 559 which then turns-on the backlight. This allows a viewer to view settings of the dashboard, although indoor, from a distance, as determined by the sensor 559. This can make for a convenient way for a user to view indoor settings when the backlight 557 is initially off, as it is switched on by the motion detector 559. Furthermore, the system 551 can conserve energy and screen 555 life when the backlight 557 is not on.

When the exemplary dashboard 350 is not being actively engaged by the user (i.e., not being touched through a touch-screen interface and no motion has been detected by the motion detector 559), the backlight 557 is off. The screen 555 is then perceived as substantially dark 560, and no information can be read by a user, as is illustrated in FIG. 5D-2.

In the system 551, the motion detector 559 detects movement within a specified distance of the dashboard 350 and commands the backlight 557 to turn on, but otherwise does not allow the backlight 557 to turn on if no motion is detected. For example, in FIG. 5D-3, the backlight is off because no movement, such as of a user 562, is detected within a movement detection zone 561, and the screen is dark 560.

However, once the movement is detected in the movement detection zone 561 by the motion detector 559, such as a movement of the user 562, then the dashboard 350 turns on the backlight 557 so that information can be read from the screen 555 of the dashboard 350, such as illustrated in FIG. 5D-4. The user 562 may, therefore, be able to read the dashboard 350 data on the screen 555 without having to walk up to the dashboard and touch the screen of the dashboard. This can also allow the user 562 to press the dashboard 350 one less time, which can prolong a touch-screen life of the dashboard 350. When the user 562 walks close enough to the motion detector 559 for the motion detector 559 to detect the user's movement within the movement detection zone 561, then the backlight 557 turns on and all buttons and tabs of the dashboard 350 are enabled. However, when the user 562 is out of range of the detection range 561, the system 551 again disables the backlight 557 and the various tabs, buttons, etc., and the screen is typically again dark 560, as illustrated in FIG. 5D-2.

Figure 5E:
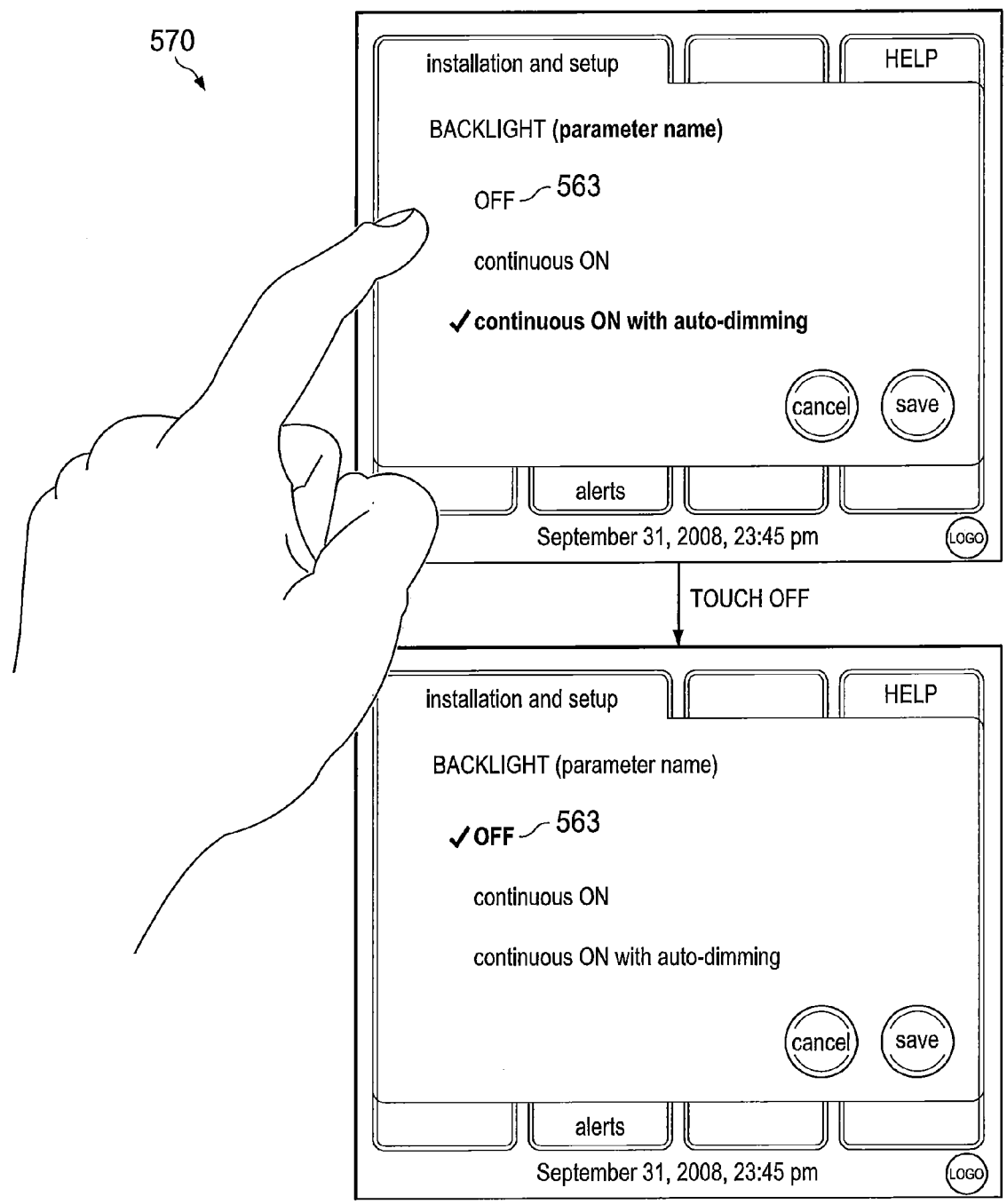
FIG. 5E illustrates a selection in an exemplary screen of the dashboard 350 of an item through an employment of a text item itself as a button to select the item to which the text item correlates.

Turning now to FIG. 5E, illustrated is an exemplary flow of screens 570 of the dashboard 350. In the exemplary flow, an installer selects an item of the screen 570 of an installer screen through an employment of text 563, which itself can be a button to select the text. In other flows, the text can be used in other screens of the dashboard 350.

In a further embodiment, the dashboard 350 has a screensaver that activates after a selected amount of inactivity from a user. In this embodiment, the dashboard 350 allows a user to download an image for the dashboard 350 to display when it is idle. Thus, the dashboard 350 can become an equivalent of a digital photo-frame when its controls are not active. In one embodiment, through pressing anywhere on a touch-screen of the dashboard 350 dismisses the screensaver image and re-displays the dashboard 350 controls.

Figure 6A:
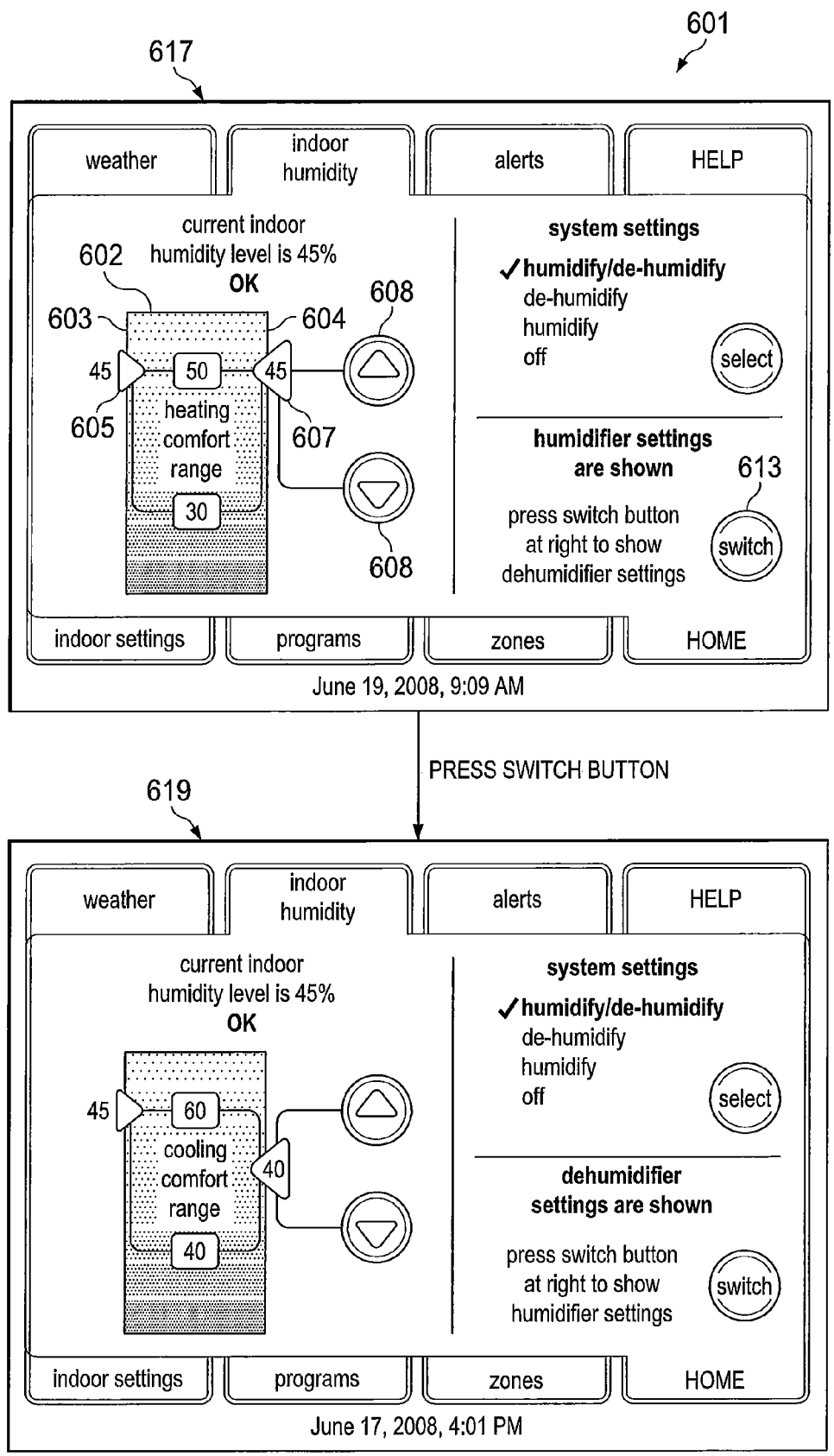
FIG. 6A illustrates an exemplary employment of a humidity graphic to set humidity and de-humidity setpoints of a humidity screen of the humidity tab of FIG. 3D.

Turning now to FIG. 6A, an exemplary humidity graphic 601 can be used to set humidify and de-humidify setpoints. In humidity screens 617, 619 of the humidity tab 360, a humidity status and RH humidity are both displayed on a same screen of the humidity tab 360. Generally, a user may not understand what XX % of humidity denotes on his or her dashboard 350. Therefore, this embodiment of the screens 617, 619 both displays the RH and also interprets the RH.

In a further embodiment, below 36% the humidity graphic 601 reads "INDOOR RH XX %—DRY," actual values can be between 35%-37%. Above 49%, the humidity graphic 601 reads "INDOOR RHXX %"—HUMID., actual value can be between 48% and 50%. Between 36% and 49% RH, the display reads "INDOOR RH XX %—NORMAL" or "INDOOR RH XX % OK", actual values can be between 35% and 50%.

An exemplary indoor humidity graphic shows a single bar 602 with relative humidity ("RH") being a calibrated item. A left side 603 of the bar 602 displays a current indoor RH level with the use of a triangle 605, and a right side 604 uses a triangle 607 to show a current humidify or dehumidify setpoint. Two up/down arrows 608 adjust a humidity setpoint, and a switch button 613 transitions the humidity graphic 601 to display either humidify comfort range setpoint or a de-humidify comfort range setpoint. In other words, the humidity graphic 601 can transition from the humidity screen 617 to a dehumidify screen 619.

Figures 1, 6B:
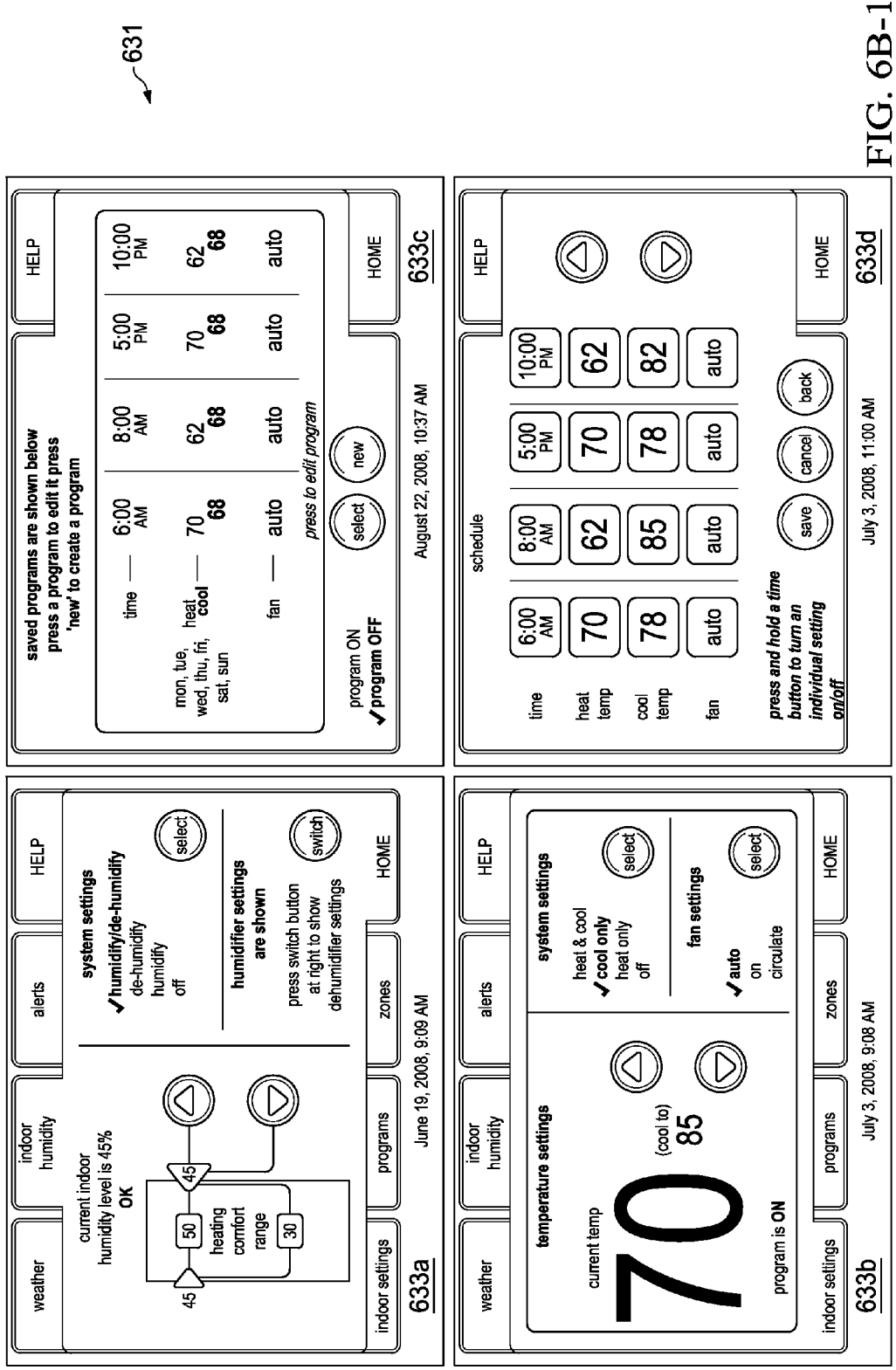
Figures 2, 6B:
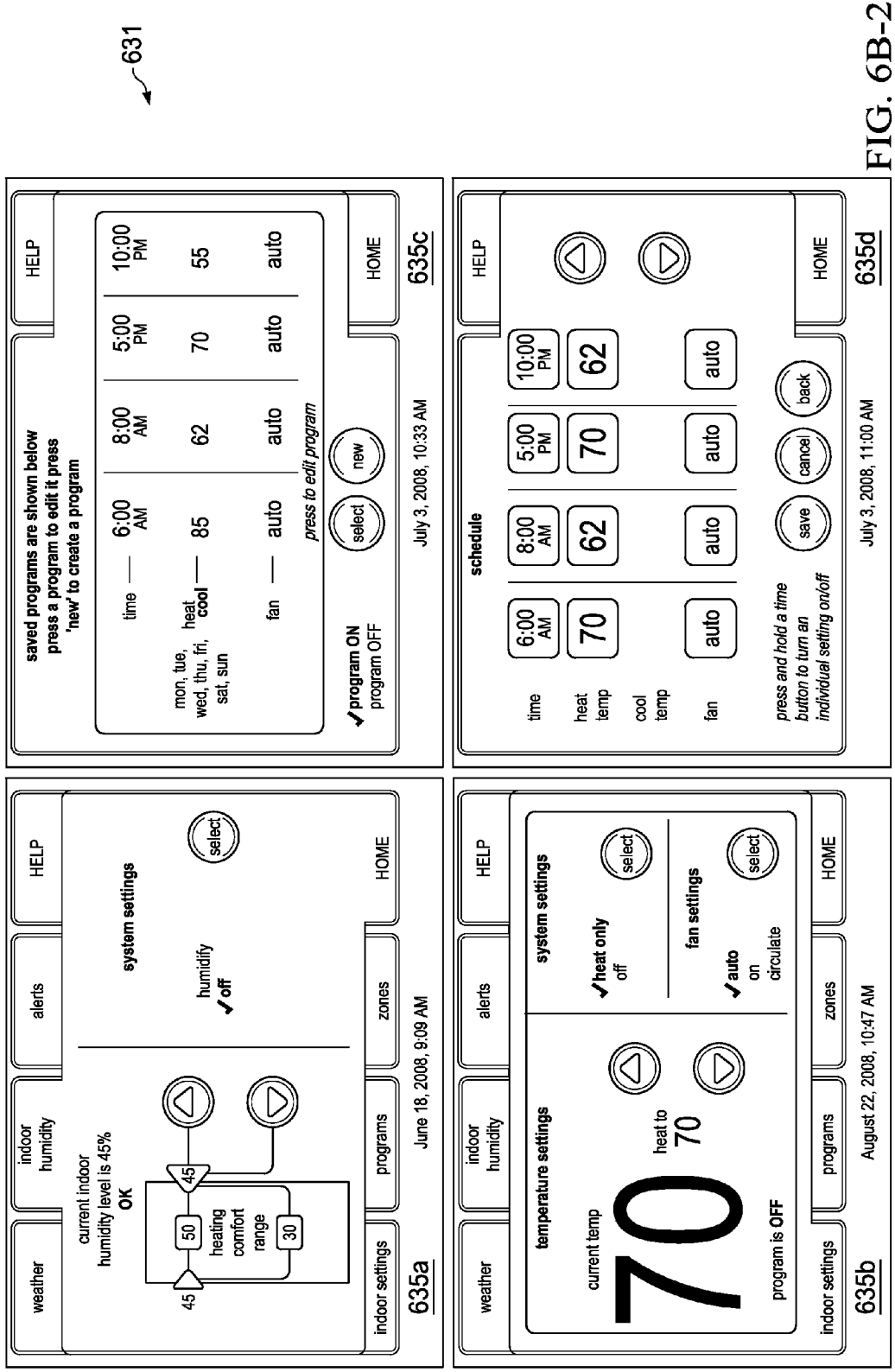
Figures 4, 6B:
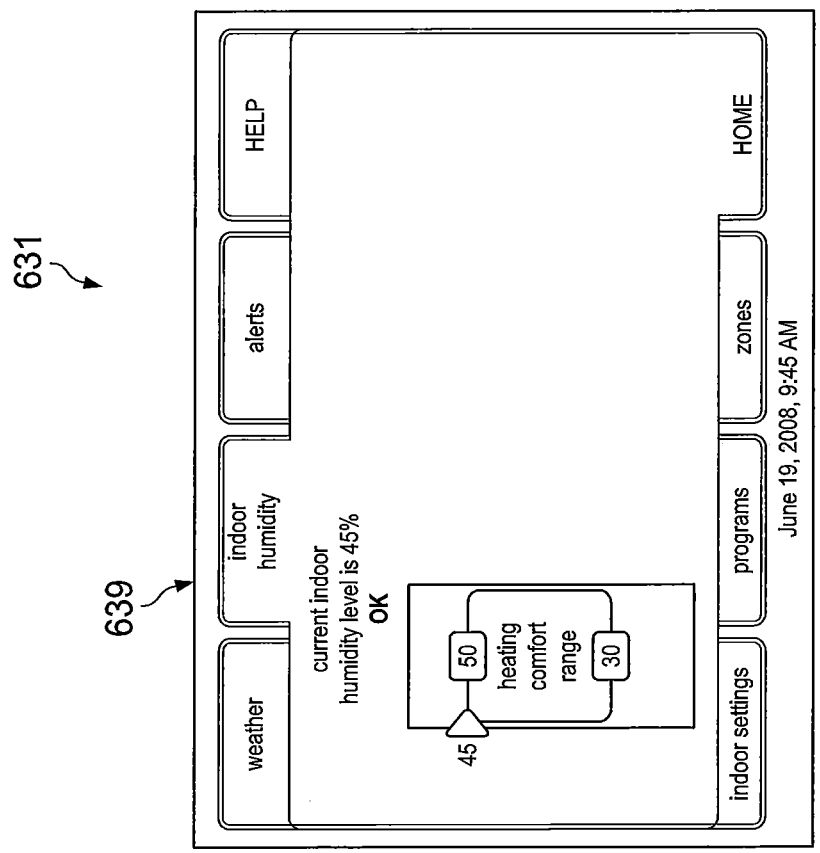

Turning now to FIGS. 6B-1 through 6B-4, illustrated is an employment of one a plurality of exemplary screens 631 of a humidity tab 360 of FIG. 3D that is dependent upon equipment installed in the HVAC system 100 of FIG. 1. In other words, if a given piece of equipment is not installed in the HVAC system 100, an indicia of that piece of equipment is not illustrated on the humidity screen of the humidity tab 360.

For example, the indoor humidity tab 360 can be dependent on humidifiers and cooling equipment. Without cooling, equipment, de-humidification is not an option. Furthermore, the indoor settings tab 375 is dependent on heating and cooling equipment, and so is the programs tab 380. Therefore, the dashboard 350 removes modes, system setting options, and control setpoints (humidity and temperature) based upon which pieces of equipment to be discovered during an "installation and set-up process" are not actually discovered. Therefore, if a given piece of humidification or dehumidification equipment is not present, it may not be displayed in the screens 631.

For example, FIG. 6B-1 shows an indoor humidity screen 633*a*, an indoor setting screen 633*b*, a programs summary screen 633*c* and a programs input screen 633*d* with all options and services available. FIG. 6B-2 shows equivalent screens, here designated 635a-635d, based on only heating equipment and a humidifier being installed. FIG. 6B-3 shows equivalent screens, here designated 637a-637d, based on only cooling equipment being installed, without a humidifier. Finally, FIG. 6B-4 shows the indoor humidity screen, here designated 639, for which only heating equipment is installed, without a humidifier. As is illustrated, equipment that is not available is not illustrated. In further embodiments, interface screens correlating to indoor settings tab 375 and programs tab 380 do not display indicia of devices not installed in the HVAC system 100, either.

In a further embodiment, the humidity tab 360 allows users to have and configure different humidity levels during different periods of a day. These periods could be a wake, leave, return and sleep period, for example. For an exemplary instance of use, a user can have 40% humidity level in the morning, and 45% humidity level at night in the same day. Additionally, users can have different humidity levels for different days or group of days. Some parts of the country can have changes in its humidity level throughout the day, so therefore users who reside in these areas can maintain their comfort inside of their homes by using this feature.

Turning now to FIGS. 7Ai through 7Aiv and FIGS. 7Bi through 7Biv, illustrated are an exemplary flows of various transitions of a help screen having a help tab 370 of the dashboard 350 that are dependent upon or otherwise determined at least in part by a screen displayed before the help tab 370 is activated.

Generally, a purpose of interactive help for the HVAC system 100 is for a user or installer to navigate throughout the dashboard 350 without the user or installer having to go find a manual and look up a particular function or dashboard 350 screen shot. Discussed below are an exemplary flow 710 and a flow 750, both to help accomplish this goal of navigation.

FIGS. 7Ai through 7Aiv, collectively referred to as FIG. 7A corresponds to an example flow 710. FIGS. 7Bi though 7Biv, collectively referred to as FIG. 7B, corresponds to an example flow 750, Both the flows 710, 750 allow a user to get help on current dashboard screens without changing his or her current dashboard 350 settings. A help interface can therefore be located in the dashboard 350, and the user/installer does not necessarily have to find or use an independent manual.

An approach of the exemplary flow 710 of FIG. 7A is directed towards dependent settings for help screen sequences. The flow 710 illustrates help screens that progress in a predetermined sequence depending on the screen shown before the help tab 370 is pressed. Generally, help is supposed to teach a user and not confuse them more; therefore, help in the flow 710 does not display information about possible settings that were not displayed on the screen before the help tab was pressed.

For example, the exemplary flow 710 displays 3 different screens 711 (FIG. 7Ai), 712 (FIG. 7Aii), 713 (FIG. 7Aiii) that could be displayed to a user before a help tab 370 is pressed. After the help tab 370 is pressed, the screen transitions as follows: the screen 711 transitions to a screen 714 (FIG. 7Ai); the screen 712 transitions to a screen 715 (FIG. 7Aii); and the screen 713 transitions to a screen 716 (FIG. 7Aiii). Thus, each screen 711, 712, 713 progresses to its corresponding particular screen 714, 715, 716, respectively, that contains information specific to the screen transitioned from. The help screens 714, 715, 716 each contain a text box and arrows that give information about a particular area of the screen that was present before the help was invoked.

Pressing anywhere on a help screen 714, 715, 716 transitions the help screen to a screen 717 (FIG. 7Aiv). This particular screen 717 is used for all the screens 711, 712, 713, because the screen 717 row C provides information about a common item for all the screens 711, 712, 713.

Touching the screen 717 transitions to a screen 718, (FIG. 7Aiv). This is yet another screen that displays common information for all the screens 711, 712, 713. A screen 718 (FIG. 7Aiv) is the last screen in the help sequence 710. Pressing the screen 717 of the dashboard 350 transitions back to the screen displayed before the help tab 370 was pressed, via a step 720.

Turning now in a further embodiment to FIG. 7Bi through 7Biv, collectively referred to as FIG. 7B, help screens of the help tab 370 allows a user to adjust settings on a help screen without saving changes to the settings to the HVAC system 100. Generally, once the user exits a help screen, all the settings or screen changes return to their previous state before the help tab 370 was pressed, which allows a user to experiment with settings of a screen without saving them to the HVAC system 100.

An exemplary screen 751 of the flow 750 of FIG. 7B is the screen displayed on the dashboard before a help tab 370 press. A screen 752 is the screen displayed immediately after a help tab 370 is pressed. A difference between screen 751 and 752 of flow 750 is a text box.

The text box on screen 752 gives a brief explanation about a current screen, and tells the user to touch an area of interest to get more information. Assuming that a user wants to know more about "current temp" and pressed in this area, for example, then the screen progresses to a screen 753 (FIG. 7Bii) with a new text box listing information about "current temp."

A screen 754 is shown after the "fan setting" area is touched. However, this area of the screen contains a select button. In one embodiment, pressing the select button changes the screen to a screen 755 (FIG. 7Biii) with a new text box listing information about the new setting. The transition from the screen 754 to the screen 755 not only shows a new text box, but it also changes the highlighted setting from "on" to "circulate." In one embodiment, the screen 755 transitions to a screen 756 (FIG. 7Biii) if the system setting area is pressed. In one embodiment the screen 756 transitions to a screen 757 (FIG. 7Biv) if the select button is pressed. However, the screen 757 transitions back to the screen 751 of FIG. 7Bi, the screen displayed on the dashboard before the help tab 370 press.

Figure 8A:
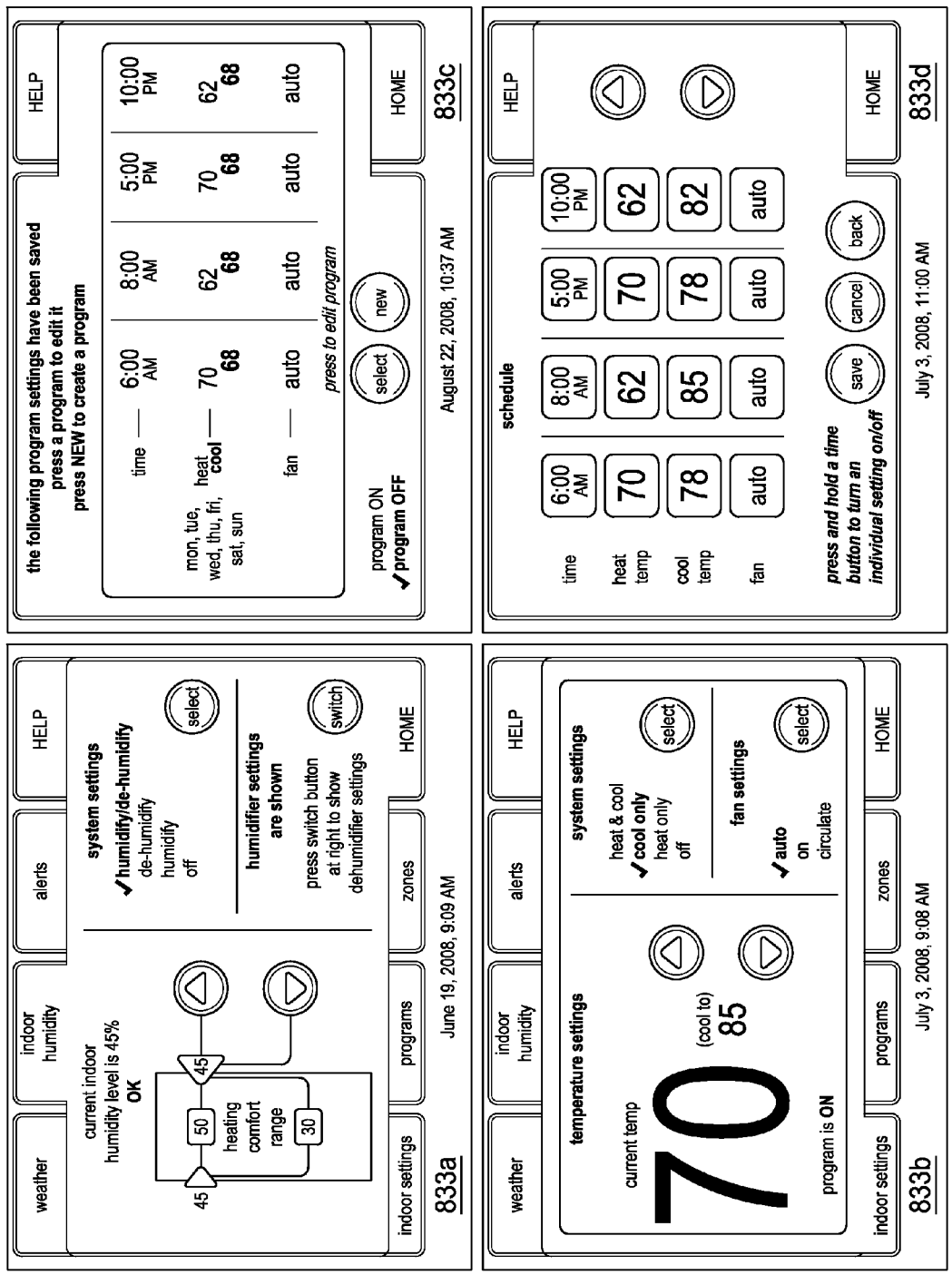
Figure 8B:
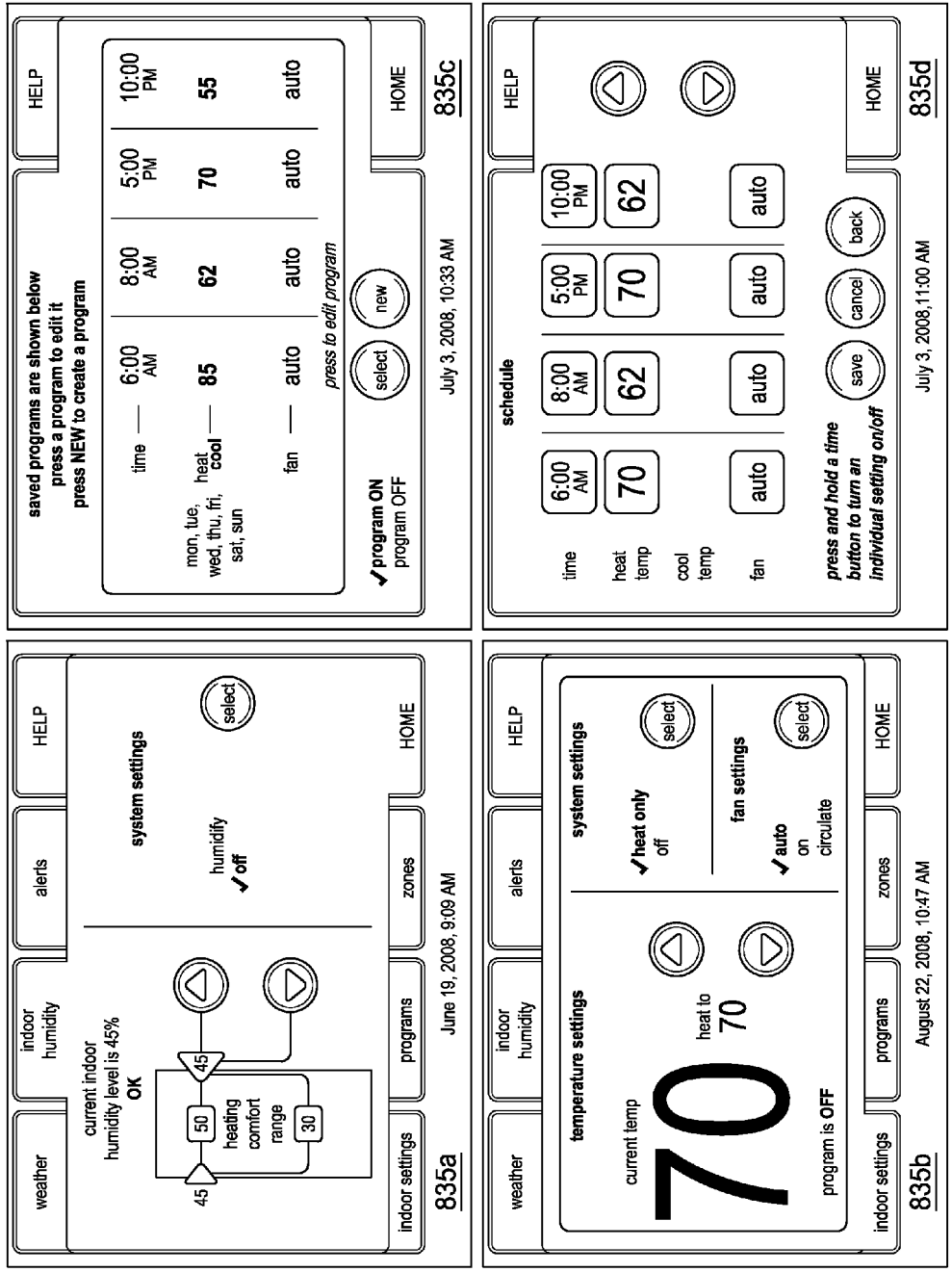
Figure 8C:
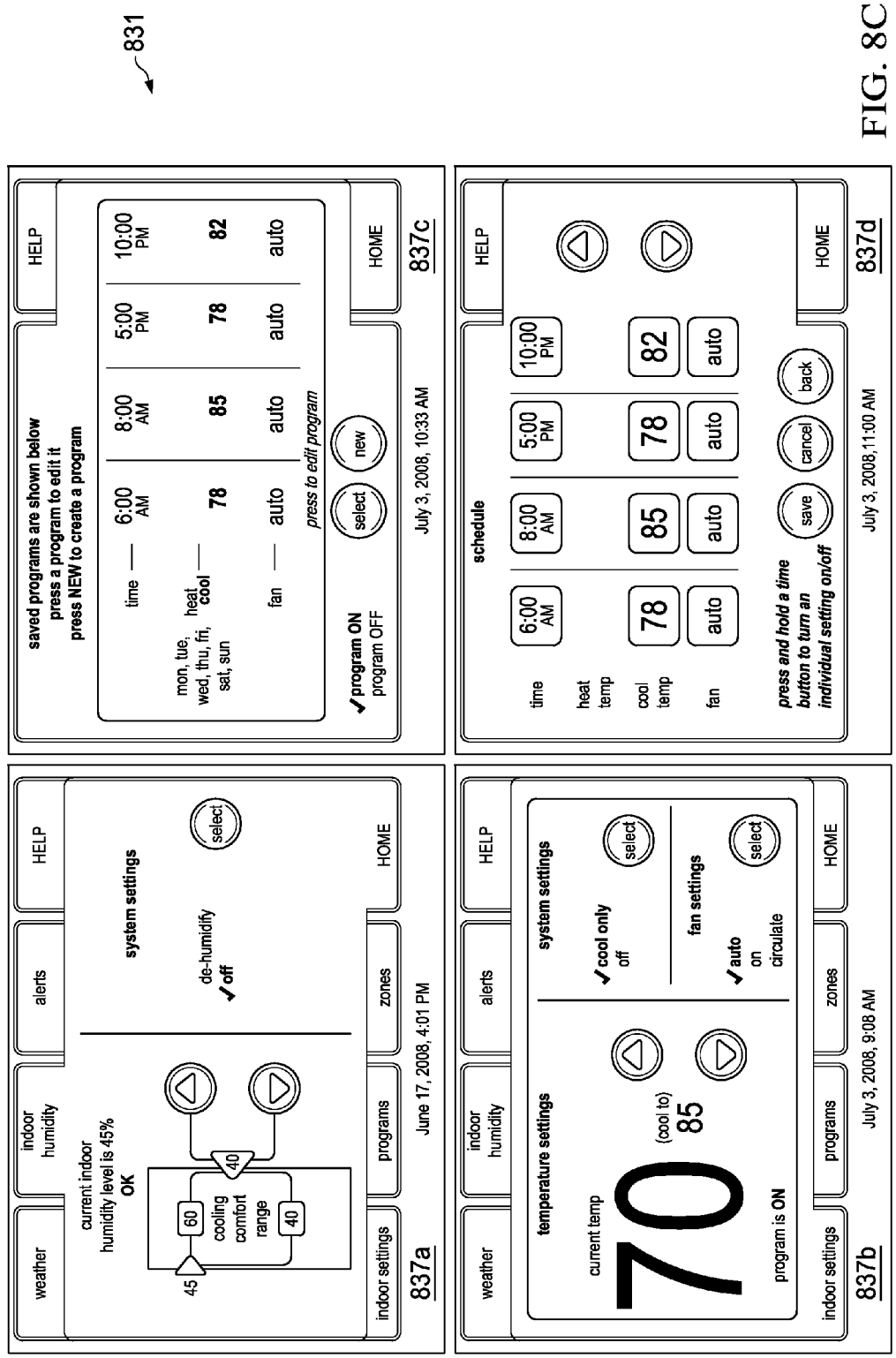

Turning now to FIGS. 8A-8D, illustrated are various views of a screen 831 dependent upon equipment being found in the HVAC system 100 of FIG. 1, as discussed regarding the screens 631 of FIGS. 6B-1 through 6B-4, above. In FIG. 8A-8C, a screen 83*a is an indoor humidity screen, a screen 83*b is an indoor settings screen, a screen 83*c is a program summary screen, and a screen 83*d is a program input screen.

Figure 8D:
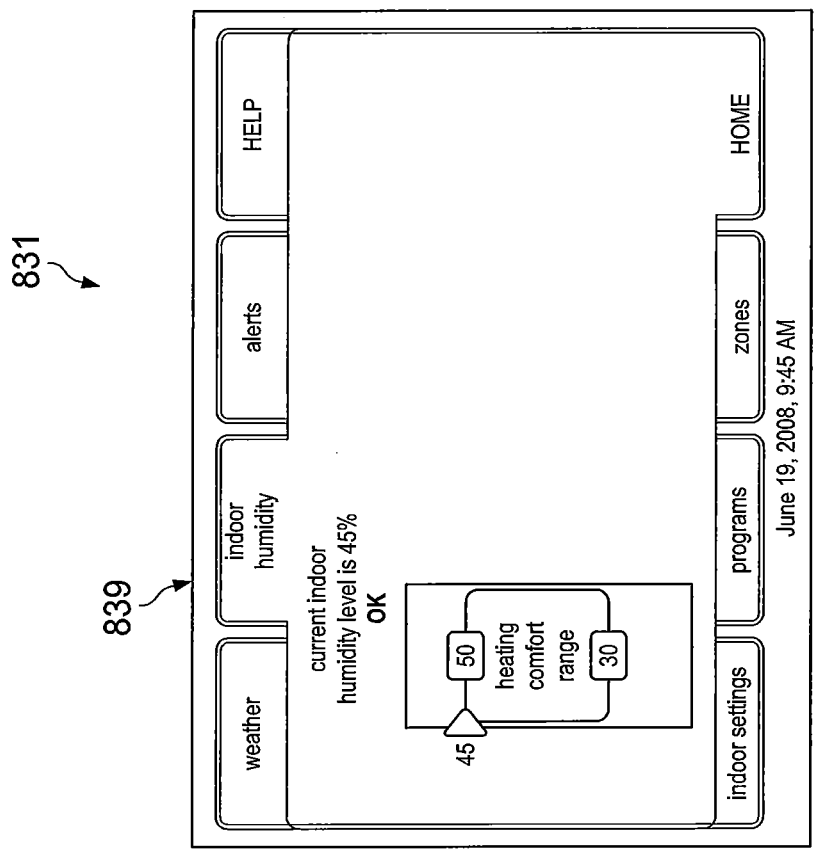

Regarding FIG. 8A, screens 833a-833d show the screen 831 all options and services available. In FIG. 8B, screens 835a-835d illustrate the screen 831 for the case in which no cooling equipment is installed. In FIG. 8C, screens 837a-837d illustrate the screen 831 for the case in which no heating equipment is installed. And FIG. 8D illustrates an indoor humidity screen 839 reflecting the case in which heating equipment is installed but no humidifier is installed. As is illustrated, equipment that is not available is not shown in the screen 831.

Turning to FIG. 9A, illustrated is an exemplary programs screen 910 of the programs tab 380 that displays all program time periods and programmed temperature setpoints for the programs tab 380. In this embodiment, all program schedule setpoints 912, 914, 916, 918 are displayed on one programs screen 910. All time periods for a program schedule are displayed as well. In the illustrated embodiment of the screen 910 of the programs tab 380, time is listed first, then heat temperature, cool temperature, and fan settings are last. The screen 910 can be a 4×4 matrix with only one setpoint area/button being selectable at a time. In one embodiment, once a setpoint area is touched, the box turns an inverse of its current color. In the illustrated embodiment, up/down arrows 921 are used to adjust each setpoint/setting.

Turning now to FIG. 9B-1 and 9B-2, illustrated is an exemplary flow 930 of programs screens. The screens of the programs tab 380 include buttons 933 that turn an inverse color as a selection and touch reaction. For example, FIG. 9B-1 illustrates a programs screen 932 with a particular button 933 not being touched. A programs screen 934 illustrates the case that a button 935 being touched, and turning an inverse color. In FIG. 9B-2, a screen 936 illustrates the button 935 staying an inverse color, and an arrow button 937 turning an inverse color. A screen 938 illustrates that the button 935 stays the inverse color, but an arrow button 939 reverts to its previous color.

In one embodiment, any touched button of the buttons 933 of the flow 930 turns an inverse color while being touched. If the button could be adjusted to another value, then the button/selection box remains inverted as to color even when the user is no longer touching the button, such as the button 935. However, if the button is an up/down arrow, for example the button 937, then the button only turns inverse while the user is touching that button. In other words, when the user releases the button, such as an up/down button, then the button returns to its normal color/state, as illustrated by the button 939. In other embodiments, the button color inverse can occur in other tabs, such as the home tab, the humidity tab, and so on.

Turning now to FIG. 9C, illustrated is a program schedule in a programs screen 940 of the programs tab 380 partitioned into a plurality of time zones wherein, upon a button corresponding to a time zone 941 being pressed for a set period of time: a) a temperature setpoint for that time period is deactivated, b) a display of the deactivated setpoints of the deactivated time period now appears dim relative to a display of the time period's setpoints before deactivation; and c) the deactivated time period's setpoints 943 appear dimmer relative to an active time period's setpoints.

In the illustrated embodiment of FIG. 9C, if one of the time zones 941 is pressed and held for approximately two seconds, then the setpoints for that time period 943 is deactivated. In one embodiment, the time period 943 is then controlled by the previous time period's setpoints.

Turning now to FIG. 9D-1, illustrated is an interface 950 for setting a system time for an HVAC system 100, such as through a programs screen of the programs tab 380. Setting a system time involves 6 boxes. Each box contains a particular aspect of time and date. Only one box can be changed by a user at a time. FIG. 9D-1 generally discloses an analog clock interface 950 with date and time selection boxes. The date and time selection boxes are as follows: hour box 961, minute box 962, AM/PM box 963, month box 964, day box 965 and year box 966.

Generally, in the clock interface 950, the hands 958, 959 of the clock interface 950 are moved by touching them and dragging them to a desired position, either through a touch screen or with a device such as a trackball. The hour hand 958 and the minute hand 959 are linked to their corresponding boxes 961, 962, and the boxes 961, 962 change if their corresponding hands are adjusted. For example, if the hour hand 958 is changed from "12" to "6," then the hour box 961 changes from "12" to "6." The up and down arrows 960 can also be used to adjust each interface box. Typically, in the interface 950, at least one value of at least one interface box is changed as a user drags at least one clock hand of the analog clock. Generally, in the interface 950, at least one value of at least one number itself is used as an input to a box, and the analog clock face maps to the changed value.

Turning now to the clock interface 965 of FIG. 9D-2, the clock face numbers themselves are used as buttons, a selection of any of which define where clock hands 973, 974 point and values in boxes 971, 972. Either the hour 971 or minute 972 box is selected, and then the desired number on the clock face is pressed, upon which both the hour hand 973 or minute hand 974 jump to that setting, and boxes 971, 972 fill in for that value. For example, if the hour box 971 is selected and the current setting is "5," and then the clock face number "10" is pressed, then both the hour hand 973 jumps to "10" and the hour box 971 adjusts to "10." The up and down arrows 960 can be used to adjust each box.

Turning now to FIG. 9E, illustrated is an embodiment of a programs screen of the programs tab 380 and a reset interface 975 for the same. Generally, the reset interface 975 of FIG. 9E can help a user reset to predetermined default setting, such as a factory setting 976 or another custom setting 977, when a user inadvertently changes one or more settings, or otherwise wishes to go back to these settings. Without the reset interface 975, a user might have to spend a considerable amount of time reviewing an owner manual and/or scrolling through a plurality of menus to locate the erroneous or unwanted settings, and may not know what the reset settings even are. As is illustrated, there are different selections for settings, temperature, clock, daylight savings time, display and backlight.

All buttons in FIG. 9E that are in grey represent an exemplary set of employed reset values or parameters as currently selected in the illustrated exemplary reset interface 975 upon an exit from the reset interface 975. These reset selections are employed by the HVAC system 100. These reset values override whatever is currently being employed in the HVAC system 100. However, any reset value may be changed, as described below.

Generally, the reset interface 975 can select from a default value among the following values: a user can reset the dashboard 350 to the factory setting 976 or to another value, such as the custom value 977 programmed by an installer. For example, if programming or operating becomes confusing or other issues occur, the customer can reset the values to these prior settings. The reset screen 975 provides a reset unit of measurement in either the British unit (Fahrenheit) 978 or a S.I. 979 unit (Celsius).

The user may select a reset to a 12 hour 980 or 24 hour 981 clock. If users prefer the 24 hour clock rather than the "12" hour clock, he or she can do so via this change. The user can also adjust or correct the time, for any reason, including daylight savings times 982, 983.

A user may also set the default language: the consumer or dealer can reset to an exemplary preferred language 984-987 or change it, if needed. The customer can reset the backlight brightness, such as backlighting for high 991, medium 990, low 989, or off 988.

Generally, when the installer first installs the equipment, the installer will be able to set all parameters outlined above as part of the initial set up and commissioning of the dashboard and system. An installer or user can save the settings through a save button 992, or exit with an exit button 993. When the settings are saved, this over-rides any other programming or configuration in the HVAC system 100.

Turning now to FIG. 9F, illustrated is an exemplary programs screen that further includes a display of a plurality of pre-populated program schedule settings. The pre-populated program settings selection choices range from a maximum comfort 994 to a maximum energy savings 998 of the range. The settings employ a slider 992 between the maximum comfort setting 994 to the maximum energy savings 998 of the selection based upon a selector 999. Furthermore, based on a selection of a user, a program schedule of the programs tab 380 automatically populates temperature and humidity settings for each program scheduled event, to achieve a desired selection. This can occur in the programmed setpoints for both temperature and humidity, and further embodiments can include the activation or deactivation of pieces of various environmental equipment, such as heaters, coolers, fan blowers, humidifiers, dehumidifiers, etc.

Turning now to FIG. 9Fi and 9Fii, illustrated are exemplary flows of programming screens that can be used with this embodiment. In flow 1000 of FIG. 9Fi, for a dashboard 350 that is running a program schedule, and flow 1006 of FIG. 9Fii, for an embodiment of the dashboard 350 that is not running a program schedule, instead of a user directly entering the necessary values, the user instead sets the slider 992 of FIG. 9F, and the values are entered into these screens by the slider 992. The flow 1000 has a screen 1001, 1002, 1003, 1004, and 1005. The flow 1006 has a screen 1007, 1008 and 1009.

In one embodiment, if a change of operating parameters is made in the programs screen of the programs tab 380 while a current program is running which employs previously entered parameters, a hold time can be programmed within the programs tab 380, wherein the hold time is entered as exactly what time the previous parameters are to stop taking effect.

In a further embodiment, the dashboard 350 has to set parameters/settings for all devices in the HVAC system 100. There are a few parameters, such as for a blower, that have large ranges that can be very time consuming to set with up and down arrows. Therefore, a coarse scroll bar and a fine scroll bar can be used to adjust such settings (not illustrated). First, the coarse bar is adjusted to get close to the desired range, and then the fine bar is adjusted to get to the exact and precise settings. This can be done by a dashboard 350 that is or includes a touch-screen.

Turning now to FIG. 10A, illustrated is an exemplary flow 1010 employing the home screen 450. In a first screen 1015, a particular icon 1017, such as the "Lennox"™ icon, is placed on the home screen 450 to enable an access of an installer screen. In FIG. 10A, in order to access an installer screen from the home screen 450, an installer is to both a) press and hold the icon 1017 with a finger for at least five seconds; and then b) drag the finger across the interface, as illustrated in screen 1020. The button hold and drag is to be performed without lifting a finger for the installer screens to be accessible from the home screen. Otherwise, the screen 1015 generates a warning screen 1025.

In a further embodiment, the dashboard 350, such as in the home screen 450, has a single alert icon 1018 that gives a user an indication that there is at least one alert present. In one embodiment, the alert icon 1018 is one of three colors: a) a first color to indicate that the HVAC system 100 is currently running in an energy efficient mode; b) a second color to indicate that a filter of the HVAC system 100 needs to be replaced; and c) a third color to indicate that a piece of equipment is no longer working.

Pressing the alert icon 1018 directly navigates to a display page on the dashboard 350, such as found in the alerts tab 365, giving a user: a) more information about at the least one alert; b) the ability to clear the at least one alert; or c) to set a reminder time for a later date for the at least one alert.

Furthermore, a color of the alert icon 1018 can be changed to signal a different level of severity alert that is present. For example, a "green" alert icon 1018 could signal that the HVAC system 100 is currently running in an energy efficient mode. A "yellow" alert icon 1018 could signal that a filter needs to be replaced. A "red" alert icon 1018 could signal that a critical piece of equipment is no longer working.

Turning to FIG. 10B, illustrated is an exemplary flow 1030 that transitions from a home screen 450 to a tabbed interface 1040. In FIG. 10B, if a user touches anywhere that is not a button, such as an area 1035, a tabbed interface 1040 arises, each of the interfaces (humidity screen, help screen, etc.) accessible through its corresponding tab 355-390.

Generally, the flow 1030 gives a user a straightforward interface that can easily get indoor settings and system information. With a simple screen press, such as in an area 1035, a user can get the tabbed interface 1040, thereby allowing a change of a system or mode setting, or to otherwise get more detailed information about aspects of the HVAC system 100.

The home screen with the tabbed interface 1040 of FIG. 10B also allows the user to change a current temperature setpoint without necessarily having to deal with much further information. Therefore, all a user needs to do is press anywhere inside an "indoor conditions" area (that is not a button) and the home screen 450 transitions to the tabbed interface 1040 where all indoor settings can be changed in the indoor settings tab 375 and more detailed information can be obtained.

In a further embodiment, the home screen 450 can be a "default screen" for the dashboard 350 and gives the user general information about indoor conditions. In a still further embodiment, an icon of the home screen 450 is correlated to at least one HVAC system mode or fan mode. In this embodiment, for example, a fan icon can be used to represent a touch area for a user to press if the user wants to change a fan schedule in the dashboard 350. Similarly, in some embodiments, a "flame and flake" icon can be used to represent a system mode button that a user may wish to change.

In a yet further embodiment of the home screen 450, at least one attribute of a presentation of the home screen is selectable by a user. For example, differing presentations can be mode of comfort backgrounds. One example could be a black and white screen for a background of the home screen 450; another example could be use of a larger font size on the home screen 450, etc.

Turning now to FIGS. 11A-1 and 11A-2, illustrated are two exemplary embodiments of an installer dashboard 1030 to be used in conjugation with the installer flow 401 and its various tabs and screens. The installer dashboard 1030 can be considered a subset of the dashboard 350, and is contained within the dashboard 350, although both the dashboard 350 and the installer dashboard 1030 are accessible remotely.

Pressing the installation setup tab 402 can change the active tab to an installation setup screen of the installer screen flow 401. In some embodiments, when accessing the installer screens, the dashboard 350 defaults to showing the installation setup tab 402 as active.

Pressing the tests tab 404 can change the active tab to an installer tests screen of the installer screen flow 401. Pressing the installer help tab 414 provides "context sensitive" help that presents dialog boxes relating to current screen functions regarding installation of the installer screen flow 401. Pressing the alerts tab 408 changes the active tab to the (installer) alerts screen of the installer screen flow 401. The diagnostic tab 406 is only active once the HVAC system 100 has been configured. Pressing the diagnostic tab 406 changes the active tab to the diagnostics screen of the installer screen flow 401.

Pressing the exit tab 1107 advances the installer to the home screen 450—leaving the installer screens. If available, pressing the start tab 1105 allows the HVAC system 100 to begin operating.

Turning now to FIG. 11B, illustrated is an installation and setup screen 1120 that displays minimum 1127, maximum 1129, current 1130 and default 1131 values on one screen for a device setting in an installation screen of the installer screen flow 401 for a particular device in the HVAC network 200 of the HVAC system 100. In one embodiment, the device to be installed sends a message to the dashboard 350 with the minimum, maximum and factory default values. In a further embodiment, the device to be installed can send increment values. The setup screen 1120 then displays all of this information to the installer. This gives the installer better information to set device parameters.

Turning now to FIG. 11C, illustrated is an exemplary installer screen 1140 illustrating an underlining 1141 of factory default settings for device parameters of the HVAC system 100. Generally, when multiple settings are displayed on one screen, under-lining 1141 one of the listings allows an installer to know what the factory default setting is, even when a separate entry 1142 is an option that is currently installed.

Turning now to FIGS. 11D-1 and 11D-2, illustrated is a flow 1155 wherein a device within the HVAC system 100 to be diagnosed in the installer screen 1140 is moved as text by a finger movement from a left part 1191 of the installer screen 1140 to a right part 1196 of the installer screen 1140.

In some embodiments, this approach does not need a select button or a remove button. Instead, an installer touches a desired item/device, such as item 1194 (FIG. 11D-1), and drags the text or icon to the right part 1196, creating an absence 1195, and then releases (FIG. 11D-2). Once the device is on the right part 1196, it is no longer on the left part 1191, and a start button 1197 appears, letting the installer know that the installer may proceed with diagnostics. To remove the selected item, simply drag it back to a list on the left part 1191.

Turning now to FIG. 12, illustrated is an exemplary method 1200 for operating and/or providing a visual interface for an HVAC network of an HVAC system, such as the HVAC network 200.

In a step 1210, a weather tab that invokes a weather screen is provided. In a step 1220, an indoor humidity tab that invokes an alert screen is provided, wherein invoking the indoor humidity tab advances to a humidity screen which displays at least a current indoor humidity. In step 1230, an alerts tab that invokes an alerts screen is provided. In a step 1240, a help tab that invokes a help screen is provided, wherein invoking the help tab advances to a help screen that provides context sensitive help that presents at least one dialog box related to a function of a current screen. In a step 1250, an indoor settings tab invokes an indoor setting screen which includes a current indoor temperature. In a step 1260, a programs tab that invokes a programs screen is provided which can program at least one of a) time b) temperature setpoints and c) heating/cooling setpoints. In a step 1270, a home tab provides a summary of indoor conditions. In a step 1280, at least one of the screens from the above steps is invoked.

In a further embodiment of the method 1200, step 1270 further provides wherein the home tab can advance to an installer dashboard that can be accessed only by an entry of a key, wherein the key is entered by an installer. In a further embodiment of method 1200, step 1260 further provides that, upon a time zone being pressed for a set period of time in the programs screen: a) a temperature setpoint for that time period is deactivated; b) a display of the deactivated setpoints of the deactivated time period appear dim relative to a display of the time period setpoints before deactivation; and c) the deactivated time period's setpoints appear dimmer relative to an active time periods setpoints. Step 1260 also still further provides a display of a plurality of pre-populated program schedule settings.

The method 1200 yet further includes a further embodiment of step 1240, wherein the help screen further displays settings dependent upon a screen displayed before the help screen is invoked. A still further embodiment of the method 1220 includes a further embodiment of step 1220, wherein the humidity screen allows users to program different humidity levels for different periods of a day. A yet still further embodiment of step 1250, wherein for a given piece of equipment to be offered to a user, a corresponding piece of equipment is installed in the HVAC dashboard.

Turning now to FIGS. 13A and 13B, illustrated is an exemplary flow diagram 1300 illustrating a subnet controller controlling a user interface display, which in some embodiments can be used in conjunction with or as a further embodiment of the method 1200.

Message(s) 1: subnet controller 1310 tells UI 1320 to display a specific screen and instructs it how to fill the data fields (TITLE, FIELDx, VALUEx, UNITx field as well as instructions on Buttons—how many there are, what their caption is). For example, to fill FIELD2 use UI string numbers 1234, to fill VALUE2 field, look at message with ID 12093 and starting bit 16 ($3^{rd}$ byte of the message) take 16 bits out and interpret them as unsigned int (16 bit), to fill UNIT2 field, use units of F/C (indicates temperature, for example.)

Message(s) 2: subnet controller 1310 tells device(s) 1330 to start operating—performing whatever test they are to perform.

Message(s) 3: device(s) 1330 broadcast their status and/or diagnostic messages and the UI 1320 interprets and displays the data, as it was taught by message(s) 1.

Message(s) 4: UI 1320 lets the subnet controller 1310 know which button was pressed, the subnet controller 1310 interprets this as either a SKIP TEST (go to the next one, or if on the last one, go to the results page), TEST PASSED or TEST FAILED, as appropriate. After this, the whole process repeats for all tests. An exemplary user interface screen shot after completion of a test can be seen in FIG. 13B.

Those skilled in the art to which this application relates will appreciate that other and further additions, deletions, substitutions and modifications may be made to the described embodiments.

What is claimed is:

1. An HVAC graphical interface dashboard, comprising:
   a weather tab, wherein invoking the weather tab advances to a weather screen;
   an indoor humidity tab, wherein invoking the indoor humidity tab advances to a humidity screen which displays at least a current indoor humidity;
   an alerts tab, wherein invoking the alerts tab advances to an alerts screen;
   a help tab, wherein invoking the help tab advances to a help screen that provides context sensitive help that presents at least one dialog box related to a function of a current screen;
   an indoor settings tab, wherein invoking the indoor settings tab advances to an indoor settings screen which includes a current indoor temperature;
   a programs tab, wherein invoking the programs tab advances to a programs screen which can program at least one of:
   a) a time;
   b) temperature setpoints;
   c) heating/cooling setpoints; and wherein at least one of:
  a) a system mode; and
  b) a fan mode can be selected by pressing a correlated icon in the program tab; and a home tab, wherein invoking the home tab advances to a home screen which provides a summary of indoor conditions.

2. The dashboard of claim 1, wherein a discovered device has a correlated icon for notice by a user.

3. The dashboard of claim 2, wherein an icon is correlated to at least one HVAC device employable by a user.

4. The dashboard of claim 1, wherein the help screen allows a user to adjust settings on a screen without saving changes to the settings.

5. The dashboard of claim 1, wherein, in order to access an installer screen from the home screen, an installer is to press and hold an icon with a finger for a given time period and then drag the finger across the home screen.

6. The dashboard of claim 1, wherein an installer screen is accessible only by entry of a key, wherein the key is entered by an installer.

7. The dashboard of claim 1, wherein the program screen has only one setpoint area that is selectable at one time, and once a setpoint is touched, the area turns an inverse of its current color.

8. An HVAC system including a graphical interface dashboard and at least one coupled device, comprising:
  the graphical interface dashboard, including:
    a weather tab, wherein invoking the weather tab advances to a weather screen;
    an indoor humidity tab, wherein invoking the indoor humidity tab advances to a humidity screen which displays at least a current indoor humidity;
    an alerts tab, wherein invoking the alerts tab advances to an alerts screen;
    a help tab, wherein invoking the help tab advances to a help screen that provides context sensitive help that presents at least one dialog box related to a function of a current screen;
    an indoor settings tab, wherein invoking the indoor settings tab advances a user to an indoor settings screen which includes a current indoor temperature;
    a programs tab, wherein pressing the programs tab invokes a programs screen which can program at least one of:
      i) a time;
      ii) temperature setpoints;
      iii) heating/cooling setpoints;
    wherein at least one of:
      a) a system mode; and
      b) a fan mode
    can be selected by pressing a correlated icon in the program tab; and
    a home tab, wherein invoking the home tab advances a user to a home screen which provides a summary of indoor conditions; and
  the at least one coupled device selected from the group including:
    a) an air handler;
    b) a furnace;
    c) an evaporator coil;
    d) a condenser coil; and
    e) a compressor;
  wherein the at least one coupled device is viewable from at least one of the tabs.

9. The dashboard of claim 8, wherein the programs tab further includes a fan mode.

10. The dashboard of claim 8, wherein a discovered device has a correlated icon for notice by a user.

11. The dashboard of claim 10, wherein an icon is correlated to at least one HVAC device employable by a user.

12. The dashboard of claim 8, wherein the help screen allows a user to adjust settings on a screen without saving changes to the settings.

13. The dashboard of claim 8, wherein, in order to access an installer screen from the home screen, an installer is to press and hold an icon with a finger for a given time period and then drag the finger across the home screen.

14. The dashboard of claim 8, wherein the program screen has only one setpoint area that is selectable at one time, and once a setpoint is touched, the area turns an inverse of its current color.

15. An HVAC graphical interface dashboard, comprising:
  a weather tab, wherein invoking the weather tab advances to a weather screen;
  an indoor humidity tab, wherein invoking the indoor humidity tab advances to a humidity screen which displays at least a current indoor humidity;
  an alerts tab, wherein invoking the alerts tab advances to an alerts screen;
  a help tab, wherein invoking the help tab advances to a help screen that provides context sensitive help that presents at least one dialog box related to a function of a current screen;
  an indoor settings tab, wherein invoking the indoor settings tab advances to an indoor settings screen which includes a current indoor temperature;
  a programs tab, wherein invoking the programs tab advances to a programs screen which can program at least one of:
    a) a time;
    b) temperature setpoints;
    c) heating/cooling setpoints;
    wherein at least one of:
      a) a system mode; and
      b) a fan mode
    can be selected by pressing a correlated icon in the program tab; and
  a home tab, wherein invoking the home tab advances to a home screen which provides a summary of indoor conditions,
  wherein the home tab can further advance to an installer dashboard that can be accessed only by an entry of a key, wherein the key is entered by an installer.

16. The dashboard of claim 14, wherein a discovered device has a correlated icon for notice by a user.

17. The dashboard of claim 14, wherein an icon is correlated to at least one HVAC device employable by a user.

18. The dashboard of claim 14, wherein the help screen allows a user to adjust settings on a screen without saving changes to the settings.

* * * * *